(12) United States Patent
Zhu

(10) Patent No.: US 10,456,736 B2
(45) Date of Patent: Oct. 29, 2019

(54) METHOD AND APPARATUS FOR PURIFICATION AND TREATMENT OF AIR

(71) Applicant: Paloza LLC, Los Altos, CA (US)

(72) Inventor: Peter C. Zhu, Los Altos, CA (US)

(73) Assignee: Paloza LLC, Los Altos, CA (US)

( * ) Notice: Subject to any disclaimer, the term of this patent is extended or adjusted under 35 U.S.C. 154(b) by 0 days.

(21) Appl. No.: 15/180,073

(22) Filed: Jun. 12, 2016

(65) Prior Publication Data

US 2017/0106333 A1    Apr. 20, 2017

Related U.S. Application Data

(60) Provisional application No. 62/243,161, filed on Oct. 19, 2015.

(51) Int. Cl.
*B01D 53/14*    (2006.01)
*B01D 53/72*    (2006.01)
(Continued)

(52) U.S. Cl.
CPC ..... *B01D 53/1493* (2013.01); *B01D 53/1406* (2013.01); *B01D 53/72* (2013.01);
(Continued)

(58) Field of Classification Search
CPC ............ B01D 53/1406; B01D 53/1487; B01D 53/1493; B01D 53/261; B01D 53/263; B01D 53/72; B01D 53/80; B01D 2251/106; B01D 2251/304; B01D 2251/50; B01D 2251/506; B01D 2251/60; B01D 2251/608; B01D 2251/61; B01D 2251/70;
(Continued)

(56) References Cited

U.S. PATENT DOCUMENTS 1,170,526 A    2/1916  Gaither
1,196,539 A    8/1916  Goldberg
(Continued)

FOREIGN PATENT DOCUMENTS

DE    2060802    6/1972
EP    2545988 A2    1/2013
(Continued)

OTHER PUBLICATIONS

Talaiekhozani, A., et al, "Removal of formaldehyde from polluted air in a biotrickling filter reactor", Desalination and Water Treatment (2013) pp. 1-9.
(Continued)

*Primary Examiner* — Frank M Lawrence, Jr.
(74) *Attorney, Agent, or Firm* — David W. Ladner; Ladner Patent Managment LLC

(57) ABSTRACT

The invention discloses methods and apparatus(es) for the removal and control of pollutants such as gases and suspended particulates in the air of an enclosed space or an outdoor environment by passing the air through absorbent media. The absorbent media includes any liquid, solid or combination of liquid and solid media that is capable of absorbing a material in which it comes in contact. In one aspect of the invention, formaldehyde is removed by air sparging through a liquid such as water, optionally containing additional scavenging agents.

26 Claims, 55 Drawing Sheets

(51) Int. Cl.
*B01D 53/26* (2006.01)
*B01D 53/80* (2006.01)

(52) U.S. Cl.
CPC ........ *B01D 53/1487* (2013.01); *B01D 53/261* (2013.01); *B01D 53/263* (2013.01); *B01D 53/80* (2013.01); *B01D 2251/106* (2013.01); *B01D 2251/304* (2013.01); *B01D 2251/50* (2013.01); *B01D 2251/506* (2013.01); *B01D 2251/60* (2013.01); *B01D 2251/608* (2013.01); *B01D 2251/61* (2013.01); *B01D 2251/70* (2013.01); *B01D 2252/102* (2013.01); *B01D 2252/103* (2013.01); *B01D 2252/20* (2013.01); *B01D 2252/204* (2013.01); *B01D 2252/205* (2013.01); *B01D 2252/2023* (2013.01); *B01D 2252/2026* (2013.01); *B01D 2252/20494* (2013.01); *B01D 2252/504* (2013.01); *B01D 2252/60* (2013.01); *B01D 2253/102* (2013.01); *B01D 2253/104* (2013.01); *B01D 2253/106* (2013.01); *B01D 2253/1124* (2013.01); *B01D 2253/202* (2013.01); *B01D 2255/104* (2013.01); *B01D 2255/20792* (2013.01); *B01D 2257/708* (2013.01); *B01D 2257/80* (2013.01); *B01D 2257/91* (2013.01); *B01D 2258/06* (2013.01)

(58) Field of Classification Search
CPC ........ B01D 2252/102; B01D 2252/103; B01D 2252/20; B01D 2252/2023; B01D 2252/2026; B01D 2252/204; B01D 2252/20494; B01D 2252/205; B01D 2252/504; B01D 2252/60; B01D 2253/102; B01D 2253/104; B01D 2253/106; B01D 2253/1124; B01D 2253/202; B01D 2255/104; B01D 2255/20792; B01D 2257/708; B01D 2257/80; B01D 2257/91; B01D 2258/06
USPC .............................. 96/279, 351–354; 95/149
See application file for complete search history.

(56) References Cited

U.S. PATENT DOCUMENTS

| | | | |
|---|---|---|---|
| 1,521,872 A | 1/1925 | Dellinger | |
| 2,088,720 A | 8/1937 | Poliniak | |
| 2,173,073 A | 9/1939 | Pierson | |
| 2,209,775 A | 7/1940 | Karlsteen | |
| 2,369,900 A | 2/1941 | Jennings et al. | |
| 2,234,385 A | 3/1941 | Ryner | |
| 2,238,461 A * | 4/1941 | Carman | E03D 9/052 |
| | | | 4/213 |
| 2,405,494 A * | 8/1946 | Dupuy | F24F 6/12 |
| | | | 261/120 |
| 2,777,759 A | 1/1947 | Sokolik | |
| 3,486,307 A | 12/1969 | McDermott | |
| 3,504,481 A * | 4/1970 | Zakarian | B01D 53/34 |
| | | | 110/119 |
| 3,607,690 A | 9/1971 | Brant | |
| 3,732,045 A | 3/1973 | Acaba | |
| 3,757,495 A | 9/1973 | Sievers | |
| 3,936,283 A | 2/1976 | Solis | |
| 3,980,080 A | 9/1976 | Muto | |
| 4,089,655 A | 5/1978 | Razete | |
| 4,146,026 A | 3/1979 | Montalvo | |
| 4,200,497 A | 7/1980 | Nagelmeyer | |
| 4,229,417 A | 10/1980 | Kanai et al. | |
| 4,251,241 A | 2/1981 | Bothun | |
| 4,251,486 A * | 2/1981 | Sohda | B01D 53/34 |
| | | | 210/252 |
| 4,374,814 A | 2/1983 | Gaylord | |
| 4,432,777 A * | 2/1984 | Postma | B01D 47/021 |
| | | | 261/122.1 |
| 4,443,354 A | 4/1984 | Eian | |
| 4,550,010 A | 10/1985 | Chelu | |
| 4,663,089 A * | 5/1987 | Lowry | B01D 19/0005 |
| | | | 210/221.2 |
| 4,764,346 A | 8/1988 | Lewis et al. | |
| 4,844,721 A | 7/1989 | Cox et al. | |
| 5,017,201 A | 5/1991 | Park | |
| 5,078,759 A | 1/1992 | Kira | |
| 5,080,793 A | 1/1992 | Urlings | |
| 5,215,560 A | 6/1993 | Lee | |
| 5,223,230 A | 6/1993 | Takemura et al. | |
| 5,277,877 A | 1/1994 | Jeffrey et al. | |
| 5,482,859 A | 1/1996 | Biller et al. | |
| 5,531,801 A | 7/1996 | Sewell et al. | |
| 5,645,802 A | 7/1997 | Yanagioka et al. | |
| 5,669,946 A | 9/1997 | Blair | |
| 5,848,592 A | 12/1998 | Sibley | |
| 5,908,491 A | 6/1999 | Hobbs | |
| 5,928,615 A | 7/1999 | Strock et al. | |
| 5,935,525 A | 8/1999 | Lincoln et al. | |
| 6,132,493 A | 10/2000 | Church | |
| 6,187,276 B1 | 2/2001 | Sata | |
| 6,194,198 B1 | 2/2001 | Koers | |
| 6,391,093 B1 * | 5/2002 | French | B23K 26/1435 |
| | | | 95/214 |
| 6,402,815 B1 | 6/2002 | Son | |
| 6,503,458 B1 | 1/2003 | Ogle | |
| 6,531,634 B1 | 3/2003 | Zhu | |
| 6,589,476 B1 | 7/2003 | Fencl | |
| 6,589,486 B1 | 7/2003 | Spanton | |
| 6,616,733 B1 | 9/2003 | Pellegrin | |
| 6,626,983 B1 | 9/2003 | Cairns | |
| 6,638,338 B2 | 10/2003 | Logstrup | |
| 6,641,635 B1 | 11/2003 | Chiesl | |
| 6,670,520 B2 | 12/2003 | Zhu et al. | |
| 6,776,904 B2 | 8/2004 | Zhu et al. | |
| 6,799,573 B1 | 10/2004 | Bonner | |
| 6,911,189 B1 | 6/2005 | Koller et al. | |
| 6,986,803 B1 | 1/2006 | Richards | |
| 7,012,163 B2 | 1/2006 | Steward | |
| 7,025,812 B2 | 4/2006 | Marusic | |
| 7,041,220 B2 | 5/2006 | Zhu et al. | |
| 7,052,683 B2 | 5/2006 | Farkas | |
| 7,145,043 B2 | 12/2006 | Zhu | |
| 7,156,895 B2 | 1/2007 | Rubin et al. | |
| 7,160,505 B2 | 1/2007 | Belbachir et al. | |
| 7,323,146 B2 | 1/2008 | Kim et al. | |
| 7,404,401 B1 | 7/2008 | Brady | |
| 7,407,633 B2 | 8/2008 | Potember et al. | |
| 7,520,912 B2 | 12/2009 | Moser et al. | |
| 7,645,323 B2 | 1/2010 | Massenbauer-Strafe et al. | |
| 7,651,555 B2 | 1/2010 | Roseberry et al. | |
| 7,655,080 B2 | 2/2010 | Ting | |
| 7,666,313 B2 | 2/2010 | Kerfoot | |
| 7,674,436 B1 | 3/2010 | Feldman et al. | |
| 7,708,965 B2 | 5/2010 | Thurot | |
| 7,722,708 B2 | 5/2010 | Powell et al. | |
| 7,758,025 B2 | 7/2010 | Swoboda et al. | |
| 7,824,626 B2 | 11/2010 | Kwiatkowski | |
| 7,981,361 B2 | 7/2011 | Bacik | |
| 7,988,909 B1 | 8/2011 | Ruan | |
| 8,043,383 B2 | 10/2011 | Tutin et al. | |
| 8,128,876 B2 | 3/2012 | Al-Thallab et al. | |
| 8,288,279 B1 | 10/2012 | Tanaka | |
| 8,313,564 B2 * | 11/2012 | Kwack | B01D 46/0024 |
| | | | 95/223 |
| 8,318,084 B2 | 11/2012 | Johnson et al. | |
| 8,444,922 B2 | 5/2013 | Kusuura | |
| 8,703,062 B2 | 4/2014 | Kusuura | |
| 8,734,724 B2 | 5/2014 | Engelhard | |
| 8,753,567 B2 | 6/2014 | Davis, Jr. | |
| 8,778,272 B2 | 7/2014 | Chan et al. | |
| 8,974,737 B2 | 3/2015 | Erickson | |
| 9,005,531 B2 | 4/2015 | Molde | |
| 2003/0232424 A1 | 12/2003 | Cooke | |
| 2004/0028586 A1 | 2/2004 | Stewart | |
| 2005/0035472 A1 | 2/2005 | Schur | |

(56) References Cited

U.S. PATENT DOCUMENTS

| | | | |
|---|---|---|---|
| 2006/0107449 A1* | 5/2006 | Lan | E03D 9/05 4/213 |
| 2006/0115388 A1 | 6/2006 | Sanderson | |
| 2007/0020159 A1 | 1/2007 | Tsui | |
| 2007/0122320 A1 | 5/2007 | Pletcher et al. | |
| 2007/0138674 A1 | 6/2007 | Anastasiou et al. | |
| 2010/0143205 A1 | 6/2010 | Engelhard | |
| 2012/0180655 A1 | 7/2012 | Law et al. | |
| 2012/0230876 A1 | 9/2012 | Chan et al. | |
| 2012/0273345 A1 | 11/2012 | Lin et al. | |

FOREIGN PATENT DOCUMENTS

| | | |
|---|---|---|
| EP | 1797947 B1 | 3/2013 |
| JP | 01284319 A | 11/1989 |
| JP | 04003828 A | 1/1992 |
| JP | 11033333 A | 2/1999 |
| JP | 11076759 A | 3/1999 |
| JP | 11207130 A | 8/1999 |
| JP | 2001212217 A | 8/2001 |
| JP | 2004162981 A | 6/2004 |
| JP | 2004298718 A | 10/2004 |
| JP | 2005224703 A | 8/2005 |
| JP | 2006346373 A | 8/2005 |
| JP | 3930131 B | 3/2007 |
| WO | WO2005000371 A1 | 1/2005 |
| WO | WO2009005974 A1 | 1/2009 |

OTHER PUBLICATIONS

Tseng, C.-H., et al., "The Removal of Indoor Formaldehyde by Various Air Cleaners," Paper #457, Air & Waste Management Association's 98th Annual Conference, Jun. 19-23, 2005.

Pedersen, B.S., et al., "Air Washing for the Removal of Formaldehyde from Indoor Air," Environment International, vol. 12, pp. 439-447, 1986.

Fernandez, J.E., et al., "The Reaction of Secondary Amines with Formaldehyde," J. Org. Chem., 1963, 28 (11), pp. 3258-3259.

Sprung, M. A., "A Summary of the Reactions of Aldehydes with Amines," Chem. Rev., 1940, 26 (3), pp. 297-338.

Biello, D, "Meet the Microbes Eating the Gulf Oil Spill," Scientific American, Aug. 18, 2010.

* cited by examiner

Illustration of a Biphasic Sparging System

METHOD AND APPARATUS FOR PURIFICATION AND TREATMENT OF AIR

CROSS REFERENCE TO RELATED APPLICATION

This application is claims priority to the U.S. Provisional Application No. 62/243,161 filed Oct. 19, 2015.

FIELD OF THE INVENTION

The invention discloses methods and novel apparatus(es) for the purifying and conditioning air in areas occupied by humans and pets, by passing the air through a vessel containing a liquid absorbent media.

BACKGROUND

Environmental pollutants that are known to have harmful effects when introduced into inhabited areas represent a significant health hazard to humans and pets that occupy such areas, because of the acute and/or chronic toxicity caused by exposure to such pollutants. Such pollutants may not be easily controlled at the source, i.e., may be a result of regional air pollution. Certain environmental spaces, such as medical facilities, food storage areas, are particularly susceptible to air pollutants, or biological contamination. Methods for remediating the air and protecting the occupants and contents from exposure to such pollutants and health hazards would therefore be beneficial.

In enclosed spaces, often such methods include passing the air via an air handling system through a fixed solid filter, such as those found on a typical HVAC furnace filter, HEPA filters, or containing an adsorbent material such as charcoal or carbon-black. While this methodology may remove particulate matter, it has limited utility because the filters may become saturated and/or blocked even on short term use. Furthermore this approach is unsatisfactory for the removal of certain other pollutants, including Total Volatile Organic Compounds (TVOC) and gasses, such as formaldehyde (see Clary, John J., et al., "Formaldehyde: Toxicology, Epidemiology, Mechanisms", First Edition 1983; "Formaldehyde and Other Aldehydes", Committee on Aldehydes, Board on Toxicology and Environmental Health Hazards, Assembly of Life Scientists, National Research Council, National Academy Press, Washington, D.C. (1981); and "Formaldehyde Health and Safety Guide, IPCS International Programme on Chemical Safety, Health and Safety Guide No. 57). Formaldehyde is a particular problem because it is used widely in furniture and construction. The plywood used, for example may contain a glue resin such as urea-formaldehyde, or phenol formaldehyde resin. In such systems, formaldehyde can gradually release from the resin for as long as 15 years. The formaldehyde vapor often accumulates in an enclosed space as a result. Formaldehyde vapor may also arise from synthetic fibers, plastics, or insulation foam, within or nearby the space. Furthermore, because of the size requirements, the use of traditional air handling units and air purifiers in some enclosed spaces such as small buildings other than homes or offices, trucks, automobiles or motor homes are not practical. Often the only solution has been to ventilate the enclosed space by exchanging its air with outside air, but this solution can necessitate the need to recondition, e.g., cool, reheat, humidify or dehumidify, the air, added to the expense of such a solution. Furthermore, some particles are too small to catch even with HEPA filters. The use of porous porcelain material in filtration systems to catch small particles has been described, but this leads to blockage of the pores and huge energy consumption (and frequent replacement of filter materials). In addition, volatile organic chemicals can get easily saturated on solid media, such as C-black or charcoal, commonly used material for absorbing volatile organic compounds such as formaldehyde. Once saturation of the solid media occurs, it can be released from the solid phase. This is especially true for formaldehyde because of its high volatility (bp of −19° C.), making it readily released from C-black.

For infectious disease-related bacteria or viruses, it is important to not only capture and kill (sterilize or disinfect) the pathogens but also prevent them from growing in the air cleaning process. Removal of harmful microorganisms with such filtration technology is also problematic, because in strong winds or air currents, they can be blown away from solid support (such as charcoal) and released back into the air. Even more problematic, microorganisms may find solid media as ideal environment in for multiplication (growth) before circulating back to the air. The problem is not easily mediated by adding biocides to solid support, because it is inefficient in dry condition or the charcoal may become less absorbent if it is made wet. Furthermore, biocides in solid form may dissociate from the solid support and be released directly into the air, resulting in safety concerns.

A second approach to removing pollutants, such as formaldehyde, from air is referred to as "air washing" and involves systems in which a large quantity of water is recirculated through an airstream. For example, the airflow passing through heating/ventilation ductwork within is subjected to a spray or cascading surface of water, or comes in contact with a water treated media, such as a moistened moving belt, agitated packing material, or frothy interface. The formaldehyde is absorbed into the water, and the formaldehyde/water mixture can be removed and the air washing system can be replenished with fresh formaldehyde-free water. (See Pedersen et al., Environment International, 12, 439-447, 1986; U.S. Pat. No. 6,641,635; US 2004 0028586; U.S. Pat. Nos. 6,669,946, 7,758,025). Similarly, air scrubbing devices are disclosed in which air is passed through a chamber, where a cascade of water circulates, and the water is disinfected by means of a germicidal light source (U.S. Pat. No. 7,722,708) or the scrubbing action is accomplished by means of a central rotor which disperses a liquid through a specially shaped bowl that brings it in contact with passing air (U.S. Pat. No. 3,936,283). Because air washing methods typically result in some of the liquid being entrained in the moving air in droplet form, the addition of an apparatus called an eliminator is employed to remove the droplets. An air washer design with no eliminator is described in U.S. Pat. No. 6,132,493.

A third general approach are various systems designed to remove contaminants such as particulates and/or biodegradable vapors, in which environmental air is pumped below the surface of one or more chambers or compartments containing water and/or another liquid; the water may contain an additive, such as a surfactant, a biologically active microorganism or a biocide which reacts/degrades the contaminants (U.S. Pat. No. 4,818,59; US 2003 0232424; U.S. Pat. Nos. 6,616,733; 5,908,491; 5,078,759; 5,080,793; 5,078,759; 7,022,297; 7,156,895; 7,988,909; 6,626,983; 2,209,775; 5,848,592). This general method of removing pollutants has also been applied to industrial waste streams, where additives are selected to specifically decompose the contaminants. (U.S. Pat. No. 4,251,486). These devices frequently also function as humidifiers, i.e., adding moisture to the air as it is cleaned.

In industrial work areas where environmental hazards are well defined, specialized personal protection equipment have been developed and are routinely used. In contrast, convenient methods to protect individuals from chronic exposure to harmful gasses and particulate matter in public outdoor areas are not readily available, despite deteriorating air quality because of environmental pollution. In some areas of the world, smog has been so severe, that if it contains PM2.5, governments of many countries advise individuals to stay indoors and to keep doors and windows shut to prevent it from entering into houses or vehicles. PM2.5 refers to particulate matter of 2.5 microns or less, and is also referred to as "fine" particles and believed to pose the greatest health risks.

Thus, there is a need for a generally applicable and practical method and devices to remove pollutants, including particulates, volatile contaminants, biological hazards such as germs and viruses from the air of enclosed air spaces and to prevent or reduce exposure of these pollutants to individuals in outdoor environments where needed.

SUMMARY

In accordance with the purpose(s) of the invention, as embodied and broadly described herein, the invention, in one aspect, relates to a method for the removal of one or more contaminants from contaminated environmental space air, while optionally and independently improving the temperature and level of relative humidity of the air, comprising the steps of
  a. passing the contaminated environmental space air, by means of an air transferring device, through an absorbent liquid medium contained in a vessel, wherein the temperature and hygroscopicity of the liquid medium are optionally and independently controlled, said liquid medium optionally containing one or more additives capable of interacting with the contaminants;
  b. allowing the contaminated environmental space air to come in contact with the absorbent liquid medium and optional additives such that one or more contaminants from the contaminated environmental space air are transferred into the absorbent liquid medium and are thereby removed to produce decontaminated environmental space air, and the temperature and humidity of the air are optionally and independently improved;
  c. releasing the decontaminated environmental space air from the vessel into the environmental space, thereby lowering the level of one or more contaminants in the environmental space air, and optionally and independently improving the temperature and humidity of the environmental space air.

In accordance with the purpose(s) of the invention, as embodied and broadly described herein, the invention, in another aspect, relates to an apparatus for the removal of contaminants from the environmental space air, said apparatus comprising
  a. an air transferring device with intake and output ports, such that when the device is operated, the intake port collects environmental space air which is transferred to the output port;
  b. a vessel containing an absorbent liquid medium, and one or more optional additives, and optionally having one or more ports for addition and/or removal of the liquid medium;
  c. one or more conduits for transferring air from the output port of the air transferring device to the intake port of the vessel containing the absorbent liquid medium, said conduits positioned so that the air from the output port of the air transferring device enters the intake port of the vessel below the level of the absorbent liquid contained in the vessel and then passes through the medium becoming purified air; and
  d. a means for the release of the purified air from the vessel to the environmental space, wherein said means is
    one or more conduits leading from above the liquid medium in the vessel to the environmental space, or
    one or more openings in the vessel, above the liquid medium in the vessel, to the environmental space.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

Figure 1:
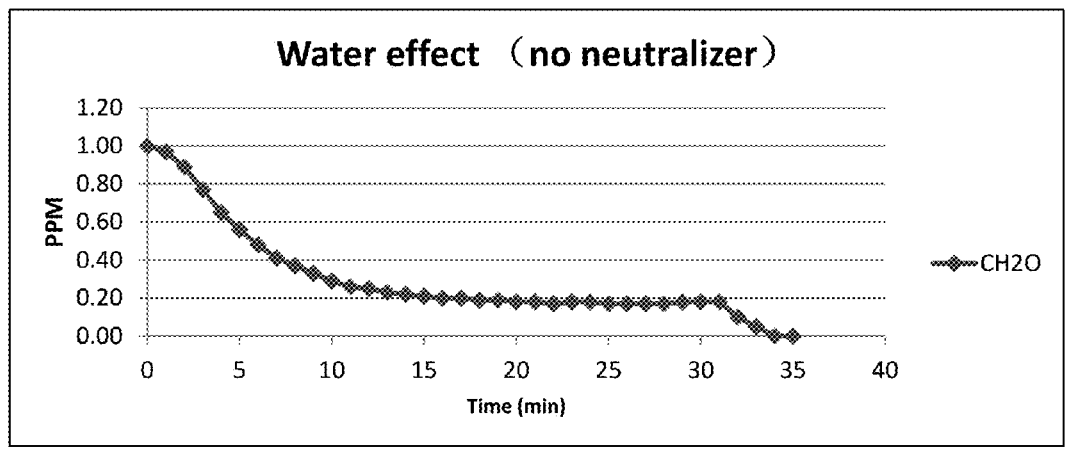
FIGS. 1 and 2 show the results of an experimental study to establish the limits of effectiveness of using water as the absorbent liquid to remove formaldehyde from an enclosed space by air sparging using an apparatus schematically represented by FIG. 6.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention can be understood more readily by reference to the following detailed description of the invention and the Examples included therein.

Before the compositions, articles, systems, devices, and/or methods are disclosed and described, it is to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Definitions

As used in the specification and the appended claims, the singular forms "a," "an" and "the" include plural referents unless the context clearly dictates otherwise. Thus, for example, reference to "a pollutant," or "an additive" or "an absorbent liquid" can include mixtures of two or more such component groups, or residues, and the like. Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio (w/w) of 2:5, and are present in such ratio regardless of whether additional components are contained in the compound.

References in the specification and concluding claims to v/v ratio of components or additives in a composition denote the relative amounts of each component by volume. Thus, in a mixture expressed as a mixture of 2:8 v/v of ethylene glycol and water, indicates a mixture containing 2 volume units (e.g., mL) of ethylene glycol and 8 volume units (ml) of water and that ratio is present regardless of whether additional components are contained in the mixture.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

As used herein, the terms "individual(s)" or "occupant(s)" refer to humans, pets or other air-breathing animals that typically occupy an environmental space.

As used herein, the terms "pollutants" or "contaminants" refer to solid (particulate), gaseous materials, and/or liquid materials, and/or mixtures thereof, which may be present in the air as a suspension, aerosol, sol, or mixture and the like, in an amount which is measurably above background levels of such materials found in nature. In particular, a pollutant or contaminant refers to materials that exceed a concentration or level defined by a regulatory agency that can result in health or safety concerns. Examples of pollutants or contaminants are formaldehyde, ozone, formic acid, ammonia, sulfur dioxide, nitrogen oxides (NOx, including NO, $NO_2$), hydrogen sulfide, chlorinated hydrocarbons; volatile organic compounds (VOCs); industrial emissions from manufacturing facilities including refineries and the like; automobile emissions; workplace-generated emissions, particulate matter, including smoke and grease vapors from cooking; tobacco smoke, airborne dust containing heavy metals such as lead, cadmium, mercury, chromium and the like; allergens such as plant pollen; animal dander; including tobacco smoke and soot particles and the like; airborne microorganisms such as bacteria, fungal spores, and mites, viral particles and the like; and foul or obnoxious odors, including those from decomposing organic matter, human or animal wastepipe, urine or feces, and dust, including explosive dust, for example dust present in coal mines, generated in grain elevators, from special effects produced in film-making or pyrotechnics, from industrial operations such as grinding, machining or milling.

As used herein, the term "environmental air" refers to the air that exists within an environmental space which may have limited exchange with air outside the environmental space. The environmental air may or may not be contaminated with pollutants.

As used herein, the term "environmental space" refers to any space in which some control of the air quality is desired. This includes enclosed spaces or outdoor spaces in which environmental air quality can affect occupying individuals or objects.

Enclosed spaces include such spaces as rooms, compartments, chambers, buildings, dwellings and the like which have limited air exchange with the outdoor environment, but are otherwise suitable for occupancy or use by humans, livestock or pets; spaces used for the storage of objects subject to environmental conditions such as food, fruits, vegetables, i.e., vegetable stock rooms, meat and the like, or objects sensitive to the environment such as art work, musical instruments, furniture, antiques and the like. Examples of such enclosed spaces include rooms in homes and living quarters; offices and working areas including laboratories, medical facilities such as clinics, hospitals and doctor's offices, art galleries, warehouses, outbuildings; public buildings, such as schools, classrooms, auditoriums, arenas, indoor stadiums, and the like; hotels and other lodging accommodations; restaurants and other eating establishments; theaters, transportation stations, such as railway stations, bus or subway stations, and airport terminals; storage areas such as closets, refrigerators, dishwashers, closets, display cases, garages, hangars, and sheds; passenger/operator and cargo compartments in vehicles such as automobiles, trucks, trucks with climate controlled cargo space, vehicles used for space travel or exploration, motor homes, trains including climate controlled railway cars; aircraft including environmentally controlled airplane cargo holds and passenger compartments, passenger ships including staterooms, pubic areas and cargo holds, working or recreational water craft and the like.

As used herein, the term "outdoor spaces" includes areas in which humans and/or pets work, travel or occupy for work, travel or recreational purposes. Examples of such outdoor environments include urban environments such as sidewalks, streets, highways, public and private parks and the like; rural environments such as highways, fields, forests, waterways beaches, and recreational facilities.

As used herein, the terms "individual breathing apparatus" include portable equipment commonly used to provide air or oxygen to people in need thereof, such as individuals with chronic obstructive pulmonary disorders (COPD) or sleep apnea. The apparatus typically includes a pump with monitoring readouts, connective hoses and a facemask or nasal supply tubing. Such devices include so-call Continuous Positive Airway Pressure (CPAP), devices, supplied for example by cpap.com; (www.cpap.com) 13235 N Promenade, Stafford, Tex. 77477.

As used herein, the term "absorbent liquid(s)" refers to any absorbent liquid, combination of liquids or combination of liquid and solid media that is capable of absorbing a material in which it comes in contact. Absorbent liquids can be pure liquids, solutions or suspensions containing one or more miscible or immiscible liquids, or one or more dissolved or suspended solids or gasses. Liquids include water; vegetable oil; mineral oils; animal fats and oils; silicones; saturated or unsaturated sodium chloride solution, or similar aqueous solutions of other inorganic salts; liquid polymers such as PEG; aliphatic alcohols such as methanol, ethanol, propanol, isopropanol, n-butanol and the like; polyols such as poly(ethylene glycol), poly(propylene glycol), glycerin and the like; and aliphatic ketones such as acetone, methyl ethyl ketone, cyclohexanone and the like. Mixtures of immiscible liquids may be multi-phasic, or in the form of an emulsion.

As used herein, the term "adsorbent solid(s)" refers to any solids materials that provide a large surface area or is distributed in a matrix that facilitates contact and is capable of capturing contaminant or pollutants on the surface. Examples of such materials include expandable lattice clays, such as montmorillonite or bentonite clays, zeolites, molecular sieves, organic scavengers such as solid organic polymers designed for such specific purpose, polymers such as polyethylene glycols, diatomaceous earth, charcoal, carbon black, textiles (e.g., cotton, linen, polyester and the like) fibers, fiberglass, saw dust, cellulose, powdered or shredded newspaper materials, silica gel, sea sand, alumina, polymeric materials designed to be absorbents and the like.

In the scope of the invention are included combinations of liquids and solids which include slurries or suspensions of a solid in a liquid, such as excess solid sodium chloride suspended in saturated sodium chloride solution, or liquids distributed on a solid support such as silica gel, or liquids on textiles cellulose, or a polymeric material.

As used herein, the term "additive(s)" refers to any material dissolved or suspended in the liquid absorbents to enhance the absorbing capability of the absorbent liquid, enhance degradation of contaminants or control the humidity of the environmental space air being treated. Such additives include salts, such as sodium chloride, potassium chloride, sodium sulfate, magnesium sulfate, calcium sulfate; surfactants; acid or base neutralizers, such as amino acids; buffering agents such as sodium bicarbonate or ammonium chloride; acids such as mineral acids such as hydrochloric acid, sulfuric acid and the like; bases such as mon- di- and trialkylamines, alkaline metal hydroxides, alkaline earth hydroxides, and ammonia; oxidizing agents such as chlorine bleach, peroxides, peracids, or sodium hypochlorite, and ozone; reducing agents such as sugars and vitamin C; chelating agents such as EDTA; free radical scavengers such as hydroquinone, starch, cyclic dextrans; rheological agents, specific binding reagents such as dimedone and the like; aldehyde complexation agents such as sodium or potassium bisulfite, sulfide precipitation agents such as zinc oxide, or silver nitrate; and metal and metal oxide catalysts, including TiO$_2$ as well as rare earth metal catalysts, including those that catalyze oxidative degradation of contaminants such as formaldehyde. The additives may also include materials which are biocides as defined below. Additives for the neutralization or removal of formaldehyde can include reagents known for the titration methods for analysis of aldehydes in general. These include sodium sulfite, sodium bisulfite, alkaline peroxide (e.g., NaOH and H$_2$O$_2$), hypoiodite (e.g., KIO, generated from KOH, I$_3$, and KI).

As used herein, the terms "rare earth metal catalysts" refer to elements or compounds derived from any one of a set of seventeen chemical elements in the periodic table, specifically the fifteen lanthanides, as well as scandium and yttrium.

Such additives may also include specialty amines with combined chelating and neutralizing properties, e.g., primary or secondary amine groups that react with formaldehyde. Examples of these include, amino acids, peptides and protein materials and their degraded components, Tren (tris (2-aminoethyl)amine, methyl amine, ethyl amine, propyl amine, isopropyl amine, butyl amine, ethylenediamine, propanediamine, 1,4-butanediamine, 1,5-pentanediamine (cadaverine), 1,6-hexanediamine, Jaffamines (JEFFAMINE® D-230 polyetheramine, JEFFAMINE® D-400 polyetheramine, JEFFAMINE® D-2000 polyetheramine, JEFFAMINE® D-4000 polyetheramine, JEFFAMINE® ED-600 polyetheramine, JEFFAMINE® ED-900 polyetheramine, JEFFAMINE® ED-2003 polyetheramine, JEFFAMINE® EDR-104 etheramine, JEFFAMINE® EDR-148 polyetheramine, JEFFAMINE® EDR-176 polyetheramine, JEFFAMINE® SD=2001 polyetheramine, JEFFAMINE® THF-100 polyetheramine, JEFFAMINE® THF-140 polyetheramine, JEFFAMINE® THF-170 polyetheramine), •XTJ-542 diamine, XTJ-548 diamine, XTJ-559 diamine, XTJ-568 diamine, XTJ-578 diamine, XTJ-582 diamine. H$_2$NCH$_2$CH$_2$CH$_2$CO$_2$H, polyamines, guanidine, amino acids such as Histidine, Alanine, Isoleucine, Arginine, Leucine Asparagine, Lysine, Aspartic acid, Methionine Cysteine, Phenylalanine, Glutamic acid, Threonine Glutamine, Tryptophan Glycine, Valine Pyrrolysine, Proline, Selenocysteine, Serine, Tyrosine, and Hydrazines.

Chelating, neutralization or reactions could be reversible or non-reversible. The most important reversible reaction for formaldehyde is perhaps hydration. Once hydrated, formaldehyde loses most of its volatile property as a gaseous molecule, and can be disposed or flushed to the sink easily, with or without pre-neutralization. A second important reversible reaction for formaldehyde is solvation with alcohols, including polyols such as glycerin.

For a summary of the Reactions of Aldehydes with Amines see Murray A. Sprung, Chem. Rev., 1940, 26 (3), pp 297-338; and J. E. Fernandez, G. B. Butler, J. Org. Chem., 1963, 28 (11), pp 3258-3259.

Additives also include preservatives which can act to prevent degradation of the liquid/additive mixtures by chemical, photochemical, or biological means. Some common preservatives include: Acetic Acid, Benzoic Acid, Citric Acid, Citric Acid Esters of Mono- and Diglycerides, Calcium Propionate, Erythorbic Acid, Ethyl lauroyl arginate, lactic acid, Methyl-p-hydroxy Benzoate, Methyl Paraben, Natamycin, Potassium Benzoate, Potassium Bisulphite, Potassium Lactate, Potassium Metabisulphite, Potassium Nitrate, Potassium Nitrite, Propyl-p-hydroxy Benzoate, Propyl Paraben, Propionic Acid, Sodium Acetate, Sodium Ascorbate, Sodium Benzoate, Sodium Bisulphite, Sodium Diacetate, Sodium Erythorbate, Sodium Lactate, Sodium Metabisulphite, Sodium Nitrate, Sodium Nitrite, Sodium Propionate, Sodium Salt of Methyl-p-hydroxy Benzoic Acid, Sodium Salt of Propyl-p-hydroxy Benzoic Acid, Sodium Sorbate, Sodium Sulphite, Sodium Dithionite, Sorbic Acid, *Sulphurous* Acid, and Tartaric Acid.

Natural food antimicrobials compounds can be also considered preservatives as well. Examples of these compounds are Lacto-antimicrobials, Ovo-antimicrobials, phyto-antimicrobials, bactor-antimicrobials, acid-antimicrobials, Milieu-antimicrobials. Details of these chemicals can be found in: A. S. Naidu "Natural Food Antimicrobial Systems" Also: "Naturally occurring antimicrobials in food", Council for Agricultural Science and Technology.

Natural antimicrobial compounds can be used such as berberine and many other antimicrobial or antiviral compounds from natural sources from plants or microorganisms. The crude plant materials containing the antimicrobial compounds can be used directly. These materials can be solids or powders that can be added into liquid as part of the sparging solution.

Likewise, the topical antimicrobials can be also used for the same purpose. The fact that they have already been used for human topical use, their safety for household use should be in the safe side.

Details of these chemicals can be found in Daryl S. Paulson "Handbook of Topical Antimicrobials: Industrial Applications in Consumer Products and Pharmaceuticals".

Likewise, the cosmetics preservatives can be also used for the same purpose. The fact that they have already been used for human cosmetics use, their safety for household use should be in the safe side. Details of these chemicals can be found in "Preservatives for Cosmetics", First and Third Edition".

As used herein, the term "air transferring device" refers to any device capable of moving air in a manner that allows for efficient mixing of the air in the enclosed space. Such devices include air pumps, air compressors, fans, or blowers. The devices may require a power source such as electricity (including AC and DC or solar technology), or may be manually operated. The device may transfer air by means of adding positive pressure ("pumping") or by exerting negative pressure ("sucking") in order to cause air to flow in the desired fashion.

A used herein, the term "conduit" refers to a means for transferring air, such as a hoses, tubing (plastic e.g., tygon or rubber). pipes (metal or PVC), or ductwork (metal or foil coated) flexible).

As used herein, the term "contaminated environmental space air" refers to air that contains a level of at least one pollutant which is higher than the level desired, or greater than the level recommended by an environmental health standard, within the environment space of an individual breathing such air.

As used herein, the term "ornamental plants" refers to growing or cut flowers, e.g., roses, potted flowering plants, landscape shrubbery, or trees.

As used herein, the term "drying agent(s): refers to agents that are commonly used to remove moisture from the organic solvents. Common drying agents include anhydrous calcium chloride, anhydrous calcium sulfate, magnesium sulfate, molecular sieves (4 Å), potassium carbonate and anhydrous sodium sulfate.

As used herein, "humidity controlling agents" refer to agents that are added to an aqueous or non-aqueous liquid to control air humidity. Such agents include inorganic salts such as sodium chloride, and the like and water soluble liquids such as glycerin, ethylene glycol and the like. Such agents result in an aqueous solution that may be hygroscopic (water absorbing) to highly humid air, while water releasing to dry air/

As used herein, the term "super water absorbent" refers to super absorbent polymers (SAP) such as sodium polyacrylate, and polyacrylamides. A SAP can absorb as much as 500 times its weight in water.

As used herein, the terms "biocide", "disinfectant" and "sterilant" refers to one or more additives that can be added to the absorbable media to kill, control, or prevent mites, bacteria and their spores, fungi, molds, mildew and viruses, prolonging the service time of the media and stop the spread or distribution of pathogens that cause infectious diseases, such as tuberculosis or influenza. Examples include antimicrobial agents, bactericides, fungicides, and anti-viral agents, such as bleach, quaternary ammonium salts, ortho-phthalaldehyde and the like.

Table 1 below provides a non-limiting list of such materials which are included within the meaning of this term.

TABLE 1

Example Disinfectants/Biocides/Sterilants (Antimicrobial Agents)

| Antimicrobial Agent Compound Class | Examples | Notes |
|---|---|---|
| Phenols | phenol, cresols, 4-ethylphenol, xylenols, triclosan, fentichlor, dichlorophane | Can be directly mixed with sparging solution. Aqueous can be modified to increase solubility by using a surfactant or a co-solvent. |
| Organic and inorganic acids | Acetic acid, propionic acid, benzoic acid, sorbic acid, ester of p-hydroxybenzoic acid, salicylic acid, undecenoic acid, methyl vanillate, dehyxoacetic acid | Can be directly mixed with sparging solution. If low solubility, (organic acid esters), use a surfactant or a co-solvent. |
| Aromatic diamidines | Diamidine, propamidine, dibromopropamidine | Water soluble so can be added to aqueous sparging solution. |
| Biguanides | Chlorhexidine, alexidine, polymeric biguanides | Water soluble so can be added to aqueous sparging solution. |
| Surface-active agents: Cationic agents | QACs: Cetrimide, domiphen bromide, benzethonium chloride, benzalkonium chloride, cetylpyridinium chloride | Extremely water soluble so can be added to aqueous sparging solution. |
| Aldehydes | Glutaraldehyde, formaldehyde, o-Phthalaldehyde | Water soluble |
| Antimicrobial dyes | Acridine, acriflavine, aminacrine hydrochloride, proflavine hemisulphate, triphenylmethane dyes, quinones | Water soluble |
| Halogens | Iodine, iodophors, iodoform, hypochlorites, chloramine T, dichloramine T, halazone, halane, bromine | Most of them can be used in aqueous solution. |
| Quinoline and isoquinoline derivatives | Bromochlorodimethylhydantoin, quinolines, isoquinolines | |
| Alcohols | Ethanol, isopropanol, 2-penylethanol, 2-phenoxyethanol, benzyl alcohol, bronopol (2-bromo-2-nitropropane-1,3-diol) | |
| Peroxygens | Hydrogen peroxide, peracetic acid | |
| Chelating agents | EDTA, EGTA, HEDTA, CDTA | Chelate metal ions. |
| Permeabilizers | Poly-L-Lysine, lactoferrin, transferrin | Increase bacteria sensitivity to biocides. |
| Heavy metal derivatives | Copper compounds such as copper sulphate; silver compounds such as silver ion, silver sulfadiazine, nanosilver | Use of metals are as antimicrobials are well known. |
| Anilides | Salicylanilides, tribromsalan, diphenylurea, trichlorocarbanilide | $C_6H_4NH$—R function forms the basis for antimicrobial property. |
| Miscellaneous preservatives | Imidazole derivatives, isothiazolones, hexamine derivatives, triazines, oxazolo-oxaoles, methylene bisthiocyanate, captan, essential oils | Preservatives inhibit microbe growth and also kill microbes at higher concentrations. Essential oils may also provide pleasant smells and they are closely related fragrances. |

TABLE 1-continued

Example Disinfectants/Biocides/Sterilants (Antimicrobial Agents)

| Antimicrobial Agent Compound Class | Examples | Notes |
|---|---|---|
| Vapor-phase disinfectants | Ethylene oxide, formaldehyde release agent (paraformaldehyde, melamine formaldehyde, urea formaldehyde), betapropiolactone, propylene oxide, methyl bromide, glycidaldehyde, ozone, carbon dioxide. | Sparging these liquid/additive mixtures disinfect the air by releasing an aerosol containing the disinfecting agent; excess disinfectant can then be recovered by separate sparging with a liquid/additive mixture which traps such disinfectants. |

As used herein, the terms "bubbling" and "sparging", used interchangeably, refer to the forced movement of air or other gas or mixture of gases, in which one or more contaminants may be dissolved or suspended, through a liquid. The forced movement can be effected through the use of a pump or other air transferring device and is accomplished by submersion of a tube or pipe containing the air, other gas or mixture of gasses, below the surface of the liquid. The tip or outlet point of the tube which extends beneath the surface of the liquid may optionally contain small holes, or be fitted with device to promote dispersion of the case throughout the liquid, such as a diffuser, an air stone, or micro jet nozzles and the like. In the process of bubbling or sparging, the air, gas or mixture of gasses eventually rise to the surface above the liquid where they can be further pumped or can be released into the environmental space.

As used herein, the term "Relative Humidity" is defined as follows:

$$\text{Relative Humidity} = \frac{\text{actual vapor density}}{\text{saturation vapor density}} \times 100\%$$

The most common units for vapor density are $g/m^3$. For example, if the actual vapor density is 10 $g/m^3$ at 20° C. compared to the saturation vapor density at that temperature of 17.3 g/m3, then the relative humidity is:

$$R.H. = \frac{10 \, g/m^3}{17.3 g/m^3} \times 100\% = 57.8\%$$

As used herein, the terms "humidity buffering" refers to a process of moderating changes in relative humidity by exploiting the properties of materials that have the ability to absorb and desorb water vapor to and from surrounding air. This is also referred to as moisture buffering. Humidity buffering methods are utilized for preserving items from damage that could be caused by either excessively moist or dry conditions.

Abbreviations and Acronyms
Å angstrom
A ampere
AC alternating current
by boiling point
CDTA cyclohexylenedinitrilo)tetraacetic acid
CFM cubic feet per minute
COPD chronic obstructive pulmonary disease
DC direct current
EDTA ethylenediaminetetraacetic acid
EGTA ethylene glycol-bis((3-aminoethyl ether)-N,N,N',N'-tetraacetic acid
HEDTA N-(hydroxyethyl)-ethylenediaminetriacetic acid
HVAC heating, ventilation, and air conditioning
Hz hertz
In inch
gal gallon
m meter
min minute
mL milliliter
mm millimeter
MEK methyl ethyl ketone
PAA poly(acrylic acid)
PEG(s) polyethylene glycol(s)
PEO(s) polyethylene oxide(s)
PFR percent formaldehyde reduction
PM 2.5 particulate matter of diameter 2.5 microns or less
PM 0.5 particulate matter of diameter 0.5 microns or less
PVC polyvinyl chloride
ppm part per million
QAC quaternary ammonium compound
qt quart
RH relative humidity
SAP super absorbent powder
Soln solution
SWA Super Water Absorbents
VOC(s) Volatile Organic Compound(s)
Tren tris(2-aminoethyl)amine
TVOC total volatile organic compound(s)
V volt
W watt General Methods Disclosed herein are methods for removal of airborne pollutants either from an enclosed space or outdoor environment, thereby protecting the contents, humans and/or pets occupying the enclosed space or outdoor environment from these pollutants. Pollutants include particulate matter such as PM 2.5, PM 0.5, and other particles, heavy metals and other harmful materials attached to those particles, formaldehyde, volatile organic compounds, bacteria, virus particles. The method includes the removal of such pollutants by passing the air from the enclosed space or outdoor environment through a media, such as a liquid, a liquid mixed with solid, a slurry, or a solid phase that is optional supported with a liquid. The liquid can be water alone, or an aqueous solution of a reagent or scavenger, which removes or chemically reacts with the pollutant, leaving reaction products, if any, in the water. Once having passed through the absorbent media, the purified air is released into the environmental space, via tubing or other conduit so that the quality of the air within the environmental space is improved. The conduit may optionally be designed to direct the purified air directly to an individual that can breathe the air, or diffused into the enclosed space or, if so designed with multiple conduits, into multiple spaces.

The method also optionally includes a means for transferring air from the space to an absorbent media. Air may be transferred by normal flow of air by movement of the device or user/device, or by ambient wind currents, or by an air transferring device. The air transferring device may be an air pump, or fan or an air blower which exerts a positive pressure causing the air to be directed through the absorbent media by tubing, conduit, ducts and the like. Alternatively, the air may be directed through the media in which the air transfer device is arranged to create a negative pressure on the exit port of the media, causing the air to be drawn through the media by a sucking action. In addition, the air may be directed through the media using both a positive and a negative air transferring devices in tandem.

The air transferring device is typically one that is powered by electricity, including AC current common to the region, or DC battery powered, e.g., portable battery packs or batteries from a vehicle or a solar powered battery.

In contrast to typical large HVAC systems, aspects of the present invention provide removal of contaminants and humidity control with less energy use.

In accordance with this aspect, an air pumps capable of capturing the air in the enclosed space and moving it through an exit port can be used as the air transferring device. The exit port can be fitted with tubing, pipes or similar flexible conduit to direct the captured air to the absorbent media. For example, the tubing can be immersed in an absorbent liquid, such as water, water containing another solvent, scavenger or other additive, so the air from the exit port passes through the liquid. To improve the effectiveness of absorption of the pollutants in the exit port air, the tube may be fitted with a diffusing device such as air stone so that smaller air bubbles are formed. The agitation of the air in the water promotes mixing of the liquid absorbent media, but further agitation or stirring can also be applied to maximize contact of the exit port air with all components of the absorbent media. Thus the pollutants are collected in the absorbable media and depending on the presence of additional scavenging agents, are further neutralized, chelated, entrained, or chemically transformed.

When two non-miscible liquids are used as the absorbent media, the pollutant is removed into one or both liquids. In one embodiment when two non-miscible liquids are used, one being water and the other a hydrophobic liquid such as silicone or vegetable oil, the pollutant is selectively extracted from the air by absorption into the water layer and the oily layer being less dense than water lays on top of the water layer, acting as a barrier preventing the water trapped pollutants for re-entering the enclosed space. The ratio of oily to aqueous liquids can be adjusted. Another advantage of this system is that when the upper layer is an oil, evaporation of water is reduced, particularly when the device is not in use. An additional advantage is that retention of water soluble contaminants such as formaldehyde is improved.

Combinations of one or more aqueous or non-aqueous liquids can also be used, either combined in one vessel or can used individually in different vessels, e.g., one vessel can have water and another vessel can oil. The selection of liquids and number of containers provides for customizing systems depending on the contaminants present. Furthermore, the disposal and replenishment of each liquid can be performed on an as-needed basis.

In other embodiments, the exit port air can be directed through a cartridge filter which contains the absorbent media in the form of a solid matrix, slurry or liquid pre-absorbed onto the media. One such example is a cartridge filter which contains a solid support such as cotton, and the cotton contains pre-absorbed water up to the saturation point. Alternatively, another cartridge can be containing a drying agent, such as anhydrous calcium chloride, sodium sulfate and the like.

Alternatively, the cartridge filter with a solid phase can be the first media the air goes through followed by the liquid sparging solution.

Aspects of the invention include the use of additives, some of which are scavengers or neutralizers that facilitate the removal of contaminants from the environmental space air.

The choice of additive is made based on the particular contaminant that is to be removed. For example, for the removal of formaldehyde, one may add different additives known to be formaldehyde scavengers (such as dimedone or 2,4-dinitrophenylhydrazine (DNPH)) into the sparging solution. Adding a disinfectant such as hydrogen peroxide or peracid into the sparging solution, one may control viruses, bacterial or mold spores. Such additives, or scavengers can be added in a sparging solution as needed. In some aspects of the invention, multiple vessels may be used, each of which may contain a different absorbent liquid.

Other additives include microbial materials that are known to be beneficial for the degradation of contaminants. These include *Alcanivorax borkumensis, Thalassolituus oleivorans* (1) which are known to digest hydrocarbons such as found in crude oil; White-rot fungi, known to degrade pentachlorophenol, trinitrotoluene, trichloroethylene, cyanide and polyaromatic hydrocarbons; enzymes. e.g., amylases, lipases, proteases, which are known to catalyze the hydrolysis of starches into sugars, the hydrolysis of fats, and hydrolysis of peptides, respectively.

For references to such additives, see (1) Meet_the_Microbes_Eating_the_Gulf_Oil_Spill.pdf (© 2010 Scientific American)

(2) "Pesticide Decontamination and Detoxification" Edited by Jay J. Gan, Peter C. Zhu, Steven D. Aust, and Ann T. Lemley, American Chemical Society. Chapter 1. Page 3.

(3) Richard B. Silverman, The Organic Chemistry of Enzyme-catalyzed Reactions, 2nd ed. (London, England: Academic Press, 2002), page 1.

(4) Svendsen A (2000). "Lipase protein engineering". Biochim Biophys Acta 1543 (2): 223-228. doi:10.1016/ 50167-4838(00)00239-9. PMID 11150608.

It is to be understood that some additives may be mutually incompatible and cannot be placed in the same vessel together. Examples of such would be mixing of acids and bases such as sulfuric acid and an amine, strong oxidants and reducible materials such as permanganate and glycol. Those skilled in the art would recognize such incompatible additives and not make such combinations. On the other hand, an advantageous aspect of the invention is that such normally incompatible additives can be placed in separate vessels when more than one vessel is used in a sparging system, such as in FIGS. 10-15, and because of their different properties, enhance the utility of the system for the removal of wide variety of contaminants.

Another incompatible example is microorganisms, used to degrade pollutants, and disinfectants. However, one aspect of the present disclosure includes a system of two containers, e.g., A and B: Container A can contain bacteria for digesting petroleum oil and similar chemicals such as gasoline etc., and Container B can have disinfectants to kill bacteria.

Some volatile compounds can be also added to absorbent liquid as additives for achieving similar or different functions. For example, bleach can be used for air disinfection; others such as fragrances, e.g., vanilla can be added. Release of the desirable disinfectant or fragrance can be controlled by sparging through the absorbent liquid that contains substances (additives) of low solubility in the absorbent liquid, and/or with a vapor pressure sufficient to cause release into the environmental space. The amount of disinfectant can be controlled to the desirable level by varying the properties of the absorbent liquid.

Some additives can also serve as indicators, i.e., to alert a user of that absorbent liquid has lost effectiveness, and should be changed or replenished. For example, the presence of formaldehyde can be detected colorimetrically using 2,4-diintrophenyydrazine (DNPH).

Some additives, such as salt, may be suspended in the absorbent liquid in excess beyond saturation in order to extend the absorbing liquid (sparging solution) use time, allowing the prolonged use of the sparging solutions and avoiding frequent replenishment of the sparging solution. Through a simple calculation, one may determine the amount of extra solid NaCl that is needed to be added to a sparging solution in order to achieve certain length of time for effective humidity control. For example, the solubility of NaCl is 359 g/L or 35.9 g/100 mL, thus if 359 g excess solid NaCl is added to a NaCl saturated solution, this excess NaCl will be able to take 1 liter of water from the air moisture to form saturated NaCl solution, which can continue take water from moist air.

Figure 12:
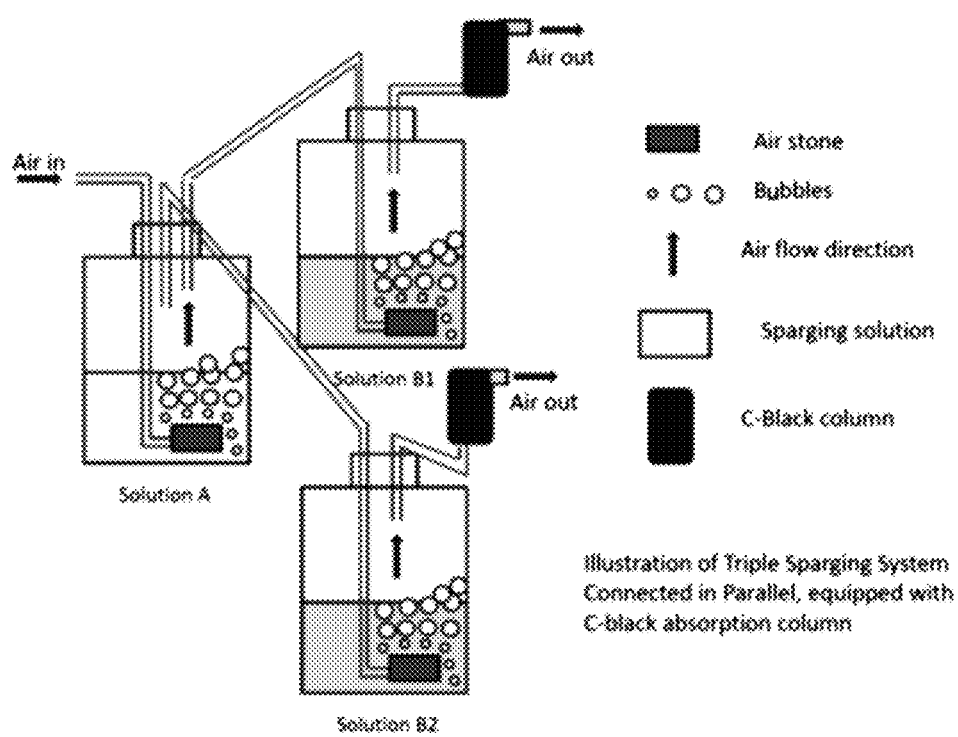
FIG. 12 represents an aspect of the invention which is a variation of that shown in FIG. 11, namely, the exit ports from the vessels containing solution B1 and B2 are fitted with a Carbon-black adsorption column.
Figure 13:
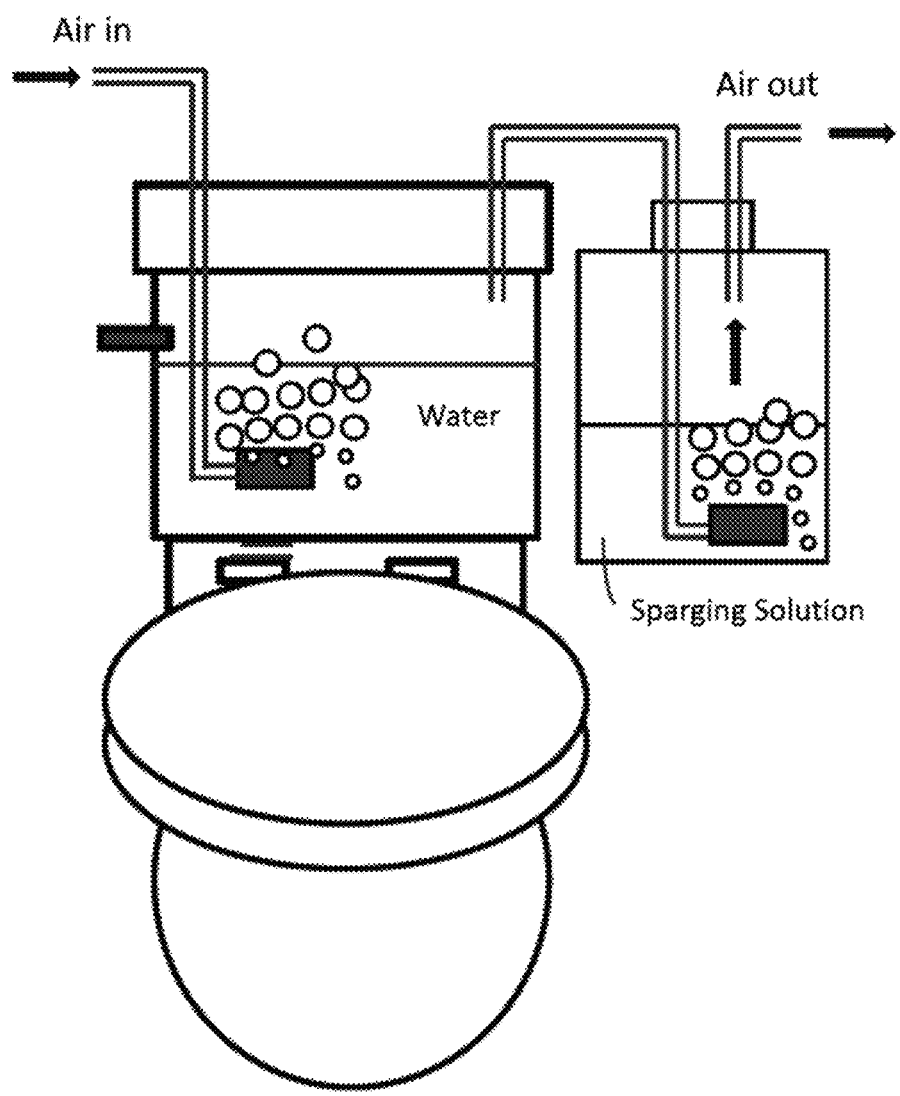
FIG. 13 depicts an aspect of the invention which a further embodiment of the aspect shown in FIG. 9, where the first vessel is the water tank of a common toilet or commode. Environmental air is pumped through the water in the toilet tank and is then pumped to an optional second vessel containing a second absorbent liquid. The purified air exits from the vessel(s) from the "Air out" port shown. In this aspect, the first vessel, being a toilet tank, also provides an inlet for adding more liquid when the level of liquid is depleted, and a means for emptying the vessel by flushing the toilet.
Figure 14:
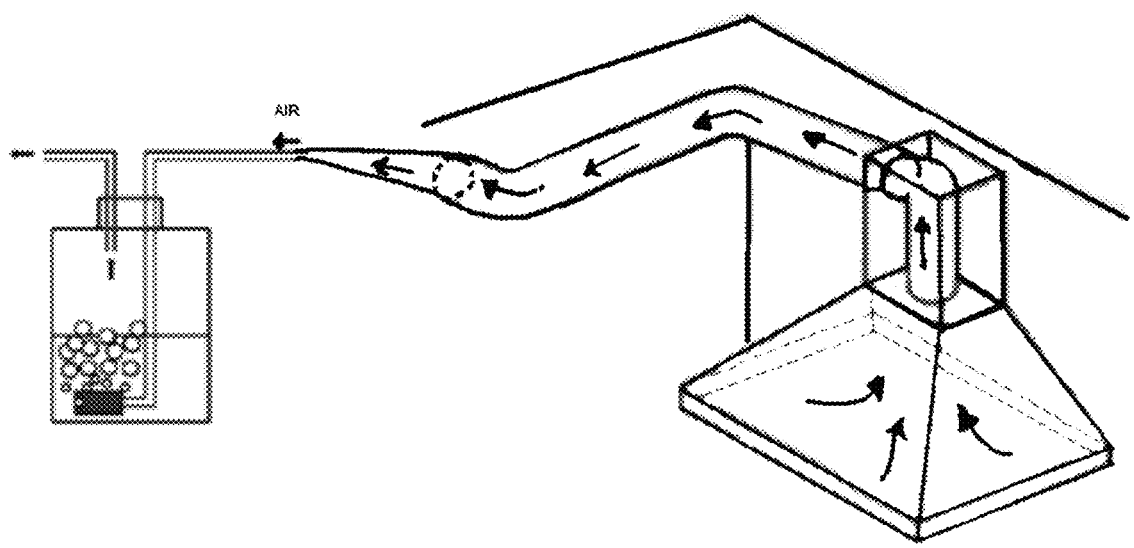
FIG. 14 represents an aspect of the invention in which the air flow is driven by the exhaust fan of a typical kitchen range hood. The purified air may optionally be directed back into the exhaust ductwork of the range hood.
Figure 15:
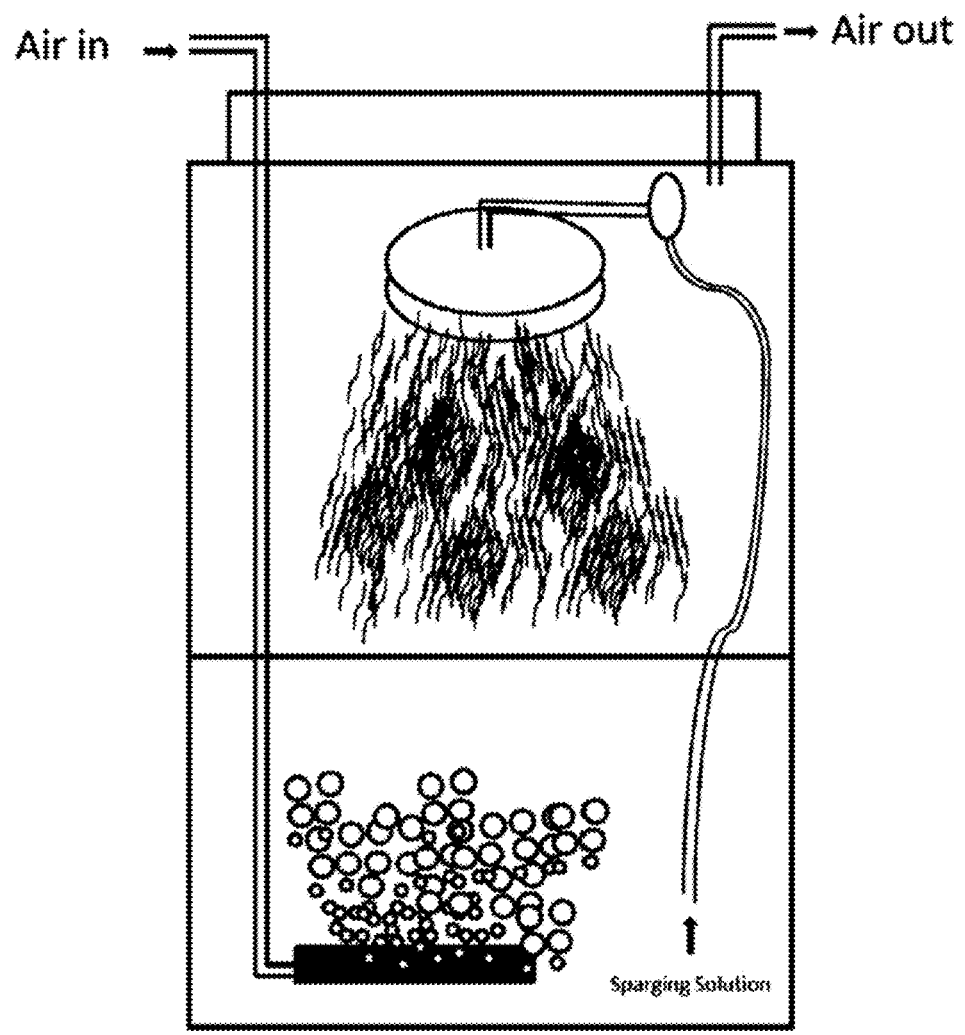
FIG. 15 represents an aspect of the invention in which the vessel is additionally fitted with an air washing spray in the upper portion of the chamber above the absorbent liquid.

It is also understood that in addition to vessels containing absorbent liquids, the sparging systems may have additional features to enhance the removal of contaminants such as a solid phase filter, as shown in FIG. 12, or an air washing shower (i.e. scrubber) as shown in FIG. 15. An advantage of this aspect of the present invention is that by prior sparging of air in the systems as shown, less contaminant burden falls on the solid phase filters thereby increasing their useful life.

Methods described for the neutralization of o-phthaladehyde can be applied to the neutralization of formaldehyde. Such methods and additives are described in the following patents:

U.S. Pat. No. 7,145,043 Non-Hazardous oxidative neutralization of aldehydes

U.S. Pat. No. 7,041,220 Method of use for aldehyde removal

U.S. Pat. No. 7,012,163 Non-hazardous oxidative neutralization of aldehydes

U.S. Pat. No. 6,776,904 Device and method of use for aldehyde removal

U.S. Pat. No. 6,670,520 Reductive amination for aldehyde neutralization

U.S. Pat. No. 6,531,634 Non-hazardous oxidative neutralization of aldehydes

Such methods are also reviewed in a chapter that summarizes OPA neutralization. [See the "Pesticide Decontamination and Detoxification", Edited by Jay J. Gan, Peter C. Zhu, Steven D. Aust, and Ann T. Lemley, American Chemical Society.], Chemical Detoxifying Neutralization of ortho-Phthalaldehyde: Seeking the "Greenest"

Reactions of formaldehyde are also reviewed by Walker (J. Frederic Walker, "Formaldehyde" 2nd (1953) and 3rd Ed (1975). and refs therein. American Chemical Society, Monograph Series).

Also see Peter C. Zhu, Charles G. Roberts, and, Jiejun Wu, Pesticide Decontamination and Detoxification, Chapter 7, pp 85-97, ACS Symposium Series, Vol. 863, Jul. 23, 2009; American Chemical Society, for related methods.

Other scavengers that can be used in absorbable media include starches, ammonia and simple amino acids that react with formaldehyde, such as cyclic dextrans, glycine etc.

When absorbable media contains water, the continual passage of air can deplete the amount of water and potentially reduce the effectiveness of the media. To prevent or mitigate this possibility, hydrogels which have a high affinity for water may be used in the absorbable media. Among these are Super Water Absorbents (SWA) such as polyacrylic acid (PAA), polyacrylamide, polyvinyl alcohol (PVA) and polyacrylonitrile. Circulation of the air in the enclosed space, e.g., by ventilating fans, etc., help maintain the moisture level on the absorbable media.

As a way to prolong the time that an absorbable media is useful and kill the microorganisms from the air, a biocide in an effective amount can be added to the media to prevent or destroy any bacteria, virus, mold, or fungus that may form the media. Such biocides include such bactericides known in the art such as bleach, quaternary ammonium salts, or ortho-phthaldehyde. Antimicrobial agents such as berberine from plants or the plant materials that contain antimicrobial agents can be also used.

Detergents, i.e., surfactants can optionally be added to the absorbable media as a way to improve the efficiency of the media. The particular detergent to be used will depend on the characteristic of the pollutants to be removed, and rely on the properties of the detergent to enhance the solubility of the pollutant in the media, e.g., by formation of micelles, and thereby reduce volatility of the pollutant, lowering the likelihood that it would be re-released into the enclosed space. Cationic (including quaternary ammonium salts), anionic, zwitterionic, or non-ionic detergents, (e.g., polyethylene glycols, (PEGs) and polyethylene oxides (PEOs) can be used.

Additives to liquid absorbable media can be supplied in small pre-measured packages and mixed with the liquid (aqueous) media, which is then placed in the reservoir. As the effectiveness of the liquid absorbable media diminishes, it may be removed and replaced. Removal can be accomplished manually, or by an arrangement of discharge valves and outlet tubing. Similarly, replacement of the liquid can be done manually or through an arrangement of inlet tubing and valves. The valves (either inlet or outlet) can be operated manually, or through an automatic mechanism, for example, activated when the level of liquid absorbable media reaches a prescribed minimum level, or the when the concentration of either additive or absorbed pollutant reaches a specific level.

It is advantageous when using water-containing absorbent media to maintain the enclosed space within a desired range of relative humidity, e.g., from 50 to 60% relative humidity. Super Water Absorbents can be used both to remove excess water from overly humid air, but pre-moistened SWAs can also release water to excessively dry air. Monitoring the humidity can be done by metering, or through color indicators, and moisture levels can be adjusted periodically to maintain this humidity, either by manual addition or automatically, for example by a relay valve which detects a decrease in the water levels of a reservoir tank.

The absorbent media included in the invention is situated in such a way as to be exposed to as much of the air containing pollutants as possible. This includes both solid and liquid media.

In one aspect of the invention, air from the enclosed space is pumped into a reservoir containing water. Water acts as the absorbent medium, and is particularly effect in absorbing from the air, pollutants with a high affinity for water, such as formaldehyde and ozone. The contact of the air with from the water may be enhanced if the air is dispersed into small bubbles by means of diffusing device, although such a device is not a requirement. An example of a diffusing device is an air stone. The action of the bubbling the air from the enclosed space into the water reservoir is also known as sparging. Efficient sparging takes place as measured by the time required to remove an amount of pollutant per volume of the air treated.

In another aspect of the invention, air from the outdoor environment is passed collected by suction from an air transfer device or by natural air currents and allowed to pass through an absorbent medium, such as a cartridge filter containing a solid or solid treated with a liquid, or a reservoir containing a liquid such as water or water containing a reagent or scavenger.

In another aspect of the invention, a solvent can be added to the water to improve the affinity and efficiency of the sparging. For example, addition of a water soluble solvent such as methyl ethyl ketone, or t-butyl alcohol, to improve the hydrophobicity of the liquid media, can improve efficiency in removal of volatile organic compounds, especially those containing hydrophobic hydrocarbons such as hexanes, benzene, toluene, xylenes, gasoline, kerosene and the like.

In another aspect of the invention, solvents other than water can be used as the absorbent media to suit the characteristics of the pollutant to be removed. Such solvents include methyl ethyl ketone, t-butyl alcohol, isopropyl alcohol, acetone and the like.

In another embodiment of the invention, a non-water miscible liquid can be added to the water, as a means to improve the retention of pollutants that have been absorbed into the water. Such liquids include vegetable oils, silicone oils, polyethylene glycols, and the like.

Aspects of the invention include the use of absorbent media whose chemical properties are matched to the specific physical properties of a pollutant to be removed, in order to facilitate its removal.

For example, organic scavengers or chelating agents can be added to the absorbent media to facilitate the removal of specific pollutants. For example, chelating agents that form complexes with metal ions can be used to used metal ion-containing particulates. In addition, chemical reagents can be added to the absorbent media which change the composition of the pollutant. Examples such reagents include enzymes, oxidizing agents, such as bleach, hydrogen peroxide, nitrates, permanganates and many others, reducing agents such as Vitamin C, tannins, polyphenols and the like, and neutralizing agents such as bicarbonate, amines or sulfites to remove acidic pollutants, or ammonium chloride, sulfuric acid, and the like to remove basic pollutants, or pH buffering agents to remove either acidic or basic pollutants. Depending on the pollutants that are present, a customized blend of mutually compatible reagents may be used in a single absorbable medium, or in sequence; i.e., allowing the air to flow from one to the next; in order to effect complete removal.

Additional examples of oxidation or reducing agents, known to those skilled in the art can be found from "Handbook of Reagents for Organic Synthesis, Oxidizing and Reducing Agents" Steven D. Burke (Editor), Rick L. Danheiser (Editor) ISBN: 978-0-471-97926-5 564 pages July 1999.

Aspects of the invention also include the use of absorbent media whose physical characteristics are matched to the specific physical properties of a pollutant in order to facilitate its removal. For example, in one such embodiment, pollutants can be removed because of its high solubility in particular solvent used as the absorbent media. In another example, pollutants may be absorbed by physical entrapment or entrainment on the surface of certain solid absorbent media such as molecular sieves, silica gel, carbon and the like.

Another embodiment of this aspect is the placement of living organisms, e.g., plants or animals in the vessel with properties that can neutralize a pollutant. For example, one plant material that exists in an aqueous environment and has an affinity for the contaminants to be removed is water lettuce. Similarly, sparging of the environmental air into a vessel containing a liquid that is suitable as an aquatic environment for fish can be used; the fish naturally produce urea, ammonia and other amines which can react with formaldehyde and remove it from the environmental air.

In still another embodiment, a UV light may be installed inside the sparging vessel to provide added functionality, namely: (1) to catalyze reactions that can be used for decomposing some hazardous compounds. One example is the oxidation of formaldehyde with oxygen, catalyzed with $TiO_2$ and UV light; and (2) to disinfect the air (by disinfecting the air in the vessel.)

Using a UV light in conjunction with this apparatus has several advantages. As air is transferred into the vessel, the UV light can be specifically directed to the air in such a way that disinfection will take place. In addition, the UV light used in this matter will be contained the walls of the vessel, blocking hazardous exposure to individuals in the same area.

ASPECTS OF THE INVENTION

Formaldehyde Removal

It has been shown that formaldehyde is readily removed by sparging the contaminated air through a vessel containing water as the absorbent liquid. Even in the absence of formaldehyde neutralizers or scavengers as additives, water is an effective solvent for formaldehyde because of its high solubility in water. The high formaldehyde solubility is due to the hydration of formaldehyde in water. Formaldehyde forms methylene diol or hydrated formaldehyde. Methylene diol, compared to formaldehyde itself, is much more stable in water and gaseous formaldehyde in the air is highly volatile.

While sparging of the environmental air contaminated with formaldehyde can be achieved using a single vessel containing a formaldehyde-absorbent liquid, such as water, an aspect of the present includes a dual sparging solution system using two vessels or reservoirs for removal or trapping formaldehyde. This allows for more thorough removal because after the first sparging solution, the remaining formaldehyde vapor exiting the first vessel is again spared through the second vessel solution to effectively significantly reduce the formaldehyde concentration.

The humidity control as provided in one aspect of the present invention is of added benefit for the application of the invention for air cleaning, such as for formaldehyde removal. Without humidity control the use of water alone as absorbent liquid, while removing formaldehyde could raise the humidity level of the environmental space to unacceptable levels. In addition, sparging into a vessel containing water in the absence of a humidity modifier additive will produce purified, but highly humid air, raising the humidity of the remove and requiring frequent replenishing or replacement of the water in the vessel. However, through the use of other absorbent liquids such as saturated sodium chloride or glycerin, the formaldehyde is removed and humidity remains in a desired level. Many other materials can serve the same purpose as drying agents, including most inorganic salts and super water absorbents (SWA). Details can be found from the book: "Desiccants and humectants (Chemical technology review)" 1973 by Ronald W James.

A feature of this aspect is that the level of the absorbent liquid is maintained throughout the bubbling process, as compared to the use of water alone.

In another aspect of the invention, the absorbent liquid can be pure water (only) which is frequently changed and discarded as pollutants are removed. This would be especially for initial use when the air is highly contaminated or dirty, such as found in new construction, where the air is heavily polluted; (2) use formulated liquid which lasts for long time due to evaporation control. Once the air is has reached a lower level of contamination, the absorbent liquid can be changed to one which does not readily evaporate and can control humidity.

Examples of sparging systems for removal of formaldehyde appear below and in the Figures.

Removal of Other Air-Born Contaminants

Other aspects of the invention are direct to the removing other undesirable and/or toxic materials from the air. Such other contaminants include volatile organic compounds, nitrogen oxides ($NiO_x$), ozone, carbon monoxide, sulfur dioxide, heavy metals, in either elemental or as compounds, such as lead or mercury, radon, ammonia (gas), exhaust emissions from internal combustion engines, power plants or industrial manufacturing operations. A further non-limiting summary of such contaminants appear in Table 2 below.

TABLE 2

Other Common Air Pollutants and Their Properties, Useful for Removal by Sparging.

| Air Pollutant | Properties of Note |
|---|---|
| Ozone | Water solubility = 1.05 g/L (at −0° C.); decomposes in water over time, rate of decomposition can be increased by increasing pH. |
| Particulate Matter | Sparging removes particles by suspending them in water without the use of HEPA filters; surfactants can assist in capturing hydrophobic materials in water. |
| Nitrogen Oxides | A pH buffer or mild base can be used to neutralize the e acid reaction products of $NO_2$ with water |
| Sulfur dioxide | Water soluble; a pH buffer of mild base can be used to neutralized the acidic product. |
| Lead, metallic or compounds | Common pollutant is tetraethyl lead (($CH_3CH_2)_4Pb$) from combustion of leaded gasoline. sparingly soluble in water but highly soluble in organic solvents/oils. |
| Mercury, elemental or compounds | Mercury compounds and elemental mercury have high vapor pressures at room temperature and are lipid soluble. |
| TVOC | 1. Aromatic hydrocarbons: Benzene, toluene, Ethylbenzene, m/p-Xylene, o-Xylene, n-propylbenzene, 1,2,4-trimethylbenzene, 1,3,5-trimethylbenzene, 2-ethyltoluene, Styrene, Naphthalene, 4-Phenylcyclohexene, 2. Aliphatic hydrocarbons: n-Hexane, n-heptane, n-octane, n-nonane, n-decane, n-undecane, n-dodecane, n-tridecane, n-tetradecane, n-pentadecane, n-hexadecane, 2-methylpentane, 3-methylpentane, 1-octene, 1-decene 3. Cycloalkanes Methylcyclopentane, cyclohexane, methylcyclohexane 4. Terpenes 3-Carene, alpha-pinene, beta-pinene, limonene 5. Alcohols 2-Propanol, 1-butanol, 2-ethyl-1-hexanol 6. Glycols/glycoethers 2-Methoxyethanol, 2-ethoxyethanol, 2-butoxyethanol, 2-butoxyethoxyethanol 7. Aldehydes Formaldehyde, Butanal, Pentanal, Hexanal, Nonanal, Benzaldehyde 8. Ketones Methyl ethyl ketone, Methyl isobutyl ketone, Cyclohexanone, Acetophenone 9. Halocarbons Trichloroethene, Tetrachloroethene, 1,1,1-Trichloroethane, 1,4-Dichlorobenzene 10. Carboxylic Acids Acetic acid, Formic Acid, Hexanoic acid 11. Esters Ethyl acetate, Butyl acetate, isopropyl acetate, 2-Ethoxyethyl acetate, TXIB (Texanol isobutyrate) 12. Other compounds 2-Pentylfuran, THF (Tetrahydrofuran) |

TABLE 2-continued

Other Common Air Pollutants and Their Properties, Useful for Removal by Sparging.

| Air Pollutant | Properties of Note |
|---|---|
| Ammonia | Ammonia is highly soluble in water and forms salts with acids. Dilute to medium concentrated acids can be used to capture ammonia from air and to convert the salts for disposal. Ammonia is also a strong formaldehyde neutralizer and the vapor has been used to fumigate houses with heavy formaldehyde pollution. Removal of the excess ammonia from the air can be accomplished by sparging technology. |
| Radon | Radon is a noble gas, chemically not active. Radon is sparingly soluble in water, and is appreciably more soluble in organic liquids than in water. Thus an effecting sparging solution for radon can be a liquid such as vegetable oil, in place of or in addition to, water. |
| Tobacco Smoke | A complex mixture of particulates and VOCs. One component, nicotine, is soluble in water and nonpolar solvents; some of the other alkaloid compounds are either water or organic solvent soluble. Tar dissolves in organic solvent. |
| Carbon Monoxide | Can be trapped by forming chelates or complexes in aqueous or organic solutions. |

Included in the category of air-born pollutants is tobacco smoke; its removal reduces or eliminates exposure of individuals to "second hand smoke". Systems as described in the examples below and the figures provide for methods that can be used in places where users are not able to prevent such smoke from occurring such as hotel rooms, public areas such as airports, train stations, offices and restrooms. The rooms may be subjected to air cleaning using the sparging method described in order to remove smoke that may be present. The air in multiple rooms of a house, hotel or office building can be purified simultaneously by a single, central apparatus, with appropriate conduits for collecting and returning the air to each room. The most harmful chemicals in tobacco smoke can be removed easily by current technology. Nicotine is both water soluble and also oil soluble. A few other chemicals, like nicotine, belong to alkaloids, can be easily retained by acidic liquid after forming salts. These salts are no longer volatile which are otherwise very difficult to scavenge. Other harmful components such as carbon monoxide, cyanide can be also removed after passing a liquid phase.

Another aspect of the invention is to control foul odors by sparging, for example in restrooms or workplaces where such odors occur. By using an absorbent liquid, containing an oxidant or other neutralizer, removal of known odor causing vapors such as sulfur-containing organics, hydrogen sulfide, thiols and the like can be readily removed. Additives that employ complex or precipitation technology can be combined either in series or together with the oxidants to reduce the volatility of the stench-causing compound sand make them to stay in absorbent liquid. For example, an additive would be the use of simple metal ions such as $Cu^{2+}$, which forms stable precipitates or complexes with many undesirable contaminants containing thiol (—SH) groups. These S-containing compounds are often degraded protein materials causing bad order and smell. One may also use vegetable oil as the absorbent liquid in order to dissolve hydrophobic compounds, e.g., thiols.

Application of this aspect of the invention can be applied to the removal of contaminants found inside an automobile passenger compartment. Contaminants found therein may be formaldehyde, plasticizers or other volatile organic compounds, often as a result of prolonged exposure of the automobile to sunlight which excessively heats the interior. The sparging systems described above and in the Examples and Figures can be used to remove these contaminants; electricity can be provided by the automobile battery/generator from either the DC port (Cigarette lighter") or by direct wiring to the electrical system of the car.

An application of the described technology also includes providing fresh air for partially enclosed spaces found in other vehicles, such as child cribs, sleeping tents, small toy vehicles such as children's carts, as well as wheel chairs or mobile carts for non-ambulatory individuals.

For sparging the air in such situations, a vessel or vessels can be placed inside the vehicle itself, or inside the trunk, or attached to the body of the vehicle. to the partial. One embodiment of this aspect includes the use of the wind-shied washer reservoir as the vessel containing the absorbent liquid, to which is placed compatible liquids such as water based or glycerin based liquids.

Pathogen and Disease Control

Aspects of the present invention are also useful for disease control or prevention, by for air cleaning to remove and/or disinfect pathogens such as bacteria, fungi, viruses, pollen or other allergens. Depending on the additives, sparging of the air through the absorbent liquid can be effective in removing such pathogens. As a result, exposure to contaminated air is reduced, both to humans and pets, but also to objects such as food, paper products, textiles and wood, susceptible to attack by such pathogens, These applications are not limited to homes and can be expanded easily to hospitals (important for modern medical challenges), public places and manufacturing industries. Schools, offices, airports can be also included. Flu and TB prevention/control are important two important diseases/changes people face every day.

Concentrated NaCl is bacteriostatic and is a safe and economical method to control microorganism growth in the air when used by the methods described herein. For example, bacteria such as TB, SARS' viruses such as influenza, and mold will not be able to grow in the concentrated sodium chloride solution. This is extremely important for control of seasonal viruses such as flu. Aspects of the current invention provides a method for reduce exposures of individuals to common and seasonal illnesses such as flu. and because it is passive in nature, does not require precise timing such as flu shots, in order to be effective.

Other disinfectants and antimicrobials can also be used as additives to control or destroy pathogens and undesired organism. General references to such are listed below.

"Antimicrobial Agents", Andre Brisker, American Society for Microbiology, ISBN 1-55581-237-6.

"Disinfection, Sterilization, and preservation", Seymour S. Block, Lippincott Williams & Wilkins, 5th Edition, ISBN 0-683-30740-1.

"Natural Food Antimicrobial Systems", A. S. Naidu, CRC, ISBN 0-8493-2047-X.

"Principles and Practice of Disinfection, Preservation and Sterilization", 3rd edition, A. D. Russell, W. B. Hugo and G. A. J. Ayliffe, Blackwell Science.

Common disinfectants include bleach, hydrogen peroxide, hydrogen peroxide adducts, strong acids and their diluted solution, strong bases and their diluted solutions, ortho-phthalaldehyde (OPA), glutaraldehyde, formaldehyde, povidone-iodine (PVP-I), iodine, iodophores, quaternary ammonium compounds (Quats or QACs), polyquats such as polyquaternium-42, quaternium-15, chlorhexidine gluconate, alcohols (ethanol, isopropyl alcohol), perchlorometaxylenol, and triclosan.

Preservatives, e.g., for cosmetics, can also be used as described in the following references:

"Preservatives for Cosmetics" D. D. Steinberg, Cosmetics & Toiletries® magazine, ISBN 0-931710-54-5.

"Handbook of Topical Antimicrobials", Barnyl S. Paulson, Marcel Dekker, ISBN 0-8247-0788-5.

Most preservatives inhibit microorganism growth and kill microorganisms at higher concentration. Examples of these preservatives include benzoic acid, benzyl alcohol, bronopol, chlorhexidine, chloroxylenol, diazolidinyl urea, dichlorobenzyl alcohol, DMDM hydantoin, imidazolidinyl urea, isothiazolinones, parabens, phenylethyl alcohol, phenoxyethanol and its mixtures, quaternium-15, sorbic acid and salts, dimethyl hydroxymethyl pyrazole, iodopropynyl butylcarbamate, methyldibromo glutaronitrile, polyquaternium-42, sodium hydroxymethylglycinate, benzalkonium chloride, benzethonium chloride, chloroacetamide, chlorobutanol, dimethoxane, dimethyl oxazolidine, 7-ethyl bicyclooxazolidine, hexetidine, mercury compounds, ortho phenylphenol, polyaminopropyl biguanide, polymethoxy bicyclic oxazolidine, sodium borate and boric acid, sodium iodate, concentrated salts, sugars or other compounds.

Natural preservatives or antimicrobials are also well known and can be useful additives for controlling pathogens and other undesirable organisms; see "Naturally Occurring Antimicrobials in Food" CAST (Council for Agricultural Science and Technology), ISBN 1-887383-12-3. Examples of these include organic acids antimicrobials such as acetic acid, benzoic acid, lactic acid, propionic acid etc., antimicrobial plant substances such as those from garlic and onion, phenolic compounds in spices and herbs, hops, coffee, tea, Kola and Cocoa, phytoalexins, polypeptide antimicrobials such as berberine, lytic enzymes, peroxidases and oxidases, transferrins, antimicrobial peptides, some essential oils, tea tree extracts or tea tree oil (see. "The Antimicrobial Properties of Essential Oils", Pauline Hili, Winter Press, 2001, ISBN 1874581835.

In one aspect, the use of disinfectants safely by the sparging methods can be carried out with two vessels. The first vessel can contain the absorbent liquid with a disinfectant, and the second vessel can be used to remove any the disinfectant in order to prevent its entry into the enclosed space.

Biocides/disinfectants/antimicrobials that are non-volatile, such as salts, quats, polyquats, and berberine, can be used as additives to reduce or eliminate the safety risks. The biocides/disinfectants/antimicrobials are used at a level which effectively removes the pollutants from the contaminated air, but at concentration ranges that do add any risk to the occupants. Biocidal/disinfectant/antimicrobial effectiveness can often be achieved using materials generally regarded as safe (GRAS). One such example is the use of NaCl, or table salt, which can be used to inhibit bacterial control effectively in the current invention.

Biocidal action may also be achieved by incorporating a UV light in the apparatus used. For example, a UV light source can be installed so that the absorbent media and/or the air within the vessel is exposed to a sufficient amount of UV light to disinfect the air, and/or catalyze reactions that promote decomposition of hazardous compounds, e.g., the $TiO_2^-$ catalyzed oxidation of formaldehyde.

Outdoor Pollution Control

Another aspect of the present invention provides for methods and apparatuses for removal and providing purified air to a user in an outdoor environmental space.

Sparging systems as described above and in the Examples and Figures can be adapted for portable use for an individual engaged in outdoor activities, such as hiking, walking, or shopping. In addition, portable devices can be used as needed in a safety enclosure in an emergency or life-threatening situation where environmental air contains lethal levels of a pollutant, arising for example, from fires, explosions, industrial accidents including as spills and other toxic substance releases, and the like.

The air transfer device can be an air pump powered by a rechargeable battery. For example, FIGS. 53-56 illustrate sparging systems for use by an individual with special breathing needs because of illness (a patient who is a regular CPAP user) which incorporates and a prep-TLC tank, or a modified prep-TLC tank container filled with ⅔ level water with an air purifier. The system works well and the result, per the user's experience and opinion, was not different from his CPAP device use.

The sparging system with a battery system can be carried for example, on a bicycle motorcycles or the other motorized bikes. Power can be supplied by a bicycle electricity generator or by existing vehicle batteries. Solar energy can also be utilized. Electricity consumption is generally low, particularly if the fresh air supplied is only to the area the surrounding of one's nose. This makes solar power or battery power feasible.

Figure 56:
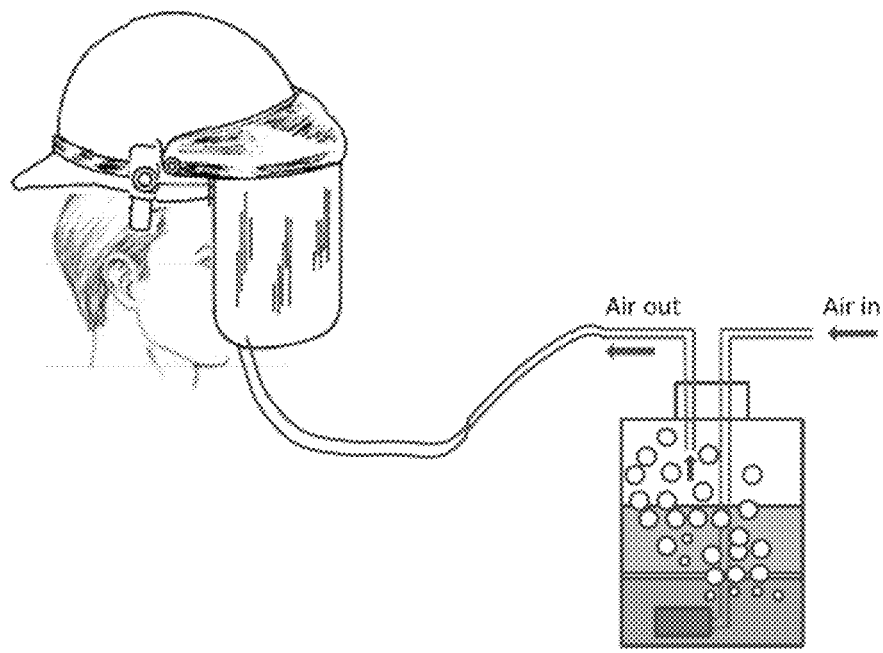
FIG. 56 is an illustration of one aspect of the invention in which the air is purified by sparging the air through a vessel containing an absorbent liquid, and the purified air exiting the vessel is delivered to an individual via tubing connected to an unsealed face mask which can be affixed to the individual's head.

Another aspect of this is illustrated in FIG. 56, with the use of face-shield for motorcycle or bike riding. Some examples are illustrated below. With minor changes, positive air flow from sparging system can be introduced between the face and shield for clean air breath. Other existing motorcycle helmets may be adapted to incorporate the system as well. The gap between the face and the shield (especially on the edges) can be designed/adjusted so the positive flow from the sparging system is good enough to prevent the outside air from coming into for competition.

Removal of Contaminant Mixtures

It is frequently the case that more than one pollutant or contaminant will be present in the environmental airspace in which treatment is desired. In such situations, multiple additives may be necessary for the removal of such pollutants. Table 3 provides a listing of additives that can be placed in the absorbent liquid to remove specific pollutants. Where removal of more than one contaminant is desired, multiple vessels may be used, in series or parallel, (as shown in the FIGS. 8-12) each charged with the absorbent liquid/ additive mixture as appropriate.

TABLE 3

Additive mixtures

| Airborne Contaminants | Suggested Sparging Solution System(s) in One or More Vessels (liquid + additive mixture) |
|---|---|
| Formaldehyde + dusts | 1. Water or NaCl solution<br>2. Water with an amine |
| Formaldehyde + Ozone | 1. Water or NaCl solution<br>2. Water with a reducing agent |
| Formaldehyde + cigarette smoke | Water and a non-polar solvent |
| Formaldehyde, high TVOC | Water and a non-polar solvent |
| Cigarette smoke | Water and a non-polar solvent |
| Cigarette smoke + cooking smell | Water and a non-polar solvent |
| Flu viruses + dusts | 1. Concentrated NaCl<br>2. Diluted bleach<br>3. Lysol solution |
| Flu viruses + TB | 1. Concentrated NaCl<br>2. Diluted bleach |
| Lead dust + $Et_4Pb$ + $Pb^{2+}$ | Water, vegetable oil, Option: EDTA |
| Ammonia + TVOC | Acidic water and a non-polar solvent |
| Gasoline vapors + high Pb pollution | Water with EDTA and a non-polar solvent |
| Nitrogen oxides, $SO_3$, $SO_2$, and ammonia | Acidic solution with another basic solution |
| Formaldehyde + flu virus | 1. Bleach (or chlorhexidine) solution;<br>2. NaCl solution |
| Formaldehyde + Ozone | 1. Bleach<br>2. Reducing agent such as ascorbic acid |
| Formldehyde + heavy metal ions | Aqueous gallocatechol |
| Unknown microorganism (potential biohazard) | Bleach |
| High level formaldehyde (new rooms) | $NH_3$ fumigation followed by sparging with HCl solution to recover excess $NH_3$ from air. |
| House with mold smell (after long vacation) | 1. Bleach solution (with concentrated NaCl)<br>2. Concentrated NaCl solution |
| A wet room with mold | 1. Bleach solution<br>2. Concentrated glycerin |

Humidity Control

Recently, there has been an interest in the field of building science and architecture in using humidity buffering as a passive indoor climate control, thus reducing the need for air conditioning and ventilation. An example is silica gel which is used to buffer relative humidity inside museum display cases, packaged clothing, electronics and anything that might be damaged by condensation, or in the example of museum display cases, being too low an RH (relative humidity) as the silica will help protect the objects displayed from mechanical damage due to shrinking and growing with RH changes. There is also a particular need to control humidity in geographic areas subject to seasonal variations of climate, resulting in uncomfortable conditions for occupants, and for conditions which may result in spoilage of food or goods from spoilage or insect damage.

An aspect of the current invention provides a method for humidity buffering. in and enclosed space, thus reducing the need for air conditioning and ventilation. The relative humidity is controlled by taking advantage of the hygroscopic property of an aqueous solution containing a humidity controlling agent. In practice, the humidity can be controlled in several ways depending on the ambient relative humidity of the environmental air and the exact composition of the aqueous solution/controlling agent. For example, a glycerin/water solution may serve as drying purpose if a high concentration of glycerin is used. This drying power will diminish if enough water is captured by the sparging system. Conversely, if the glycerin concentration is low enough or if the environment is dry enough, a glycerin/water solution can return water to the air using the same device Thus, a desired humidity can be reached and maintained by the sparging apparatus, by selecting the appropriate water/glycerin/additive combination.

The use of sodium chloride solution especially a more concentrated sodium chloride solution has several advantages. Sodium chloride is inexpensive, non-toxic, household chemical which is easily available. The humidity range from the sparging technology falls in the comfortable range for human beings and many other animals including pets (40-70% for human). This makes saturated sodium chloride a very practical liquid for humidity control, in that one may conveniently dispose the used sparging solution.

By use of the aspects taught in the present invention, humidity can be controlled so that the comfort range is achieved. For example, in FIG. 24, a sparging system is illustrated in which two vessels are utilized, each of which containing a separate liquid. Solution A for example may contain a solution such as sat sodium chloride which will remove moisture from the air and Solution B may contain just water which will add humidity to the air. It would be expected that feedback from sensors for humidity can be coupled either mechanically or electronically to a switch as illustrated, directing air to one vessel or the other as needed, in order to maintain relative humidity in the desired range. Other absorbent liquids, such as glycerin, or an absorbent liquid additive mixture can be used for the control of humidity of the enclosed spaces, as shown in the examples below.

Temperature Control

In another aspect of the invention, the temperature of the air being treated can be controlled by controlling the temperature of the absorbent liquid, and the volume of liquid used in the vessel. In one embodiment of this aspect, the vessel can be a large reservoir of water that originates from natural sources, such as lakes, rivers, streams or ground water which are normally found at a constant temperature, usually cooler than summer air temperatures found in environmental spaces and warmer than that found in winter. The sparging of the air through such a large reservoir of water will result in heat exchange from the air to the water, cooling the air in summer, and warming it in winter. This can take place concomitantly with removal of pollutants from the same air.

The water from these sources can be used as the absorbent liquid, either alone or in combination with additives as described above. Disposal of the liquid used in the treatment in which contaminants may be present can be returned to the original source either directly, or after treatment by conventional means is required to remove undesirable contaminants captured from the air. In one embodiment, the contaminated water can be stored in temporary holding tanks which can be decontaminated by additives, flocculants and the like, or be exposed to sunlight, or added UV light, to bring about chemical degradation of the contaminants, with the optional addition of catalysts such as titanium dioxide. The holding tank may also function as a heat exchanger, allowing the contents to reach ambient temperatures; this embodiment would be effective in regions where the day/night temperature range differs significantly.

Ground water sources are typically wells, which are at a depth below the earth surface to provide water of a desirable constant temperature, typically in the range of from about 10° C. to about 25° C.

It is anticipated in this aspect that the conduits, pumping equipment, and vessels will be insulated so that the temperature of the water will be kept within the desirable range.

It is also anticipated that as before, the addition of additive would be beneficial for controlling evaporation of the liquid, growth of unwanted bacteria or fungi.

Specific Aspects

The disclosed compositions and methods include at least the following aspects:

Aspect 1. A method for the removal of one or more contaminants from contaminated environmental space air, while optionally and independently improving the temperature and level of relative humidity of the air, comprising the steps of
  a) passing the contaminated environmental space air, by means of an air transferring device, through an absorbent liquid medium contained in a vessel, wherein the temperature and hygroscopicity of the liquid medium are optionally and independently controlled, said liquid medium optionally containing one or more additives capable of interacting with the contaminants;
  b) allowing the contaminated environmental space air to come in contact with the absorbent liquid medium and optional additives such that one or more contaminants from the contaminated environmental space air are transferred into the absorbent liquid medium and are thereby removed to produce decontaminated environmental space air, and the temperature and humidity of the air are optionally and independently improved;
  c) releasing the decontaminated environmental space air from the vessel into the environmental space, thereby lowering the level of one or more contaminants in the environmental space air, and optionally and independently improving the temperature and humidity of the environmental space air.

Aspect 2. A method according to Aspect 1 wherein
  the absorbent liquid medium is one or more liquids selected from the group consisting of water, an aliphatic alcohol, an aliphatic polyol, an aliphatic ketone, vegetable oil, animal fat, a polyethylene glycol, and silicone oil, and mixtures thereof; and
  the optional additives are selected from the group consisting of an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, glycerin, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant.

Aspect 3. The method of Aspect 2, wherein the absorbent liquid is selected from water, glycerin and mixtures thereof, the optional additive is sodium chloride, and one of the contaminants is selected from formaldehyde, volatile organic compounds, and bacteria.

Aspect 4. A method for the removal of one or more contaminants from environmental space air comprising the steps of
  a) passing contaminated environmental space air, by means of an air transferring device, sequentially through n independently selected absorbent liquid media contained in m vessels, wherein m and n are independently 1, 2, 3, or 4; each liquid medium containing one or more optional additives, such that the air entering each vessel comes in direct contact with each of the independently selected absorbent liquid media and optional additives; and wherein said vessels are connected in series such that the purified air exiting each vessel is transferred into the next vessel in the series, up to the nth vessel; and
  b) releasing the decontaminated environmental space air from the nth vessel into the environment space.

Aspect 5. A method for the removal of one or more contaminants from environmental air comprising the steps of
  a) passing contaminated environmental space air by means of an air transferring device, through independently selected absorbent liquid media, each liquid medium contained in an array of three vessels, and optionally additionally comprising one or more additives;
  b) allowing the environmental space air entering each vessel to come in direct contact with the independently selected liquid medium and optional additive in each vessel; wherein said vessels are arranged such that the air exiting the first vessel is divided and enters the second and third vessel simultaneously;
  c) transferring one or more contaminants from the contaminated environmental space air to one or more of the absorbent liquid media resulting in purified environmental space air;
  d) releasing the purified air from the second and third vessel into the environment, thereby lowering the concentration of contaminants contained in the environmental space air.

Aspect 6. The method according to Aspect 1, wherein the contaminated environmental space air is within an enclosed space.

Aspect 7. The method of according to Aspect 1, wherein the contaminated environmental air is in outdoor environmental space and the decontaminated environmental air is transferred, by a conduit attached to the vessel, directly to an individual by means of an individual breathing apparatus.

Aspect 8. The method to according to Aspect 1, wherein the air transferring device is an air pump, a fan or a blower.

Aspect 9: The method according to Aspect 1, wherein the absorbent liquid medium is selected from the group consisting of a liquid, a liquid absorbed into a solid material, a solid/liquid mixture, a slurry, and a solid phase that is supported with a liquid.

Aspect 10. The method of Aspect 9, wherein the absorbent liquid medium is a solid/liquid mixture, wherein the solid is selected from carbon black (activated charcoal), silica gel, alumina, absorbent clay, and sea sand.

Aspect 11. The method according to Aspect 1, wherein the absorbent liquid media is a liquid selected from the group consisting of water, a homogeneous mixture of water and a solvent, a heterogeneous mixture of water and a non-water soluble liquid.

Aspect 12. The method according to Aspect 1, wherein the liquid absorbent media is a liquid absorbed into a solid material, and said solid material is selected from cotton, linen, and paper.

Aspect 13. The method according to Aspect 1, wherein the air transferring device passes the contaminated air through one or more liquid absorbent media by means of a diffuser.

Aspect 14. The method according to Aspect 13, wherein the diffuser is an air stone.

Aspect 15. The method according to Aspect 1 wherein the temperature of the liquid medium is controlled from about 15° C. to about 30° C.

Aspect 16. The method of Aspect 1, wherein the liquid medium is water supplied by ground water having constant temperature.

Aspect 17. The method of Aspect 1, wherein the wherein the hygroscopicity is controlled by an additive selected from a super water absorbent or sodium chloride, and the humidity is improved to a range of between about 45% and about 65% relative humidity.

Aspect 18. The method of Aspect 4, wherein the first absorbent liquid medium is 5% aqueous acidic sodium dihydrogen phosphate and 5% aqueous basic sodium dihydrogen phosphate, and the second absorbent liquid medium is vegetable oil.

Aspect 19. The method of Aspect 1, wherein the liquid absorbent medium is a biphasic mixture of 5% aqueous acidic sodium dihydrogen phosphate, 5% aqueous basic sodium dihydrogen phosphate, and vegetable oil.

Aspect 20. The method of Aspect 1, wherein the environmental space is an enclosed space used for storage of food, medical specimens, or ornamental plants.

Aspect 21. An apparatus for the removal of contaminants from the environmental space air, said apparatus comprising
  a) an air transferring device with intake and output ports, such that when the device is operated, the intake port collects environmental space air which is transferred to the output port;
  b) a vessel containing an absorbent liquid medium, and one or more optional additives, and optionally having one or more ports for addition and/or removal of the liquid medium;
  c) one or more conduits for transferring air from the output port of the air transferring device to the vessel containing the absorbent liquid medium, said conduits positioned so that the air from the output port of the air transferring device enters the vessel below the level of the absorbent liquid contained in the vessel and then passes through the medium becoming purified air; and
  d) a means for the release of the purified air from the vessel to the environmental space, wherein said means is
    one or more conduits leading from above the liquid medium in the vessel to the environmental space, or one or more openings in the vessel, above the liquid medium in the vessel, to the environmental space.

Aspect 22. The apparatus of Aspect 21 wherein the absorbent liquid is selected from the group consisting of water, glycerin, an aliphatic alcohol, an aliphatic polyol, an aliphatic ketone, vegetable oil, animal fat, a polyethylene glycol, and silicone oil; and optionally containing one or more additives independently selected from the group consisting of an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, glycerin, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant.

Aspect 23. An apparatus for the removal of contaminants from the environmental space air, said apparatus comprising
  a. an air pump with intake and output ports for the environmental space air;
  b. three vessels, each fitted with sealed intake and output ports, each vessel containing an independently selected absorbent liquid medium, and, optionally added to each liquid, one or more independently selected neutralizing additives;
  c. a first conduit connected to from output port of the pump to the input port of a first vessel, said conduit positioned so that the air from the pump enters the input port of the first vessel below the level of the absorbent liquid; and
  d. a second conduit connected to the first vessel output port to the second vessel input port, said conduit positioned so that the output air from the first vessel enters the input port of the second vessel below the level of the absorbent liquid medium in the second vessel;
  e. a third conduit connected to the second vessel output port, said conduit positioned so that the air from the second vessel enters the intake port of the third vessel below the level of the absorbent liquid;
  f. a fourth conduit connected to the third vessel output port in the series and to the environment space, said conduit positioned above the level of the absorbent liquid medium.

Aspect 24. The apparatus according to Aspect 23, in which one or more of the vessels have optional ports for addition and/or removal of the liquid absorbent medium contained therein.

Aspect 25. The apparatus according to Aspect 21 in which the vessel is a toilet tank.

Aspect 26. The apparatus according to Aspect 21 in which the air transferring device acts by exerting negative pressure, by drawing the air through the output port of the vessel.

Aspect 27. An apparatus for the removal of contaminants from the environmental space air, said apparatus comprising
  a. a vessel fitted with sealed intake and output ports, containing an absorbent liquid medium, and to which is optionally added to the liquid, one or more additives;
  b. a first conduit for transferring environmental space air to the intake port of the vessel, said conduit positioned so that the environmental space air enters the intake port of the vessel below the level of the absorbent liquid contained in the vessel; and
  c. a second conduit from the vessel output port to the environment space, said conduit positioned above the level of the absorbent liquid in the vessel; and
  d. one or more an air pumps, positioned so that contaminated air from the environmental space is captured and moves through the first conduit, then through the liquid absorbent media in the vessel, and subsequently through the second conduit where it is released into the environmental space.

Aspect 28. The apparatus of Aspect 27, comprising one air pump, said pump positioned so as to exert positive pressure from its output port into the first conduit.

Aspect 29. The apparatus of Aspect 27, comprising one air pump, said pump positioned so as to exert negative pressure from its intake port into the second conduit.

Aspect 30. The apparatus of Aspect 27 comprising two air pumps, a first pump one positioned so as to exert positive pressure from its output port into the first conduit, and a second pump positioned so as to exert negative pressure from its intake port into the second conduit.

EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Examples of methods included in the invention are shown below for illustrative purposes and should not be construed as limiting the invention in any way.

General Methods

Model enclosed space systems were created to test the efficacy of various air transferring devices and absorbent media. Air pumps were selected from 1) battery powered Tetra Whisper 100 Air Pump, 2) Marina Battery Operated Air Pump (Wal-Mart), 3) Fluval Q2 Air Pump 4 W AC power, 4) Airpod Air Pump with Back-up System, and 5) RS Electrical, Model RS-180, 220-240V, 3 W. If sparging air stones were not supplied with the pump, stones of varying sizes are obtained from a pet supply retail store.

System 1

In a 1-2 gal cylindrical glass jar with 20-30 cm open top, is placed an air pump as described above and a pollutant monitoring meter. The outlet of air from the air pump is attached to tube with a sparging air stone. The air stone and tube assemble is fitted into the inlet port of a sealed flask containing an absorbent liquid media and optional additive(s). A second tube is placed above the liquid in the flask, and extends through a sealed outlet port of the flask. The top of the jar is sealed with parafilm. Sparging of the air into the liquid absorbable media is initiated; the air in jar is circulated through the absorbent liquid; and levels of pollutants (as shown by the meter) are allowed to normalize. Pollutants are then added all at once through the parafilm, and the level of pollutant is measured at intervals until no significant change was observed.

System 2

Figure 58:
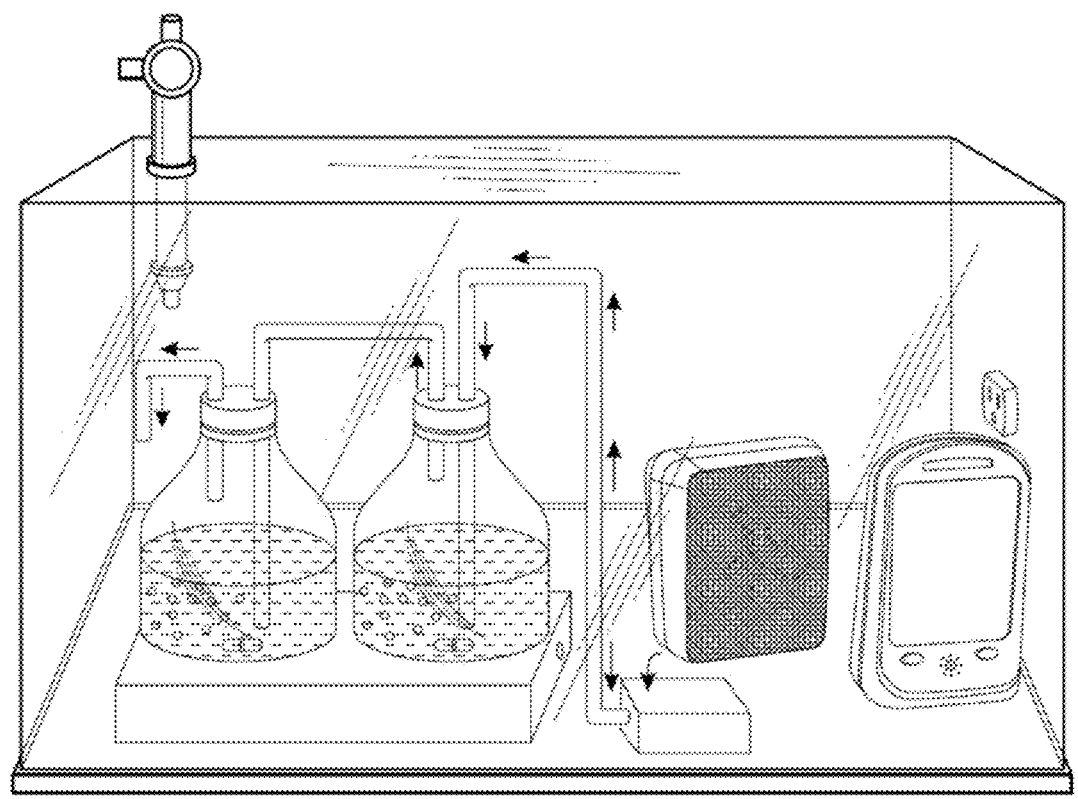
FIG. 58 is a depiction of the testing apparatus as described in the General Methods section as System 3. The apparatus is an aquarium tank adapted to contain a pump, two vessels containing absorbent media, connected by tubing in series, and an air pump. In addition, a meter to measure air purity and a small fan are placed inside the tank. The tank is covered. A port on the top of the tank allows for introduction of test materials.

A 50 or 100 gal fish tank, depending on the scale of the experiment to be conducted, is fitted with an aquarium fish tank oxygenation air pump [RS, Model RS-180]. The pump is fitted with tubing and an air stone at the outlet port and immersed in the test liquid absorbable media contained in a flask. The tank was adapted to allow power cord access and a port into which pollutants could be injected. The tank is covered to exclude outside air. Sparging of the tank air into the liquid absorbable media is initiated, and the level of pollutant and humidity is monitored with meters inside the tank. After the system is normalized, pollutants are added all at once via the exterior port, and the level of pollutant measured at intervals until no significant change is observed. An illustration of this System is shown in FIG. 58.

System 3

A tank (10 gallons or 37.85 liters) is modified from a fish tank. A plastic board is cut and fashioned as the tank lid (on the top). The lid can be opened and closed with good sealing (air-tight). A port at the top of the tank allows introduction of air pollutants. All equipment (pump, flasks, fan and meters) is placed inside the tank and can be controlled outside when the tank is closed. The pump as in System 2 is fitted with tubing and an air stone at the outlet port and immersed into a sequential arrangement of two test liquid absorbable media, each contained in a separate flask. The air passes into the first flask so that it enters below the level of the liquid, then exits from a tube attached to the top of the first flask and is then directed to a second flask containing another absorbent media liquid, also below the level of the liquid. After passing through the second flask the purified air exits the flask and is discharged back into the tank. The quality of the air within in the tank can measured using a humidity meter, a formaldehyde meter (with readouts for formaldehyde, TVOC and temperature) and a particle meter. A representation of this system is shown in FIG. 58.

System 4

Multiple Holes (¼"-½") are drilled at 1-2' intervals in the top shoulder portion of a 10 L Nalgene® 8-0400-07 LDPE Polyethylene Carboy with spigot. The screwcap is removed and the Carboy is charged with an appropriate absorbent liquid media. Into the neck of the Carboy is snugly fitted one end of an adapter tube (approx. 24-32 in long, 2-3 in diameter) and the tube is secured with high performance waterproof tape. To the other end of the adapter tube is inserted the outlet tube, modified as described below, of a Ryobi battery powered blower, (model RY40402). The length of the outlet tube is reduced, but at least 3 inches of tube remain so that it may be inserted firmly into the adapter tube. The tube joints are sealed with additional high performance tape.

Air from the environment is forced by the blower motor through the tube into the absorbent liquid, and exits through the holes provided in the Carboy. The air speed can be controlled manually using the trigger in the blower motor housing. Opening of the spigot allows for removal of spent absorbent liquid, and new liquid is introduced into the Carboy via the adapter tube, by temporarily separating the blower from the adapter tube, pouring the liquid into the Carboy, then reattaching the blower.

Figure 59:
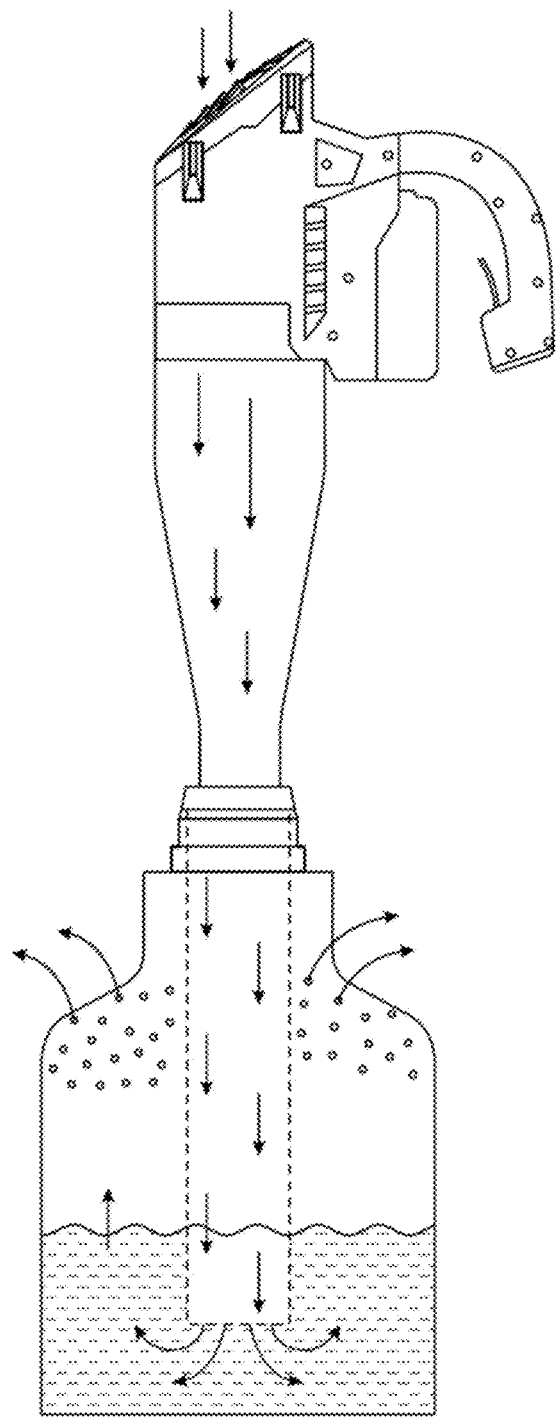
FIG. 59 is a depiction of a prototype apparatus as described in the General Methods section as System 4. The apparatus comprises a battery powered blower in which the exit tube is inserted snugly into a large polyethylene vessel. The vessel contains the liquid absorbent media and the tube is submerged below the level of the liquid. A plurality of holes is drilled around the top of the vessel allowing air to be released.

This apparatus is schematically depicted in FIG. 59.

While a portable blower with a trigger switch was used in this system for proof of principle, it is to be understood that replacement of the power source and switching mechanism devices can be accomplished for convenience and depending on the particular application in which the system is used.

System 5

Figure 60:
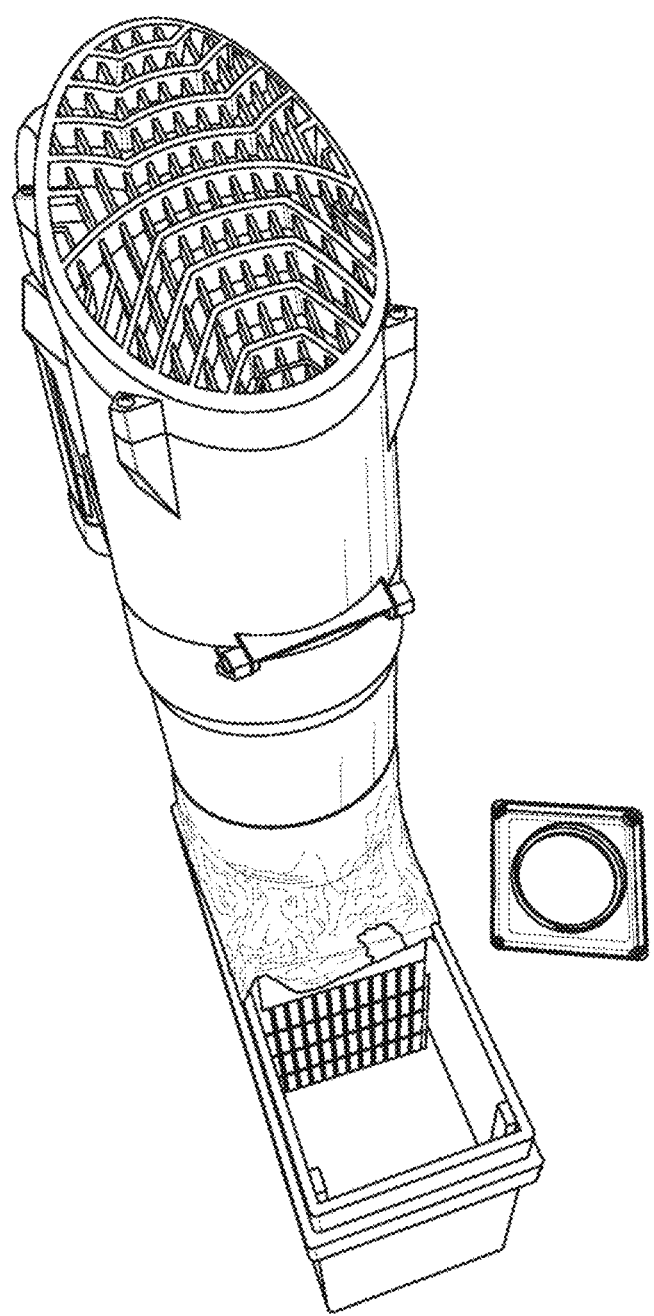
FIG. 60 illustrates a prototype apparatus in which a battery powered blower is inserted snugly into a multi-compartment container containing a liquid absorbent media.
Figure 61:
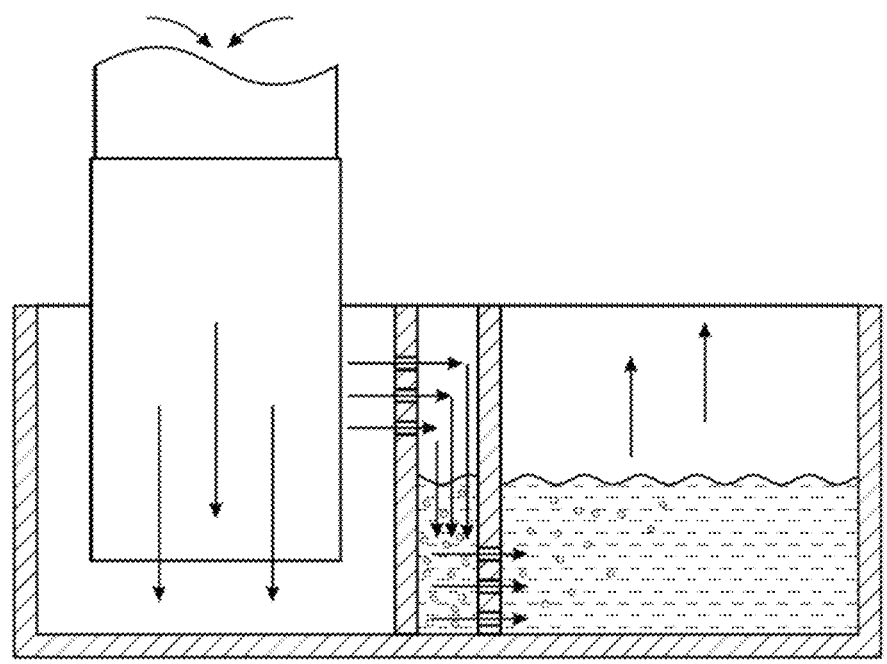
FIG. 61 illustrates a detailed design of the multi-compartment chamber of FIG. 60, showing that the air flows from the blower on the left into the first compartment, then exits through upper holes in the first chamber into both a middle compartment and a third compartment containing the liquid media. The air is forced through the media in the middle compartment through lower holes of the middle chamber, travels into the third chamber coming in further contact with the liquid absorbent media, and then is released through the top of the third compartment.

In place of the Carboy apparatus in System 4, the blower is attached to a first chamber of a double chambered vessel, the chambers separated by double walls set ¼ to ½ apart, to allow airflow between the chambers. The air is blown into the first chamber, then flows by way of holes drilled near the top of the first inner wall, into the space between the second inner wall, and from there is forced though the holes and the bottom of the second wall and into the second chamber containing the absorbent liquid media, and thereby bubbling through media and exits out the open top of the second chamber. incoming air. The apparatus is depicted in FIG. 60, and the vessel with double chambers is schematically represented in FIG. 61.

System 6

Figure 63:
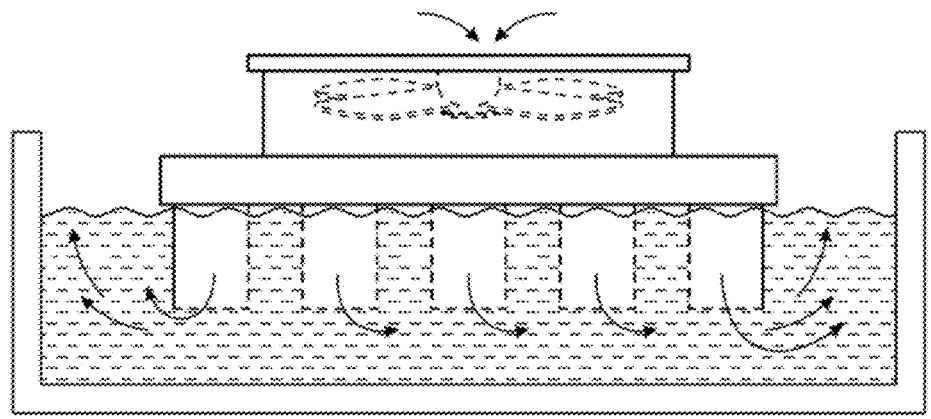
FIG. 63 illustrates a prototype apparatus in which a fan exhaust port is affixed to a block of lightweight material (e.g., polymeric foam) into which a plurality of holes are drilled to allow the exhaust fan air too pass though and into a pan or tank containing the liquid absorbent media. The lightweight material adds buoyancy to the fan/foam block assembly, allowing to float on the surface of the liquid or settle on the bottom of the pan if the level of the liquid decreases sufficiently.

A 12×12 cm, 5 blade axial fan, Sunon model DP100A, P/1123XSL, 110 V, 50/60 Hz, 0.28 amp, available from Sunonwealth Electrical Machine Co. Ltd., is fitted with an adapter block to the exit side of the housing. The adapter block is fashioned from a 1-3 in. thick high density Styrofoam, and trimmed to match the length and width dimensions of the fan housing and into which a 4×5 array ¼ in holes are vertically drilled, and optionally inter connected by a series of ¼ in shafts drilled at right angles. The resulting adapter block allows for the passage of air through the holes, exiting both through the bottom and sides of the adapter. The adapter is affixed to the fan housing with aluminum foil tape. The entire fan/adapter assembly is then allowed to float on the liquid media, such that the depth of the outlet ports is below the level of an absorbent liquid media which is contained in a 4 qt aluminum 9×12 in pan. The fan is energized and environmental air is allowed to flow through the adapter into the liquid. The apparatus is shown schematically in FIG. 63.

System 7

Figure 64:
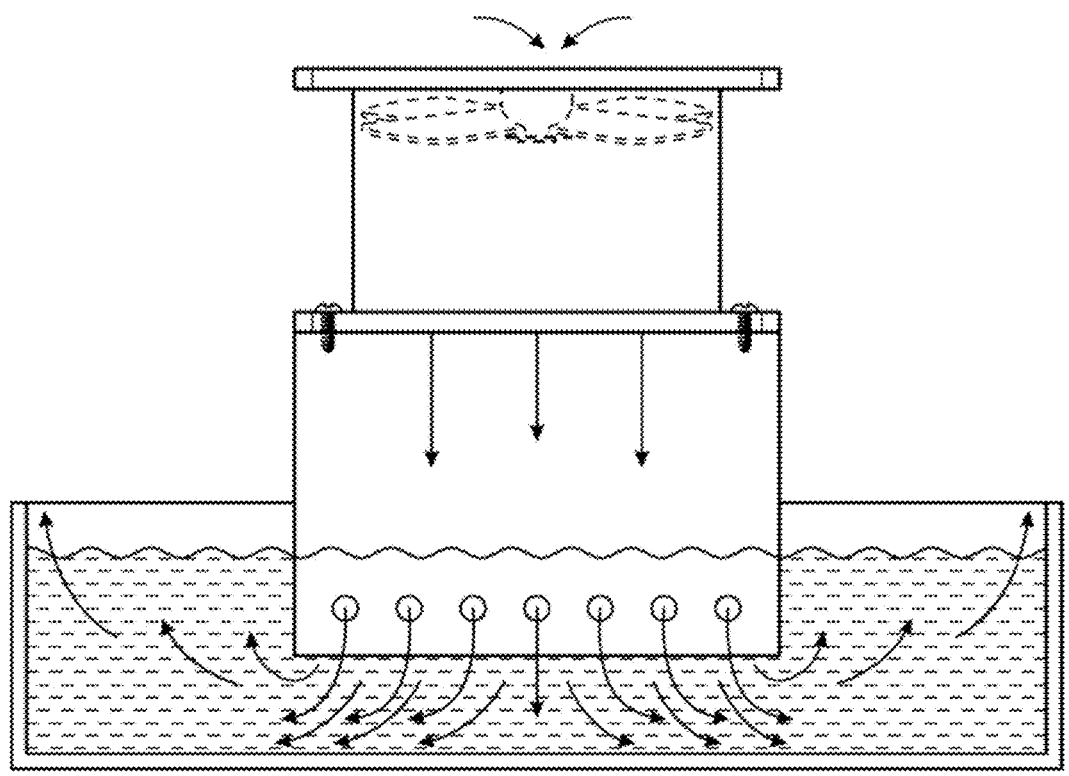
FIG. 64 illustrates a prototype apparatus in which the fan is mounted to box, the top of which is fashioned to receive the exhaust air from the fan. Holes are drilled on the bottom and on the lower portion of the sides of the box. The fan/box assembly is placed in the liquid absorbent media so that the holes are submerged in the liquid.

To an Orion Cooling fan, Model OA180AP-11-1 TB, 110 V, 50/60 Hz, is fastened a four sided wooded box adapter, approx. 4×4 in on each side, with no bottom. The edges are sealed with aluminum tape. Along the bottom edge of each side of the box are drilled approximately nine ¼-⅜ in holes. The entire fan/box adapter assembly is then immersed in an absorbent liquid media contained in a 4 qt aluminum 9×12 in pan. The depth of the assembly can be adjusted as needed, or can be designed to float on the liquid so that the outlet ports are always below the level of the liquid. The fan is energized and environmental air is allowed to flow through the adapter into the liquid. The apparatus is shown schematically in FIG. 64.

System 8

Figure 62:
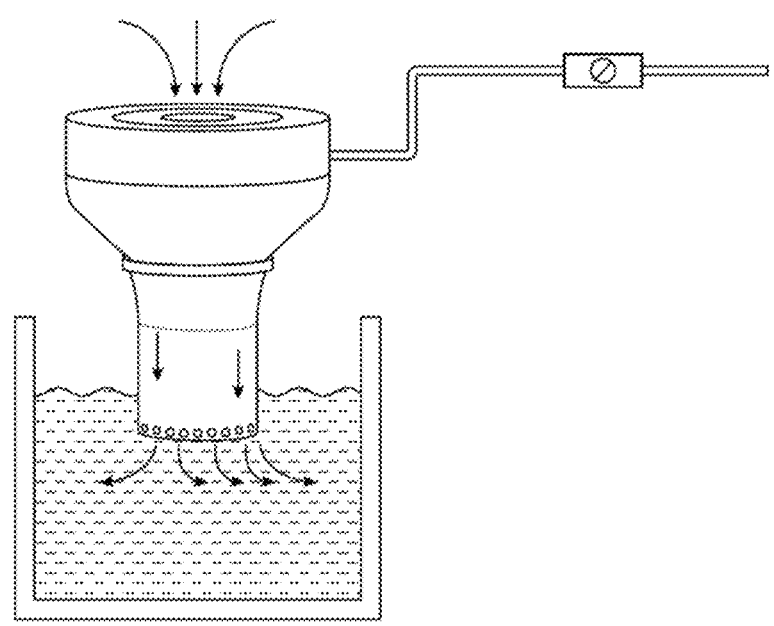
FIG. 62 illustrates a prototype apparatus in which an electrically powered fan is fitted to one end of an outlet tube, and the other end of the tube contains a plurality of holes. The tube portion of the fan/tube assembly is positioned in a vessel containing a liquid absorbent media, such that fan is above the liquid, but the end of the tube and holes extend below the level of the liquid.

To a MaxHyddro IHF6-C 2-speed fan, 115 V 60 Hz 0.97 A 125 W, 440 CFM fitted with a two speed control and on/off switch is affixed (cement or epoxy compound) a 6 in long and 3 in diameter PVC adapter pipe. Holes (114-% in) are drilled along the bottom edge of the pipe at regular (Ih-1 in) intervals. The entire fan/pipe adapter assembly is then immersed at various depths of an absorbent liquid media contained in a cylindrical vessel. The entire assembly is housed within a superstructure frame to maintain it in an upright position, but with access though the top and side for ease of removal of the vessel The fan is energized, and environmental air is allowed to flow through the tube into the liquid. The apparatus is shown schematically in FIG. 62.

EXPERIMENTAL EXAMPLES

Figure 2:
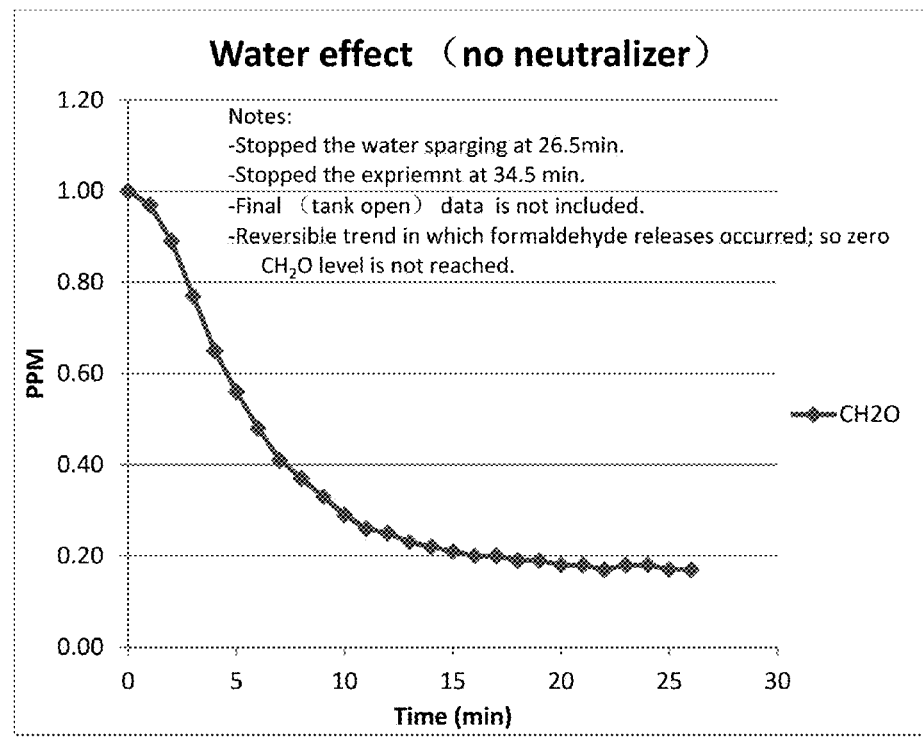

Example 1. Determining the Limits of the Water as Absorbing Media in Removal of Formaldehyde Using System (1 or 2), the limit of the effectiveness in removing formaldehyde by sparging the air in water alone was studied. In two separate runs, starting from an initial concentration of 1.0 ppm formaldehyde, the concentration dropped over a period of 10-12 min reaching a steady concentration of about 0.20 ppm. From this data, it appears that the water/formaldehyde mixture in the absorbent reaches an equilibrium point and that no further formaldehyde can be removed beyond this point. The results are plotted in FIGS. 1 and 2.

Figure 3:
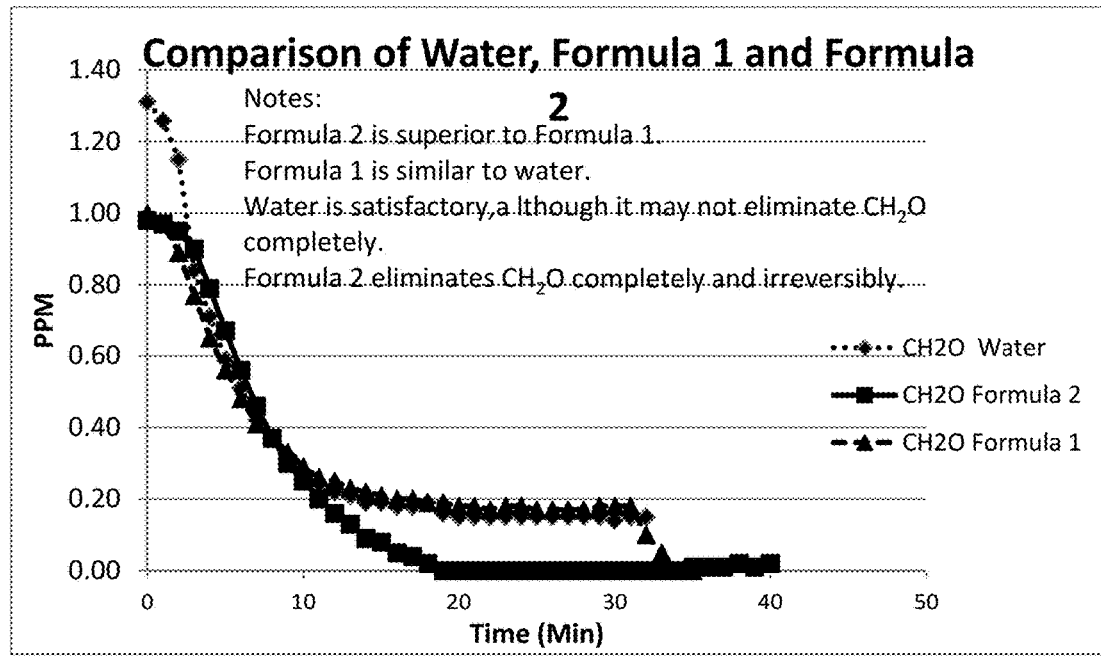
FIG. 3 shows the results of an experimental study comparing the relative effectiveness of using two aqueous solutions, Formula 1 [aqueous solution of 2% (w/w) monosodium glutamate (MSG), 1% (w/w) $NaHCO_3$, 50% (v/v) glycerin]; and Formula 2 [1% aqueous solution of glycine (w/v)] as absorbent liquid to remove formaldehyde from an enclosed space by air sparging using an apparatus similar to that represented by FIG. 6.

Example 2. Comparison of Water, Formula 1 [Aqueous Solution of 2% (w/w) Monosodium Glutamate (MSG), 1% (w/w) $NaHCO_3$, 50% (v/v) Glycerin]; and Formula 2 [1% Aqueous Solution of Glycine (w/v)] in the Removal of Formaldehyde Using System (1 or 2), the relative effectiveness of water, formula 1 and formula 2 as absorbent media to remove formaldehyde was studied starting from an initial concentration of 1.30 ppm, 1.00 ppm, and 1.00 ppm respectively. Using either water or formula 1 as absorbing media, the concentration dropped rapidly in 12 min to about 0.20 ppm and eventually held constant for 33 minutes at 0.18 ppm. Using formula 2, the concentration dropped to 0.10 ppm min after about 15 min, then diminished to near 0 ppm after 19 min. The results are plotted in FIG. 3.

Figure 4:
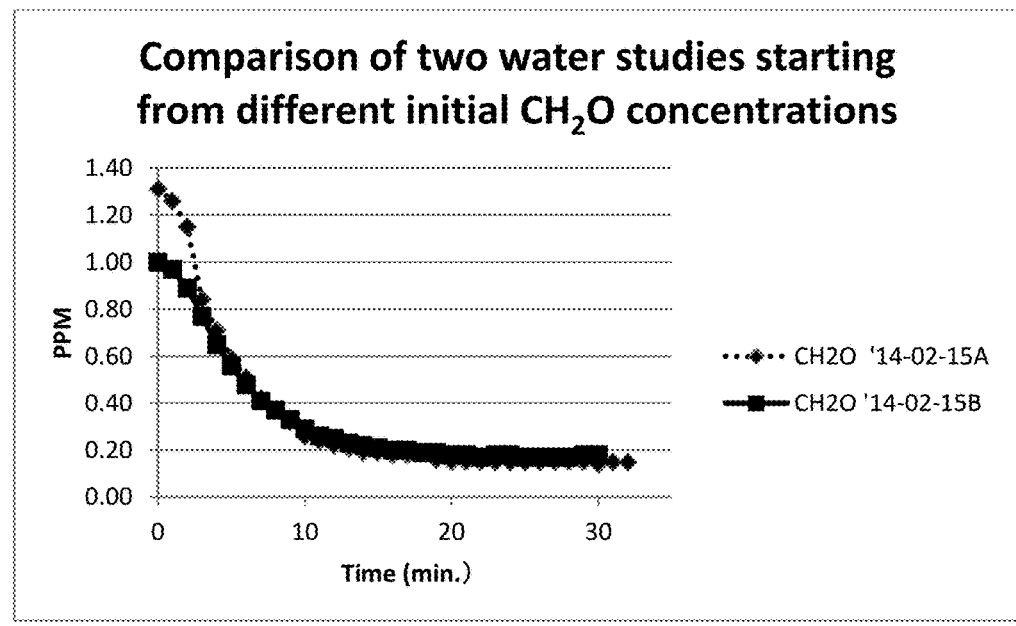
FIG. 4 shows the results of an experimental study comparing the effect of initial formaldehyde concentration on the effectiveness of air sparging to remove formaldehyde from an enclosed space using water as absorbent liquid and an apparatus represented by FIG. 6.

Example 3. Determining the Effect of Initial Concentration on Water Effectiveness as an Absorbing Media Using System (1 or 2), the effect of the initial concentration of formaldehyde on the effectiveness of sparging the air into water alone was studied. Starting from an initial concentration of 1.0 ppm and 1.30 ppm formaldehyde, the concentration dropped over a period of 10-12 min reaching a steady concentration of about 0.20 ppm. From this data, it appears that the water/formaldehyde mixture in the absorbent media reaches an equilibrium point regardless of the initial concentration and that no further formaldehyde is be removed beyond this point. The results are plotted in FIG. 4.

Figure 5:
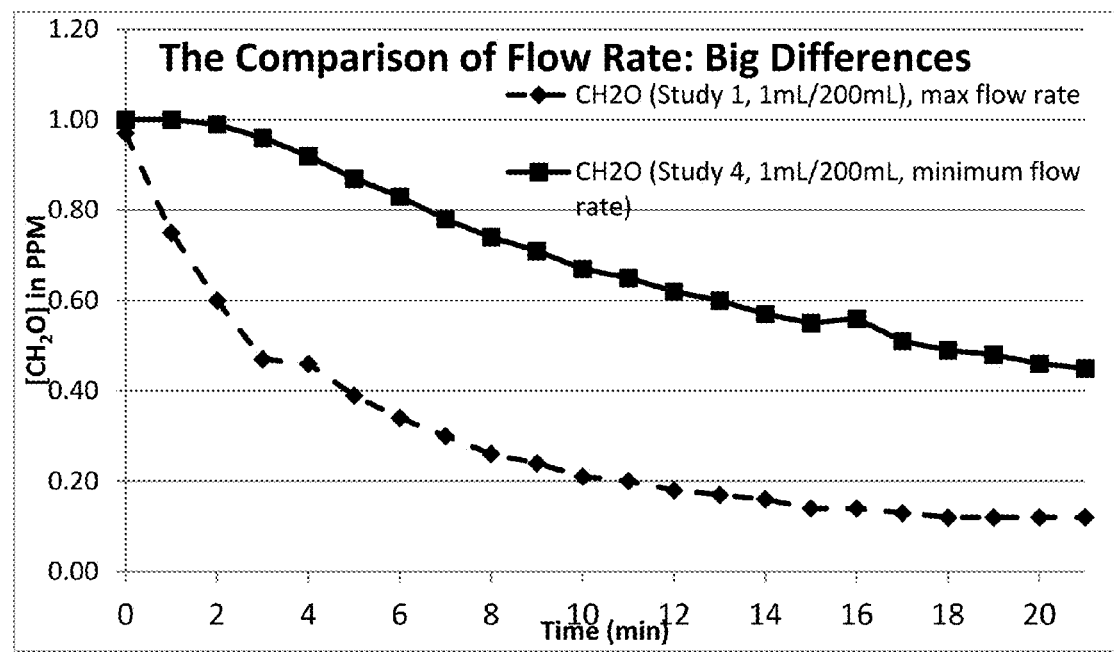
FIG. 5 shows the results of an experimental study comparing the effect of flow rate on the effectiveness of air sparging to remove formaldehyde from an enclosed space by air sparging using water as absorbent liquid. and an apparatus represented by FIG. 6.

Example 4. Determining the Effect of Air Flow Rate on the Time Required to Remove Formaldehyde In a comparison study using System (1 or 2) the rate of drop in formaldehyde concentration was measured at two different airflow rates of sparging into water. Starting from a concentration of 1.00 ppm, the concentration of formaldehyde decreased to 0.20 after about 10 min when the flow rate was maximum. The concentration diminished and held steady at 0.16 ppm from 15-20 min. Starting from a concentration of 1.00, the concentration decreased more gradually to about 0.70 ppm after 10 min when the flow rate was at a minimum. The results are shown in FIG. 5.

Humidity Control Experiments

Example 5

A. Single Sparging Vessel Apparatus.

The sparging solution is placed in a tank and the tank lid is closed and sealed to stabilize (equalize) the humidity. Inside the tank, a few devices are used. An electric fan is used to circulate the air in the tank. A humidity meter is used to display real time humidity change. An air pump is used to sparge air into the sparging solution (babbling). The fan was turned on all the time including the period for humidity stabilization. Once the sparging is started, the chamber humidity number changes are taken every minute (for most of the time, approximately 20 min).

B. Two Sparging Vessel Apparatus.

Two sparging solutions are compared. Solution A is water and the Solution B is saturated aqueous sodium chloride solution. For Solution B, the experiment was done twice with to compare the difference of a big fan and a small fan.

Figure 16:
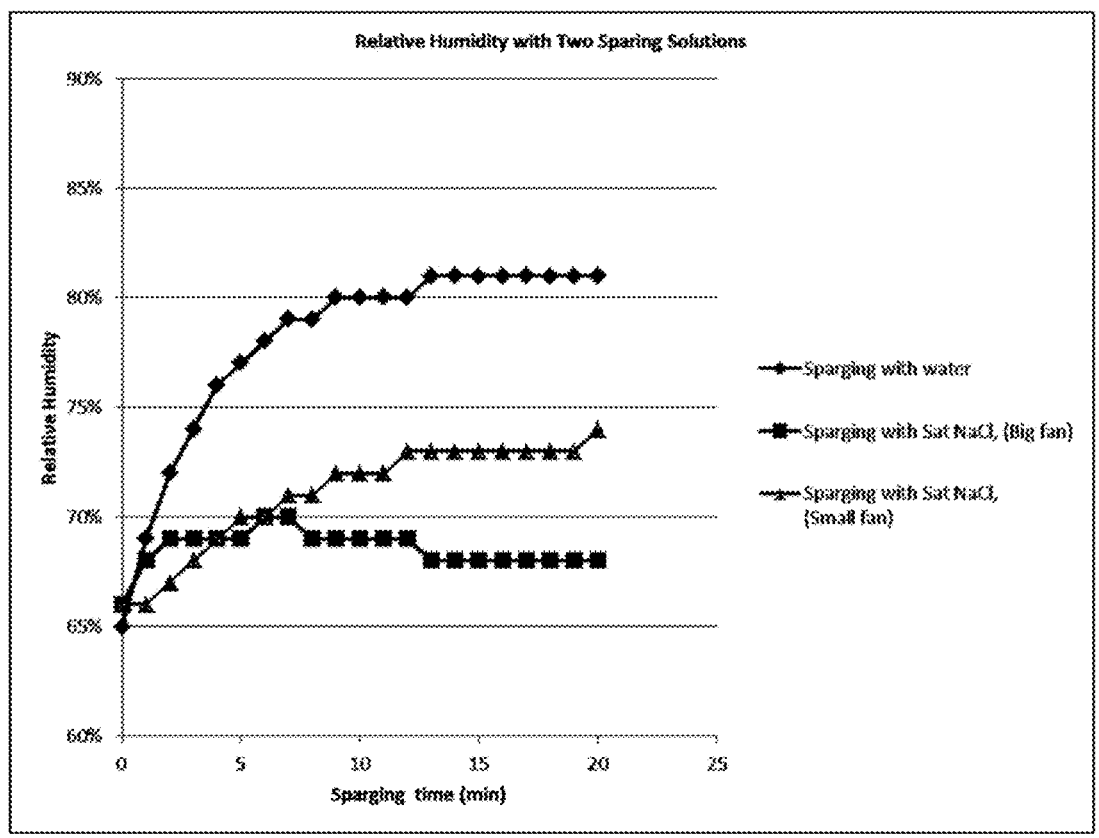
FIG. 16 shows the results of an experiment to measure the humidity of air in an enclosed 10-gallon tank as the air is allowed to bubble (sparge) air through vessels containing 1) water alone; 2) saturated sodium chloride solution, using a small fan within the tank; and 3) saturated sodium chloride solution, using a large fan within the tank.
Figure 17:
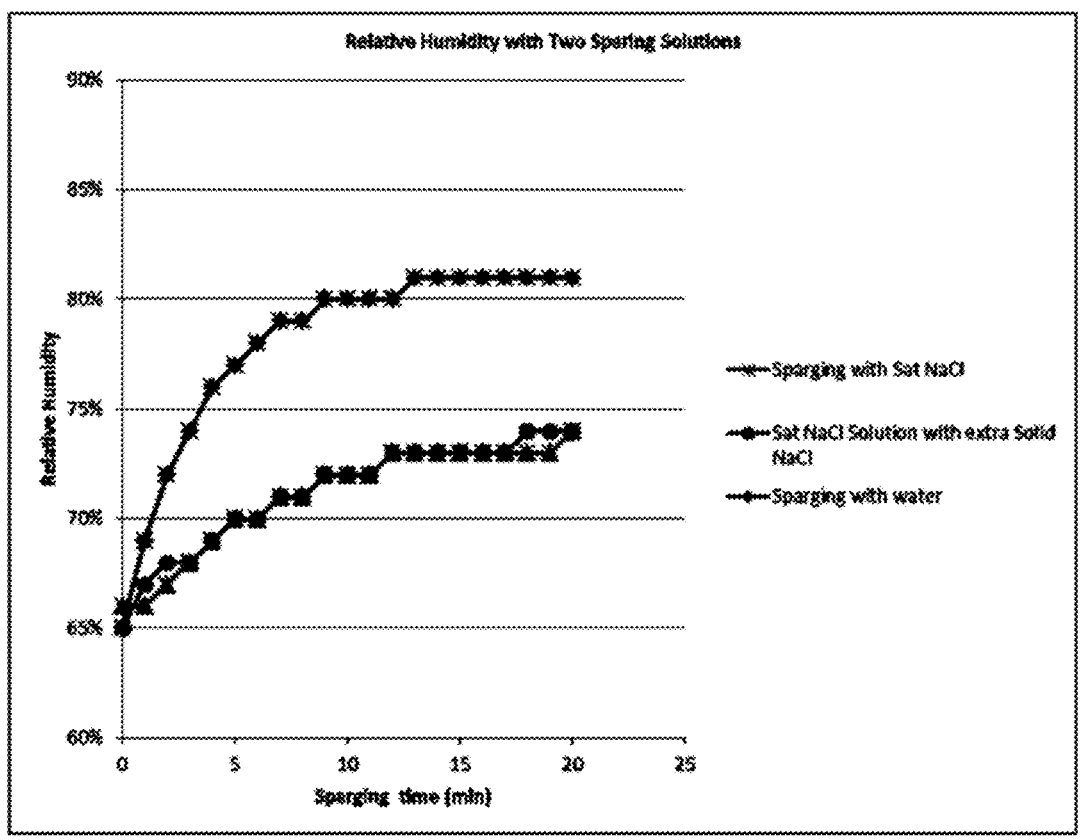
FIG. 17 shows the results of an experiment measuring the humidity of air in an enclosed 10 gal tank as the air is allowed to bubble (sparge) air through vessels with the apparatus of FIG. 6, where the absorbent liquid is 1) water alone; 2) saturated sodium chloride solution; or 3) saturated sodium chloride solution to which is an excess of solid sodium chloride has been added.

The results are shown in the table and in FIGS. 16-17.

TABLE 4

Effect of fan size on humidity control.

| Time (min) | Sparging with water | Sparging with Sat NaCl, (Big fan) | Sparging with Sat NaCl, (Small fan) |
|---|---|---|---|
| 0 | 65% | 66% | 66% |
| 1 | 69% | 68% | 66% |
| 2 | 72% | 69% | 67% |
| 3 | 74% | 69% | 68% |
| 4 | 76% | 69% | 69% |
| 5 | 77% | 69% | 70% |
| 6 | 78% | 70% | 70% |
| 7 | 79% | 70% | 71% |
| 8 | 79% | 69% | 71% |
| 9 | 80% | 69% | 72% |

TABLE 4-continued

Effect of fan size on humidity control.

| Time (min) | Sparging with water | Sparging with Sat NaCl, (Big fan) | Sparging with Sat NaCl, (Small fan) |
|---|---|---|---|
| 10 | 80% | 69% | 72% |
| 11 | 80% | 69% | 72% |
| 12 | 80% | 69% | 73% |
| 13 | 81% | 68% | 73% |
| 14 | 81% | 68% | 73% |
| 15 | 81% | 68% | 73% |
| 16 | 81% | 68% | 73% |
| 17 | 81% | 68% | 73% |
| 18 | 81% | 68% | 73% |
| 19 | 81% | 68% | 73% |
| 20 | 81% | 68% | 74% |

Example 6

Using the same methodology described above, the saturated sodium chloride solution is compared with the same solution with extra sodium chloride (solid) added.

The absorbent liquid was prepared as follows: 20 g solid NaCl was added to 100 mL and saturated NaCl solution. After sparging through this solution, the humidity was measured and compared to the previous results; these appear in the table below and in FIG. 17.

TABLE 5

Relative Humidity with Two Sparing Solutions: Comparison of Humidity Effect with Saturated Sodium Chloride Solution and The Same but with Extra Solid Sodium Chloride

| Time (min) | Sparging with water | Sparging with Sat NaCl | Sat NaCl Solution with extra Solid NaCl |
|---|---|---|---|
| 0 | 65% | 66% | 65% |
| 1 | 69% | 66% | 67% |
| 2 | 72% | 67% | 68% |
| 3 | 74% | 68% | 68% |
| 4 | 76% | 69% | 69% |
| 5 | 77% | 70% | 70% |
| 6 | 78% | 70% | 70% |
| 7 | 79% | 71% | 71% |
| 8 | 79% | 71% | 71% |
| 9 | 80% | 72% | 72% |
| 10 | 80% | 72% | 72% |
| 11 | 80% | 72% | 72% |
| 12 | 80% | 73% | 73% |
| 13 | 81% | 73% | 73% |
| 14 | 81% | 73% | 73% |
| 15 | 81% | 73% | 73% |
| 16 | 81% | 73% | 73% |
| 17 | 81% | 73% | 73% |
| 18 | 81% | 73% | 74% |
| 19 | 81% | 73% | 74% |
| 20 | 81% | 74% | 74% |

Example 7. High Humidity Conditions

Figure 18:
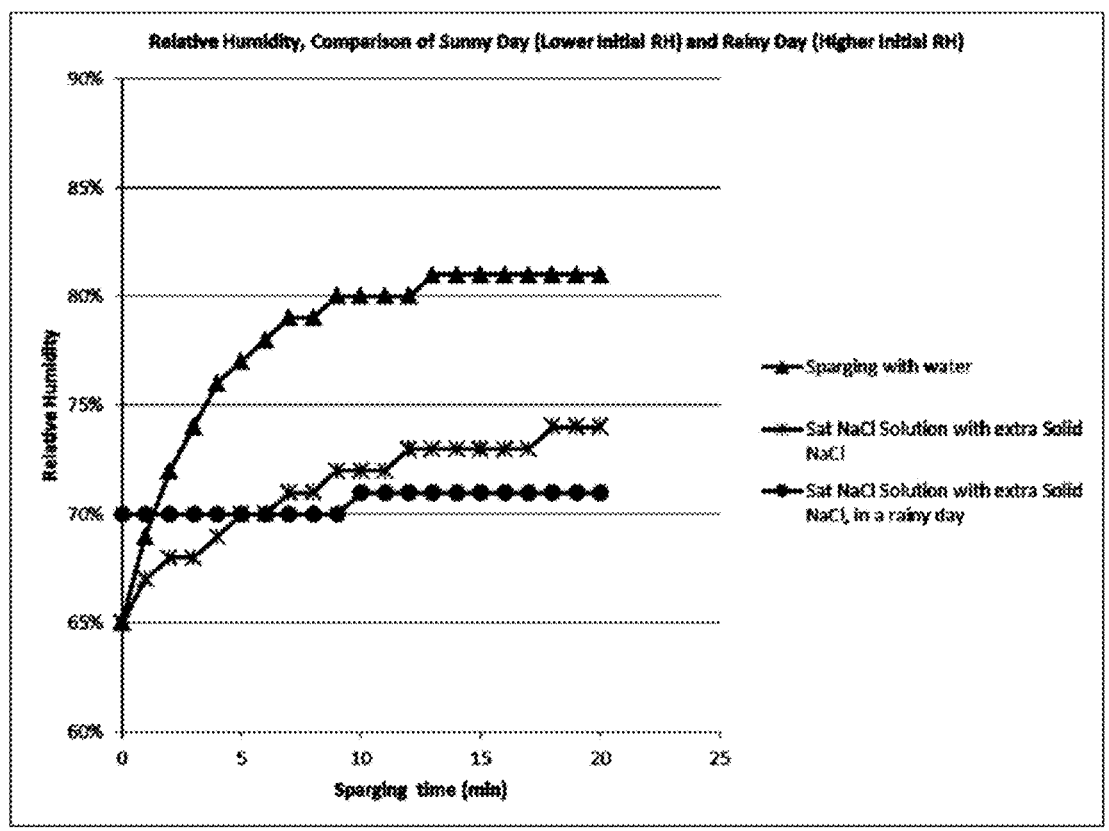
FIG. 18 shows the result of a similar experiment to measure humidity changes when pumping air through a vessel as illustrated in FIG. 6, where the absorbent liquid 1) water alone; 2) saturated sodium chloride solution to which is an excess of solid sodium chloride has been added, starting with lower initial humidity or 3) saturated sodium chloride solution to which is an excess of solid sodium chloride has been added, starting with higher initial humidity.

The same procedure as Example 5 was followed, except the experiment was performed on a rainy day with higher initial RH. Table 6 and FIG. 18 show the results below.

TABLE 6

Relative Humidity, Comparison of Sunny Day (Lower Initial RH) and Rainy Day (Higher Initial RH)

| Time (min) | Sparging with water | Sat NaCl Solution with extra Solid NaCl | Sat NaCl Solution with extra Solid NaCl, in a rainy day |
|---|---|---|---|
| 0 | 65% | 65% | 70% |
| 1 | 69% | 67% | 70% |
| 2 | 72% | 68% | 70% |
| 3 | 74% | 68% | 70% |
| 4 | 76% | 69% | 70% |
| 5 | 77% | 70% | 70% |
| 6 | 78% | 70% | 70% |
| 7 | 79% | 71% | 70% |
| 8 | 79% | 71% | 70% |
| 9 | 80% | 72% | 70% |
| 10 | 80% | 72% | 71% |
| 11 | 80% | 72% | 71% |
| 12 | 80% | 73% | 71% |
| 13 | 81% | 73% | 71% |
| 14 | 81% | 73% | 71% |
| 15 | 81% | 73% | 71% |
| 16 | 81% | 73% | 71% |
| 17 | 81% | 73% | 71% |
| 18 | 81% | 74% | 71% |
| 19 | 81% | 74% | 71% |
| 20 | 81% | 74% | 71% |

It can be concluded from the above experiments that by choosing the composition of the liquid absorbent, the relative humidity of an enclosed space can be effectively controlled.

Example 8. Sparging with Aqueous Ethylene Glycol (EG) Mixtures

Figure 19:
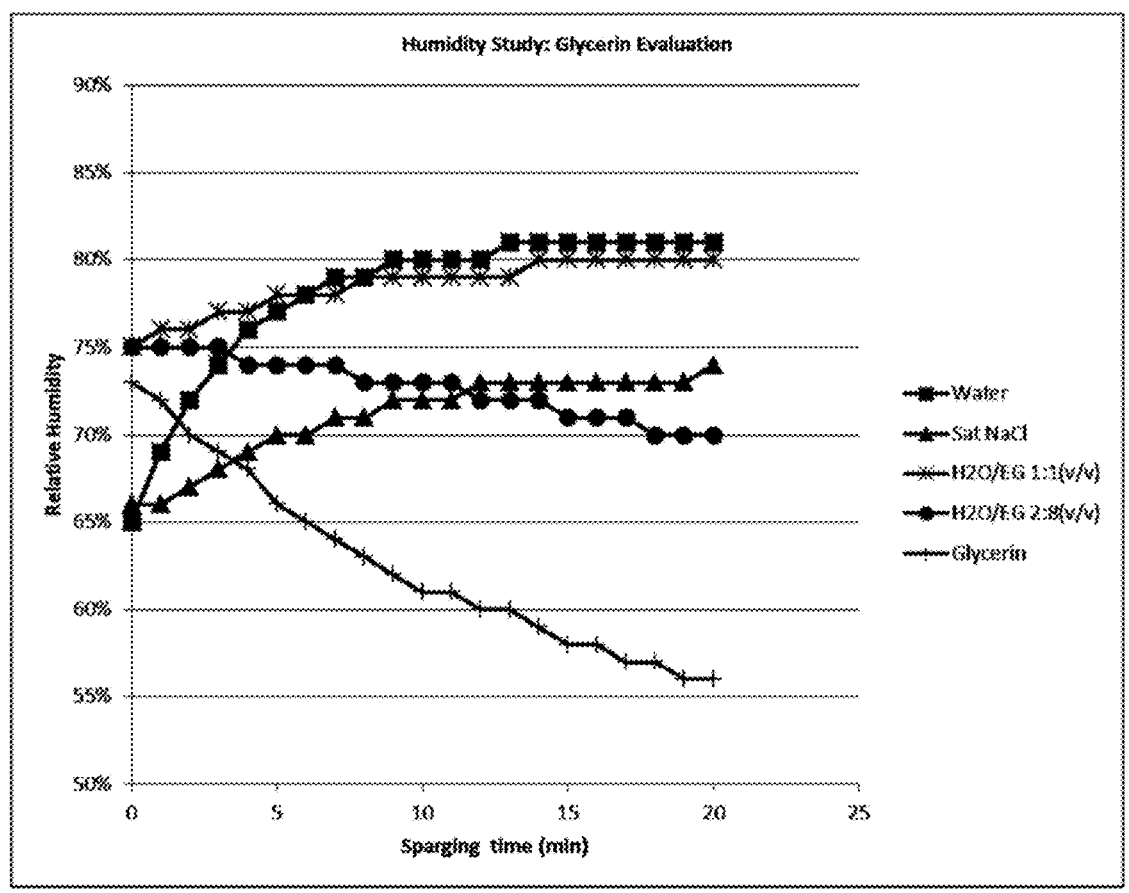
FIG. 19 shows the relative humidity that results from an experiment using the sparging apparatus as illustrated in FIG. 6, in which the absorbent liquid is 1) a 1:1 v/v water/ethylene glycol mixture, 2) a 2:8 v/v water/ethylene glycol mixture, 3) glycerin, 4) saturated aqueous sodium chloride or 5) water as the absorbent liquids.

Using the same conditions described above, the effect of ethylene glycol/water mixtures on humidity were compared to water and saturated sodium chloride solution. The results are shown in FIG. 19 and in Table 7 below.

TABLE 7

Comparison of water, water/ethylene glycol, and saturated NaCl in humidity control.

| Time (min) | Water | Sat NaCl | H2O/EG 1:1 (v/v) | H2O/EG 2:8 (v/v) |
|---|---|---|---|---|
| 0 | 65% | 66% | 75% | 75% |
| 1 | 69% | 66% | 76% | 75% |
| 2 | 72% | 67% | 76% | 75% |
| 3 | 74% | 68% | 77% | 75% |
| 4 | 76% | 69% | 77% | 74% |
| 5 | 77% | 70% | 78% | 74% |
| 6 | 78% | 70% | 78% | 74% |
| 7 | 79% | 71% | 78% | 74% |
| 8 | 79% | 71% | 79% | 73% |
| 9 | 80% | 72% | 79% | 73% |
| 10 | 80% | 72% | 79% | 73% |
| 11 | 80% | 72% | 79% | 73% |
| 12 | 80% | 73% | 79% | 72% |
| 13 | 81% | 73% | 79% | 72% |
| 14 | 81% | 73% | 80% | 72% |
| 15 | 81% | 73% | 80% | 71% |
| 16 | 81% | 73% | 80% | 71% |
| 17 | 81% | 73% | 80% | 71% |
| 18 | 81% | 73% | 80% | 70% |
| 19 | 81% | 73% | 80% | 70% |
| 20 | 81% | 74% | 80% | 70% |

The 1:1 (Water:EG) ratio leads to higher humidity than the 2:8 ratios (Water:EG), starting from the same relative humidity point. This can be extended to many other sparging systems especially that involves water and another component.

This experiment clearly demonstrated that for a multiple component system, the ratio change will change the humidity control value. This could be extended to many other sparging systems.

Example 9. Sparging with Glycerin

Using the same conditions described above, the effect of glycerin on humidity were compared to water and saturated sodium chloride solution, and water/ethylene glycol mixtures. The results are shown in FIG. 19 and in the table below.

Glycerin is safe, cheap, high-boiling and easy to use and many other components can be added to glycerin. The results indicate it is an effective humidity control agent.

TABLE 8

Comparison of water, water/ethylene glycol, saturated NaCl and glycerin in humidity control.

| Time (min) | Water | Sat NaCl | H2O/EG 1:1 (v/v) | H2O/EG 2:8 (v/v) | Glycerin |
|---|---|---|---|---|---|
| 0 | 65% | 66% | 75% | 75% | 73% |
| 1 | 69% | 66% | 76% | 75% | 72% |
| 2 | 72% | 67% | 76% | 75% | 70% |
| 3 | 74% | 68% | 77% | 75% | 69% |
| 4 | 76% | 69% | 77% | 74% | 68% |
| 5 | 77% | 70% | 78% | 74% | 66% |
| 6 | 78% | 70% | 78% | 74% | 65% |
| 7 | 79% | 71% | 78% | 74% | 64% |
| 8 | 79% | 71% | 79% | 73% | 63% |
| 9 | 80% | 72% | 79% | 73% | 62% |
| 10 | 80% | 72% | 79% | 73% | 61% |
| 11 | 80% | 72% | 79% | 73% | 61% |
| 12 | 80% | 73% | 79% | 72% | 60% |
| 13 | 81% | 73% | 79% | 72% | 60% |
| 14 | 81% | 73% | 80% | 72% | 59% |
| 15 | 81% | 73% | 80% | 71% | 58% |
| 16 | 81% | 73% | 80% | 71% | 58% |
| 17 | 81% | 73% | 80% | 71% | 57% |
| 18 | 81% | 73% | 80% | 70% | 57% |
| 19 | 81% | 73% | 80% | 70% | 56% |
| 20 | 81% | 74% | 80% | 70% | 56% |

Figure 20:
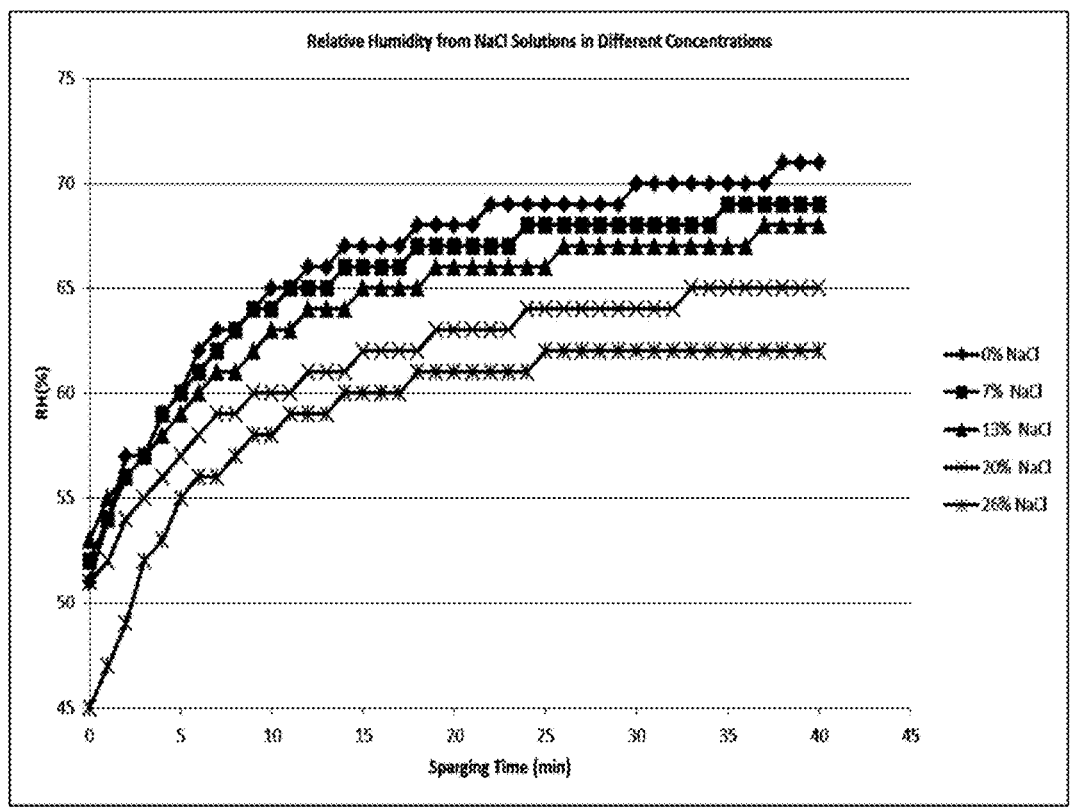
FIG. 20 shows the relative humidity over time that results from an experiment comparing various concentrations of aqueous sodium chloride solutions in a closed tank sparging system as illustrated in FIG. 6.
Figure 21:
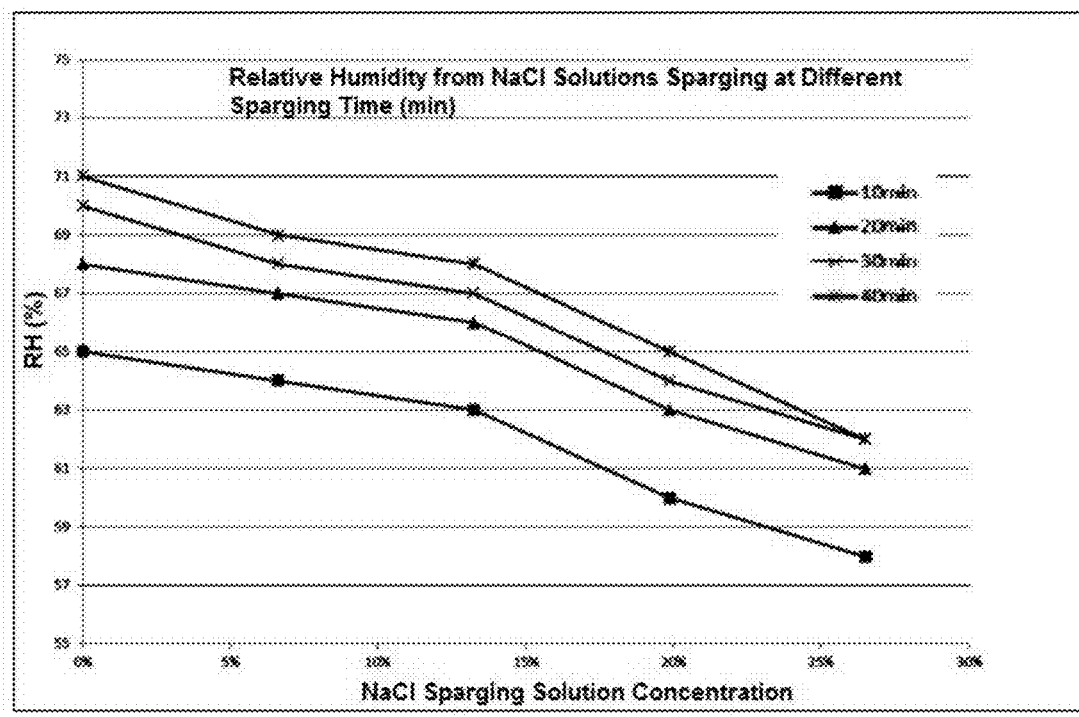
FIG. 21 shows data from the same experiment, plotting relative humidity as a function of aqueous sodium chloride concentration system, for four different time periods.
Figure 22:
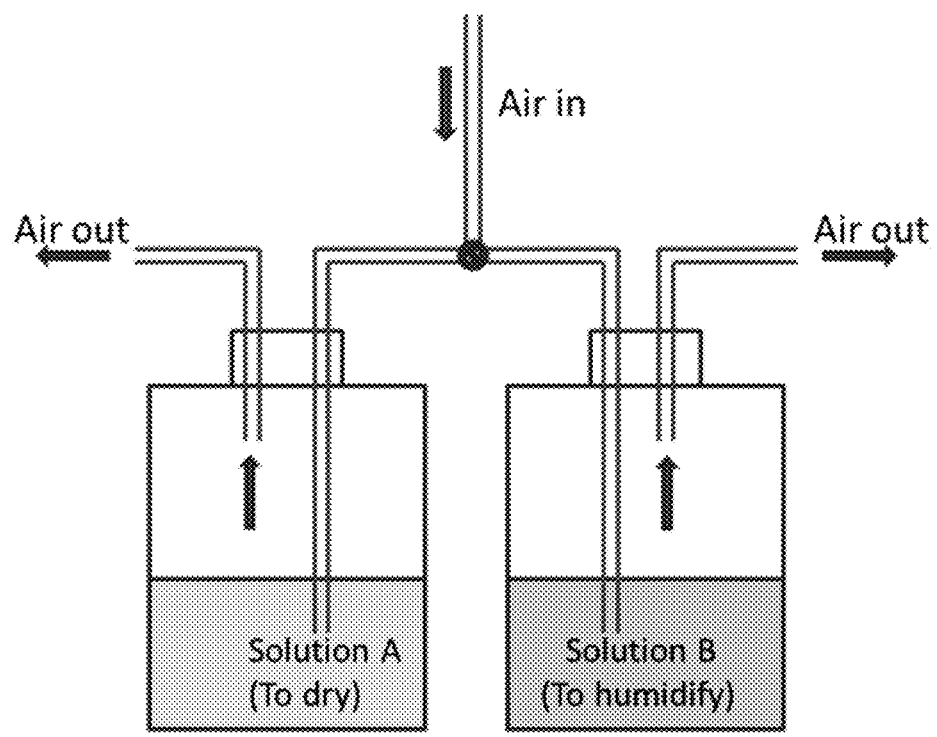
FIG. 22 illustrates an aspect of the invention where the intake environmental space air is directed through a switched double vessel sparging system. Depending on the position of the switch, the system will transmit the air to one of two absorbent solutions, (A or B) which in turn determine whether humidity is added or removed from the environmental space air to the treated air.

Example 10. Control of Humidity Using Sodium Chloride Solutions of Different Concentrations The single sparging solution system is placed outside the enclosed space (tank). The graphs (FIGS. 20 and 21) show the trend that higher concentrations of sodium chloride lead to lower relative humidity. The data here show that after 40 minute sparging, the relative humidity of the chamber is not reached. This experiment demonstrates the possibility that one may use different concentrations of a salt of other chemical composition in order to obtain a desired relative humidity level.

The above examples demonstrate that the use of different sparging solutions can be used to control the relative humidity, and that a desired level of humidity can be achieved and maintained by selection of an appropriate liquid in an appropriate quantity for the volume of air to be purified in the environmental space. The time to achieve the desired RH equilibrium will vary, but can be estimated by straightforward calculation or field experience.

Formaldehyde Removal

General Procedures (One sparging solution system): The sparging solution is placed in a tank and the tank lid is closed and sealed. Inside the tank, a few devices are used. An electric fan is used to circulate the air in the tank. A humidity meter is used to display real time humidity change. An air pump is used to sparge air into the sparging solution (babbling). A formaldehyde meter is used to monitor air formaldehyde concentration (in ppm) change. The formaldehyde meter also comes with display of VOC index and temperature. The fan was turned on all the time during experiment. Once the sparging is started, the readings are taken for chamber formaldehyde, VOC index, temperature and humidity.

When two or more sparging solutions are used, they can be connected together in series or in parallel, as shown in FIGS. 8-12.

Example 11. Formaldehyde Scavenging with Glycerin as the Sparging Solution

Figure 23:
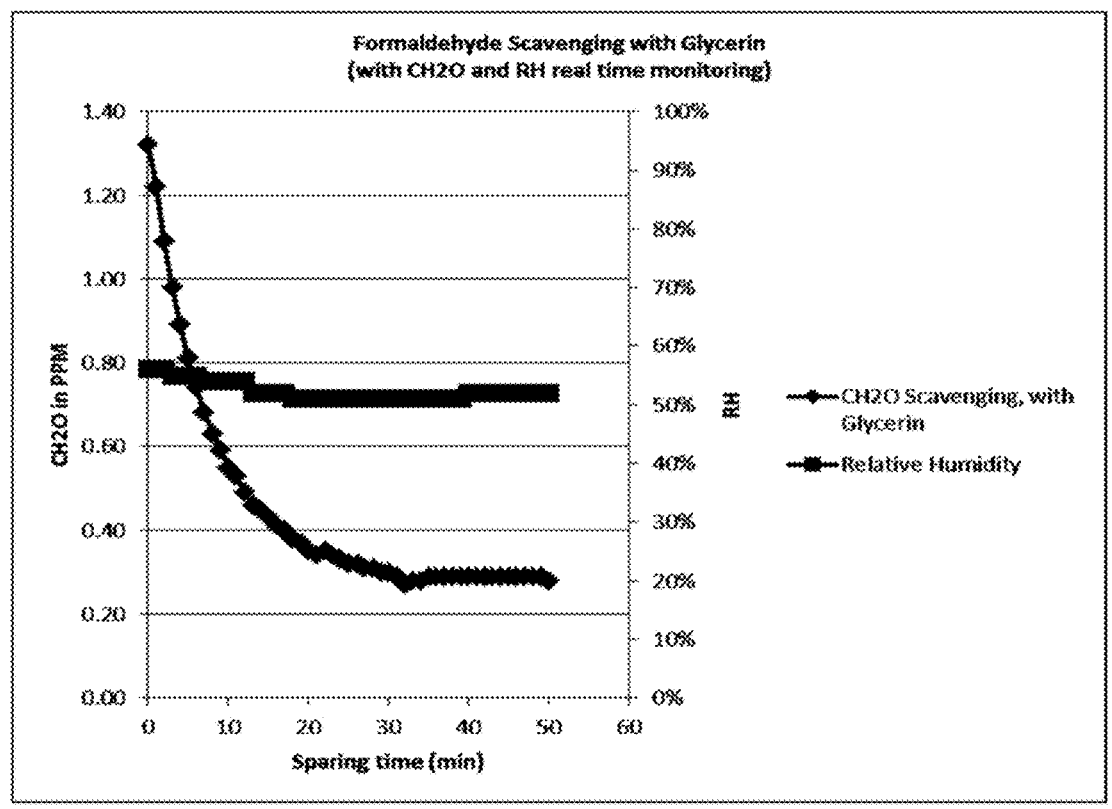
FIG. 23 shows data from an experiment using glycerin as the absorbent liquid, using a sparging system as illustrated in FIG. 6, and the rate of removal of formaldehyde over time from the environmental space air, while maintaining constant relative humidity.

Sparging solution preparation: Glycerin 63.10 g (50 mL) was weighed and placed in the sparging solution container. Results are shown in FIG. 23.

This experiment clearly shows that glycerin is an excellent sparging solution and can be used for formaldehyde scavenging. The formaldehyde in the air is captured and dissolved in glycerin. The scavenging process proceeded smoothly until at around 30 min at which time the scavenging becomes slow. About 77% formaldehyde was removed in about 30 minutes.

The "adjusted" humidity is kept in the comfortable range. This scavenging system is valuable in practical sense because it is effective in preventing humidity increase. Actually it provides a dry environment which is desired for many applications.

Compared with some better systems, the "single sparging system" using glycerin is not as fast in removing formaldehyde. However, it is a useful reference point in comparing with other sparging systems.

Figure 24:
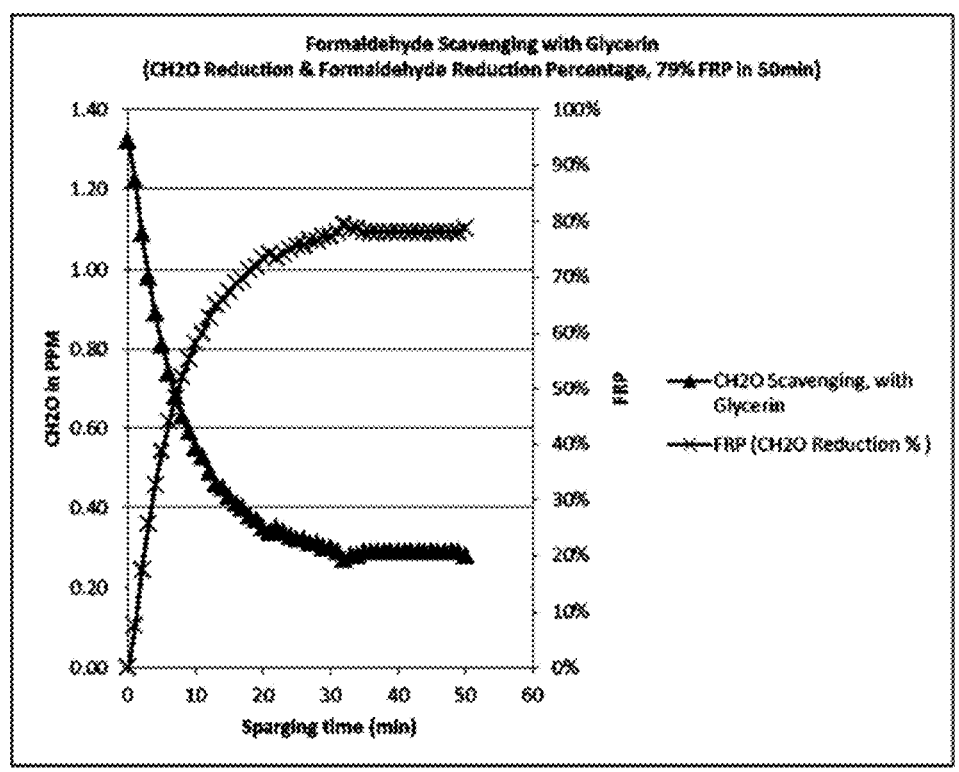
FIG. 24 presents the data from the same experiment showing the formaldehyde reduction percentage over time as the environmental space air is passed through a vessel containing glycerin as the absorbent liquid, using a sparging system as illustrated in FIG. 6.
Figure 25:
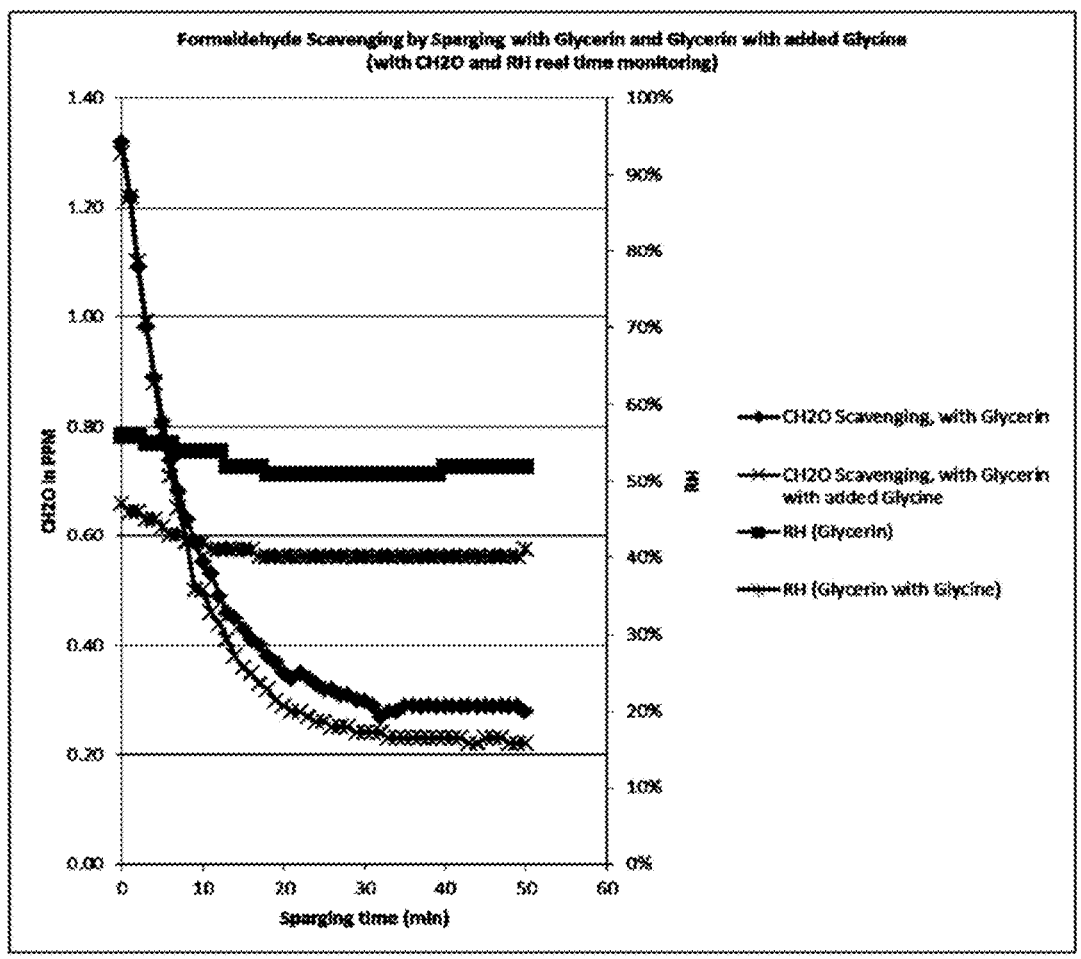
FIGS. 25-27 depict the results from a similar experiment comparing the effectiveness of using 1) glycerin alone and 2) glycerin (50 mL) with glycine added (50 mg) as the absorbent liquids, using a single or twin sparging system as illustrated in FIG. 6 or 8 respectively.
Figure 26:
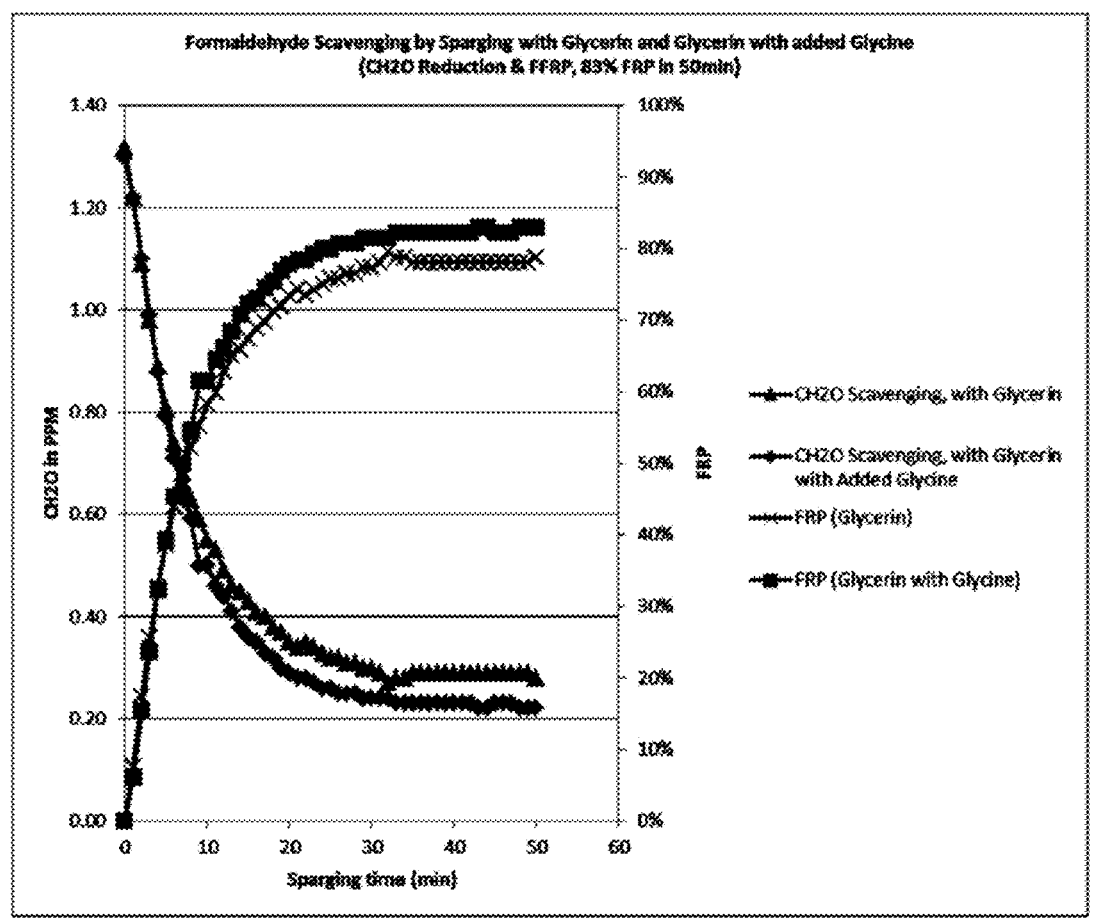

Example 12. Formaldehyde Scavenging with Glycine Added to Glycerin Sparging Solution Sparging solution preparation: Glycerin 63.10 g (50 mL) with added glycine (50 mg) were weighed and placed in the sparging solution container. Results appear in FIGS. 24-26.

Aldehyde neutralization by amines such as amino acids are known (Zhu, Peter; et al. 20010025110A1, "Reductive amination for aldehyde neutralization"). Amino acids take time to neutralize formaldehyde (J. Frederic Walker, "Formaldehyde" 2nd (1953) and 3rd Ed (1975). and refs therein. American Chemical Society, Monograph Series). The value is the added amino acids or other amines allow increased formaldehyde scavenging capacity. Larger scavenging capacity is desired because formaldehyde usually releases gradually in a household over time.

The current invention provides a desired practice that first allows the capture of the formaldehyde in the environmental air into a liquid phase and then allow the chemical conversion of formaldehyde to a by-product with different properties.

One may have the option to dispose the liquid with incomplete conversion of formaldehyde to the by product and replace with a fresh sparging solution or alternatively, one may want to let the system to stand until the formaldehyde is completely converted to nonvolatile product.

Dual Sparging Systems

Figure 8:
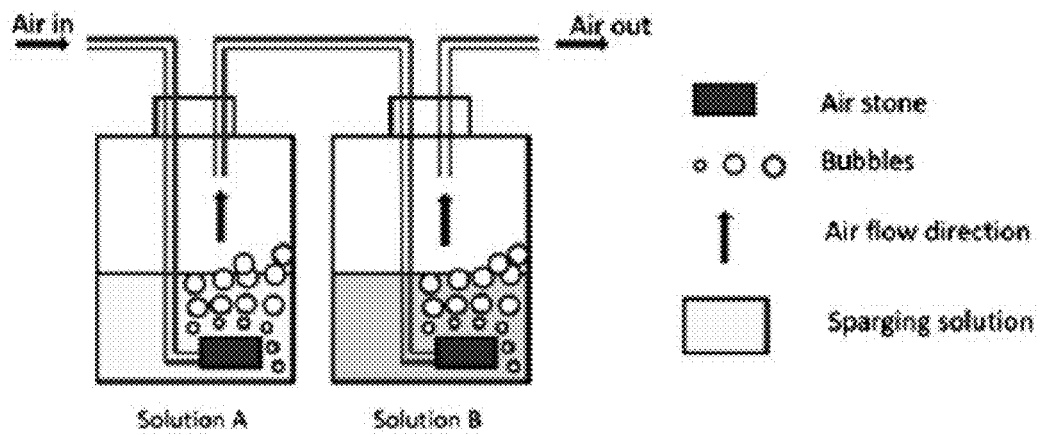
FIG. 8 represents an aspect of the invention in which two vessels are connected in series, wherein the unpurified or contaminated environmental space air enters the first vessel containing Solution A as the absorbent liquid, passes through the liquid and is pumped to the second vessel containing Solution B as the absorbent liquid. After passing through Solution B, the purified air exits from the port in the direction shown.
Figure 9:
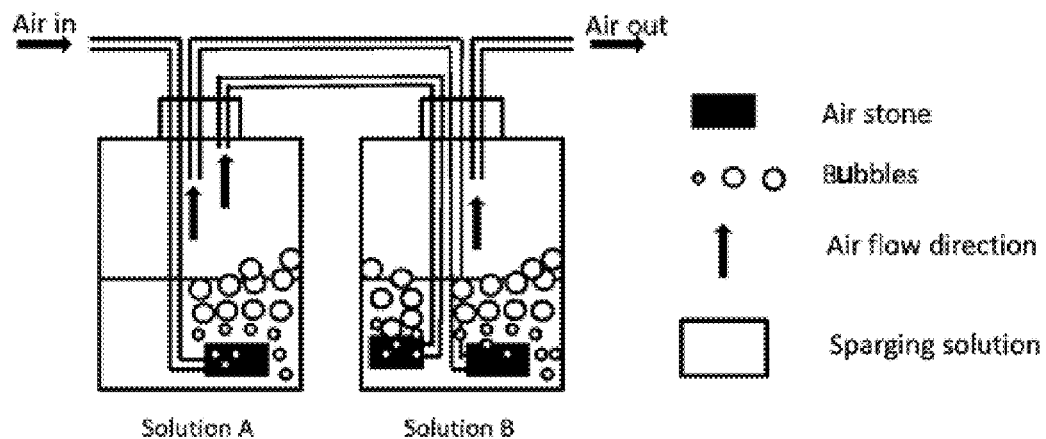
FIG. 9 represents another aspect of the invention and a variation of the apparatus shown in FIG. 8, in which the environmental space air purified by Solution A in the first vessel is allowed to exit via two ports and is pumped into a second vessel containing Solution B. After passing through Solution B, the purified air exits from the port in the direction shown.
Figure 10:
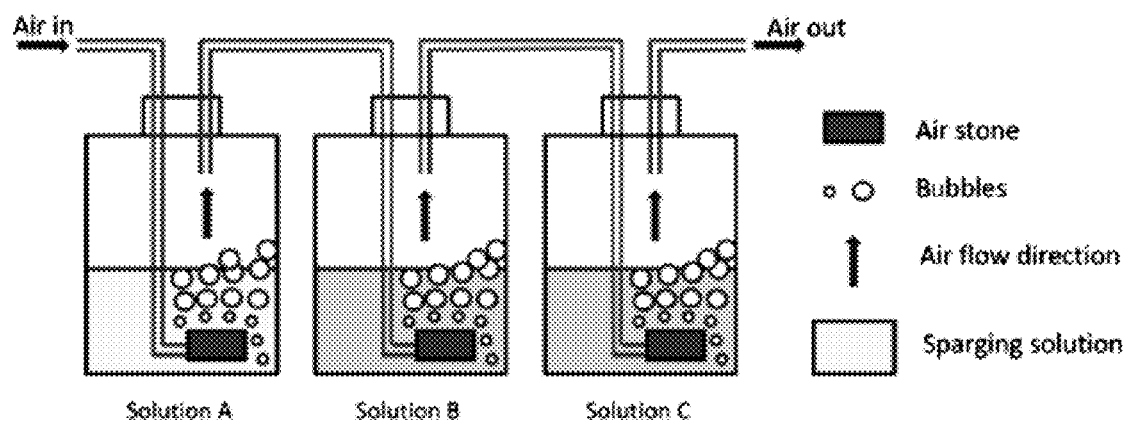
FIG. 10 represents an aspect of the invention in which three vessels are connected in series, wherein the contaminated or unpurified environmental space air enters the first vessel containing Solution A as the absorbent liquid, passes through the liquid and is then pumped to the second vessel containing Solution B as the absorbent liquid, and thereafter is directed to a third vessel where it passes through Solution C as the absorbent liquid. The purified environmental space air exits from the port of the third vessel as shown.
Figure 11:
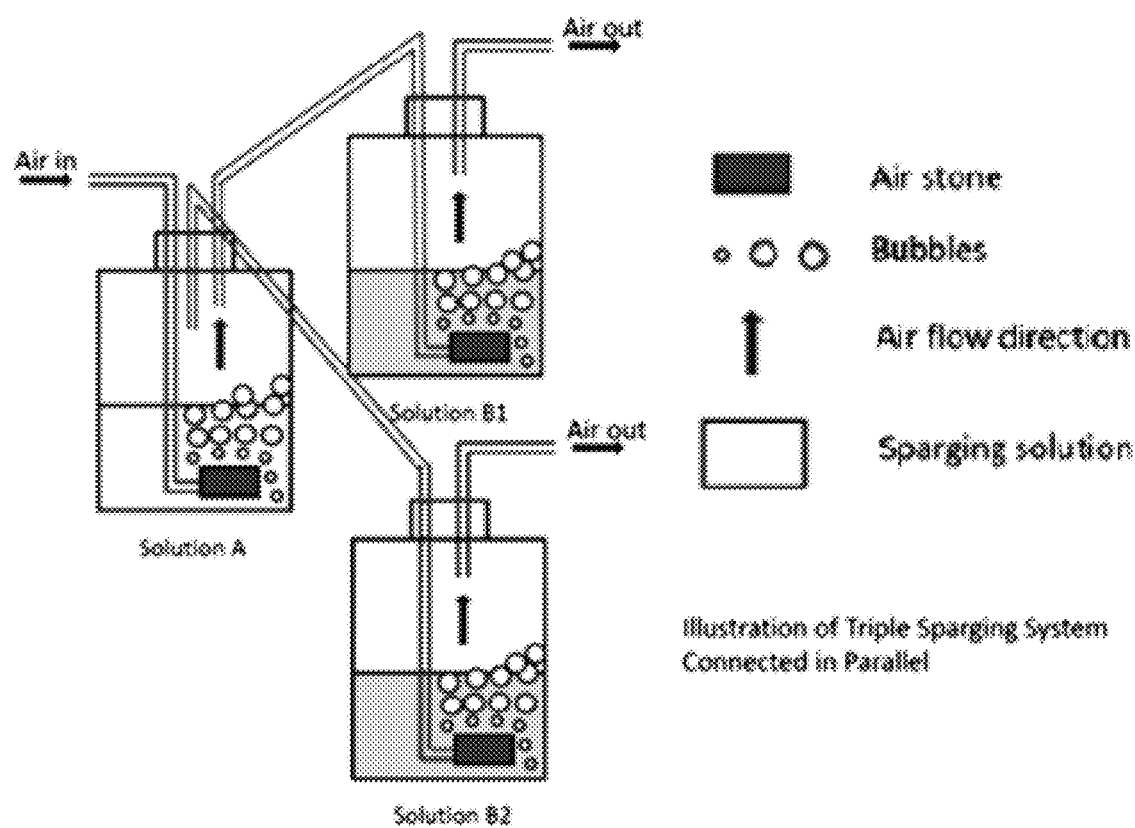
FIG. 11 represents an aspect of the invention in which three vessels are arranged in an array such that the environmental space air passes through a first vessel containing Solution A as absorbent liquid, and is then divided into two streams, each stream simultaneously pumped to separate vessels where they pass through absorbent liquids, namely Solutions B1 and B2 respectively, and then the purified environmental space air exits from the each of the ports in the direction shown.

A typical dual sparging system set up is shown in FIG. 8 The tank air is pumped in with an air pump through Solution A first and then Solution B before exiting back to the tank. Formaldehyde is captured by both solutions.

Example 13

Figure 27:
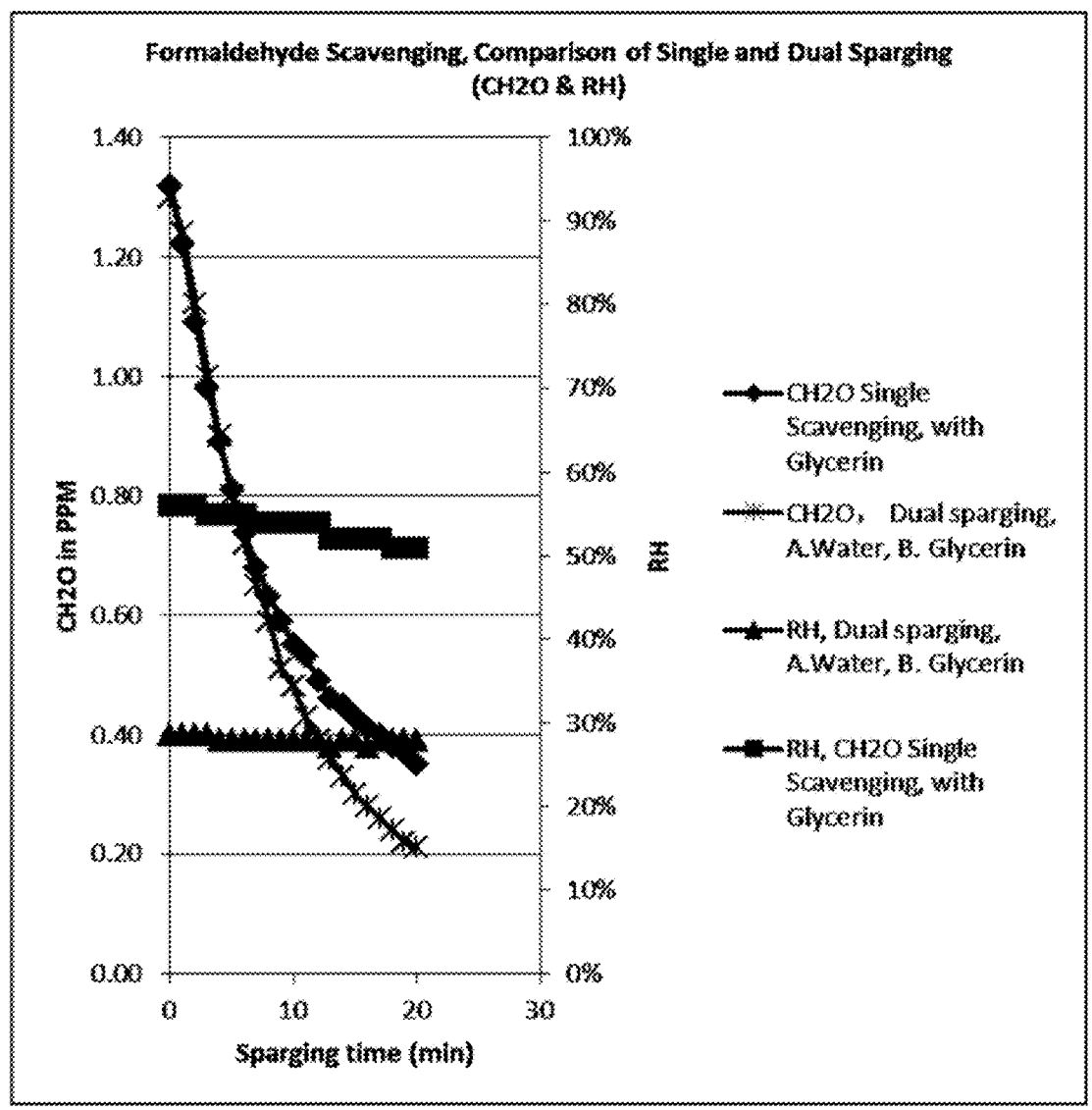
Figure 28:
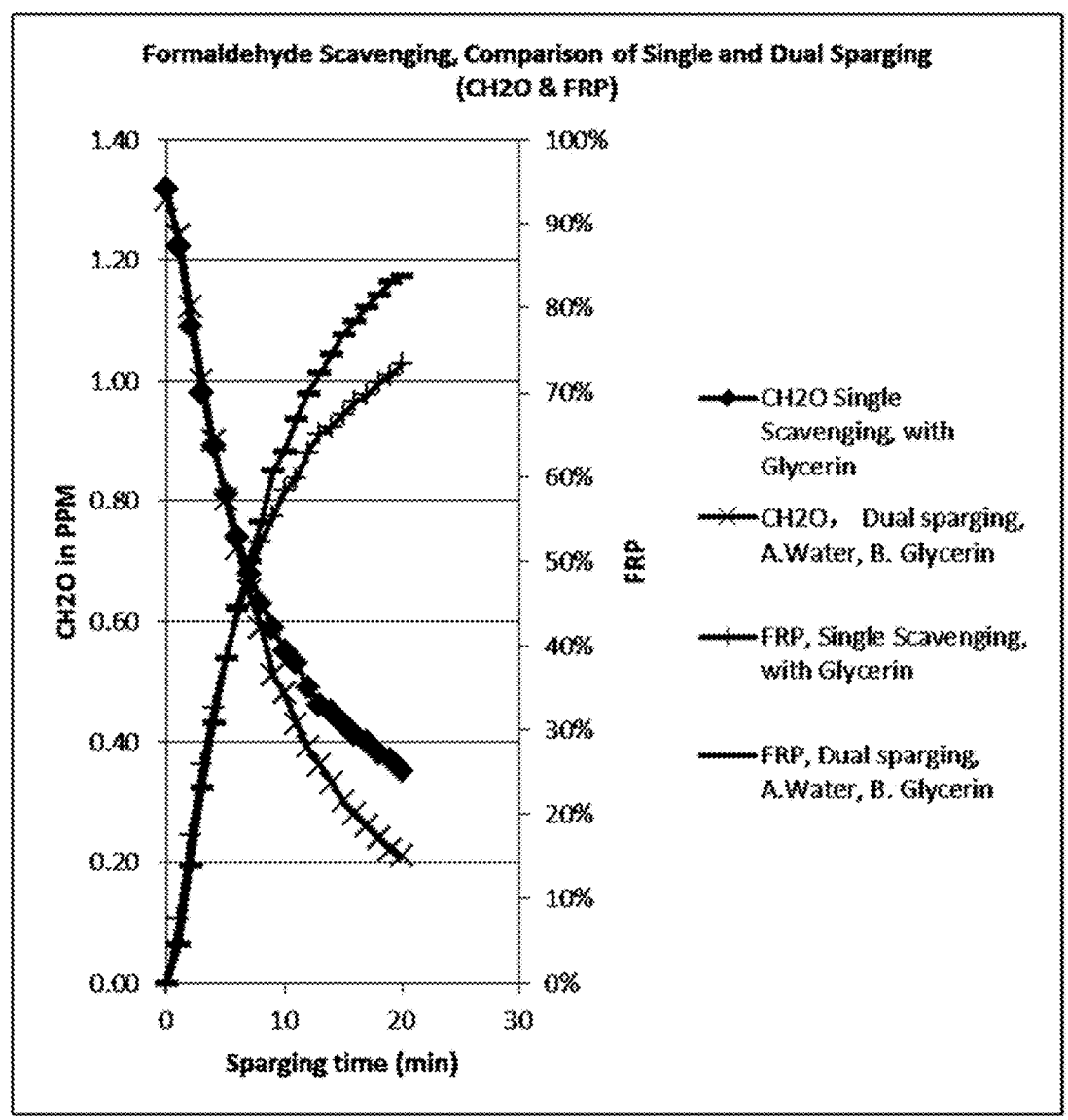
FIGS. 28-30 depict the results from an experiment comparing the effectiveness of using mixtures of glycerin, water and dimedone mixtures as the absorbent liquid using either a single vessel, as illustrated in FIG. 6, or a twin vessel (in series) sparging system as illustrated in FIG. 8.
Figure 29:
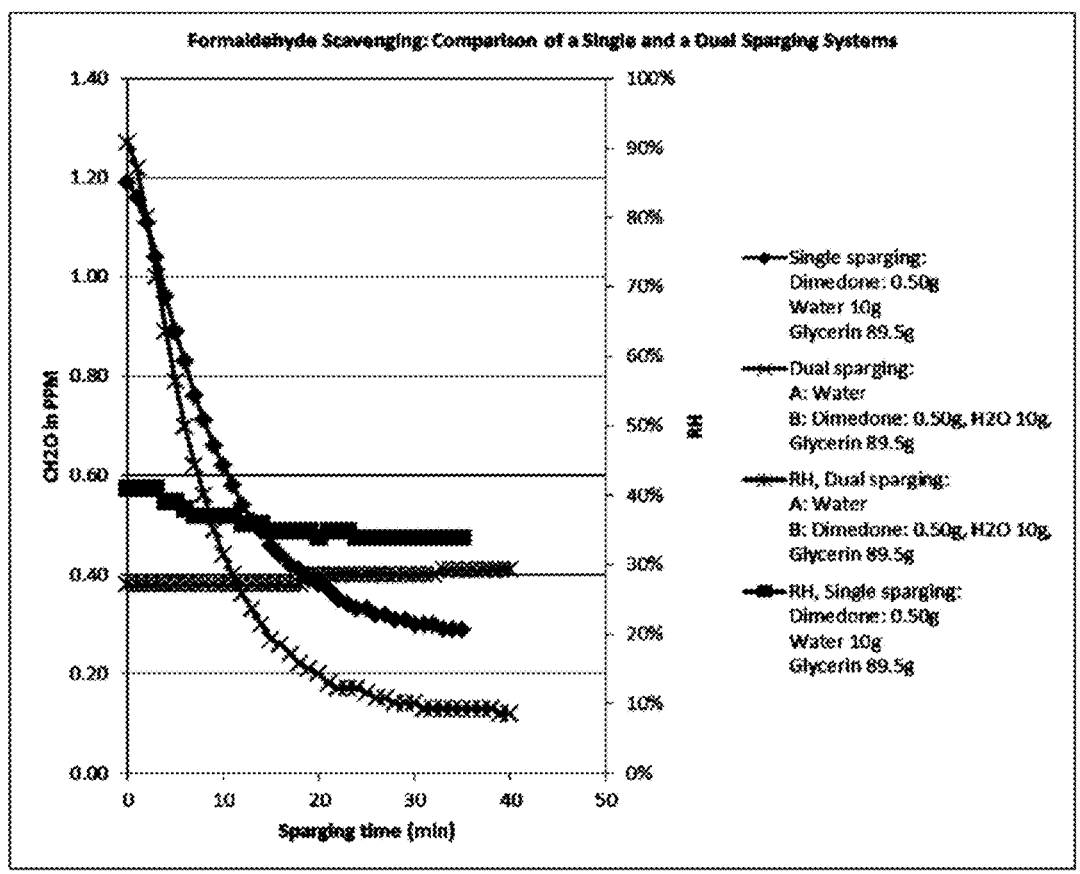
Figure 30:
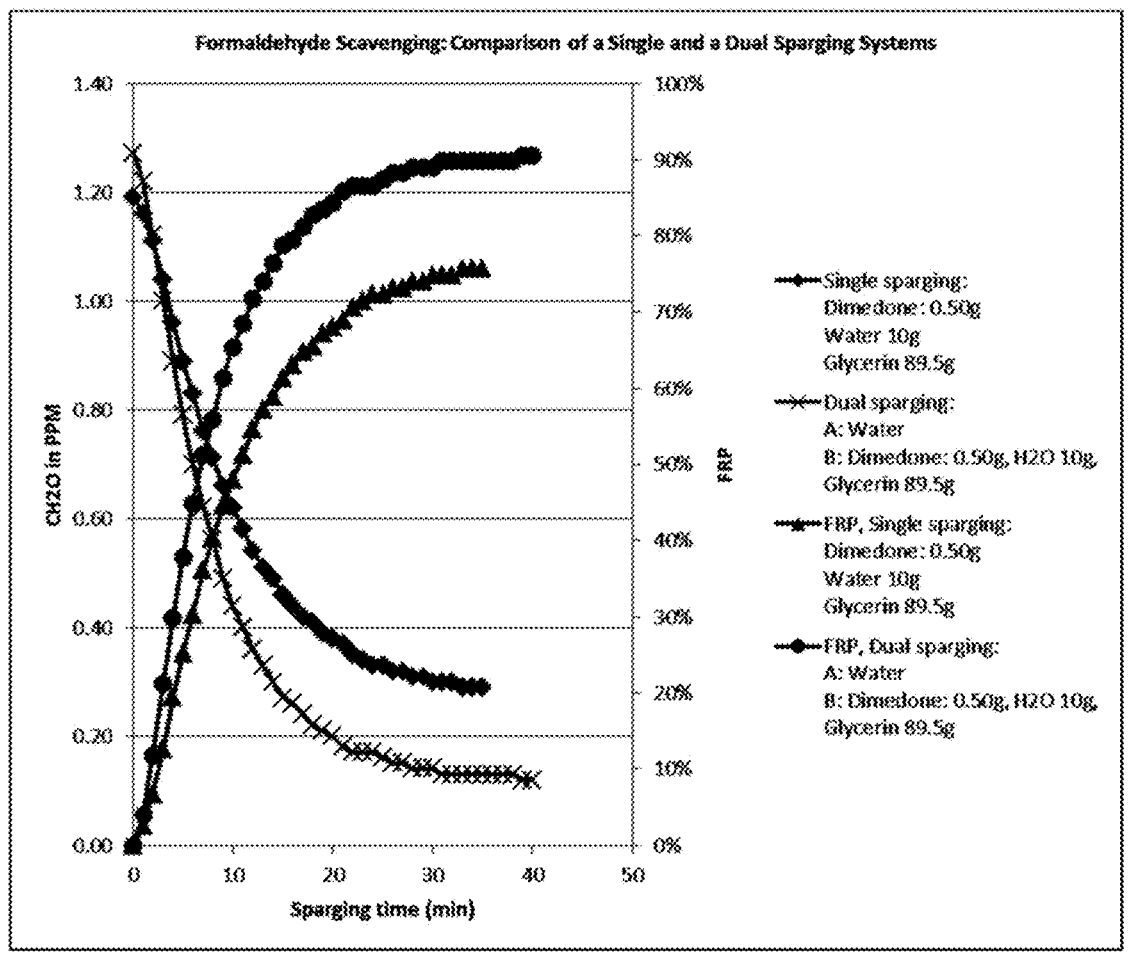
Figure 31:
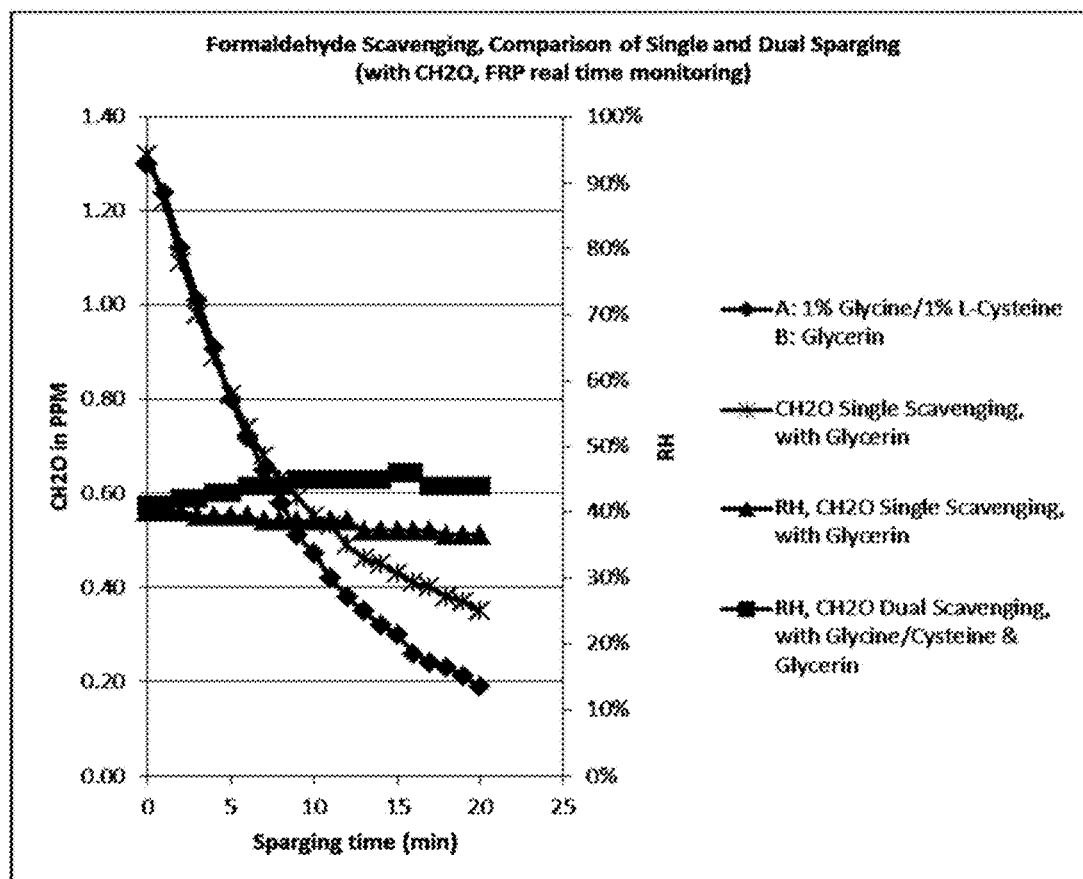
FIGS. 31-32 depict the results from an experiment comparing the effectiveness of using 1) glycerin alone and 2) glycerin with cysteine added as the absorbent liquids using either a single vessel, as illustrated in FIG. 6, or a twin vessel (in series) sparging system as illustrated in FIG. 8.
Figure 32:
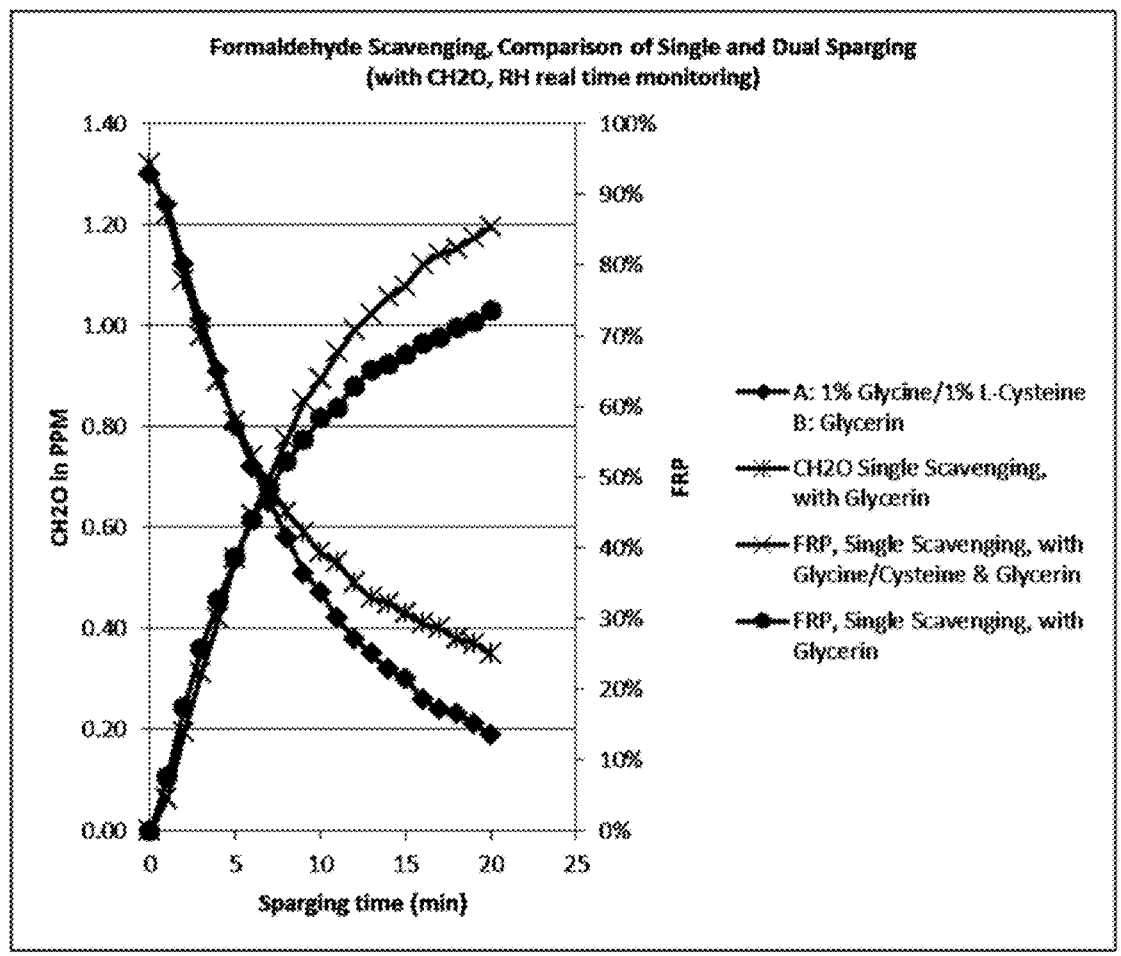
Figure 33:
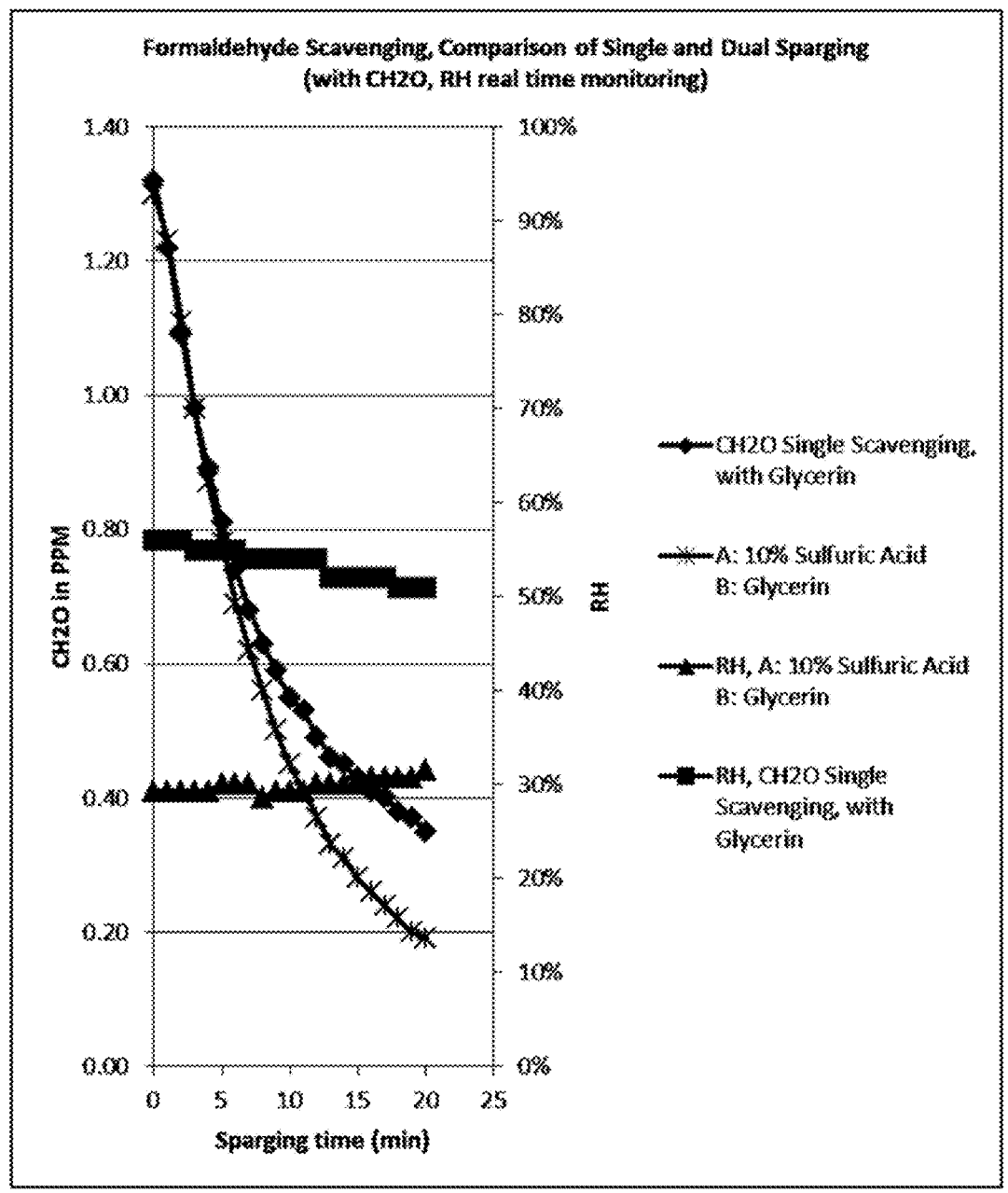
FIGS. 33-34 depict the results from an experiment comparing the effectiveness of using 1) glycerin alone and 2) glycerin with concentrated sulfuric acid added as the absorbent liquids using either a single vessel, as illustrated in FIG. 6, or a twin vessel (in series) sparging system as illustrated in FIG. 8.
Figure 34:
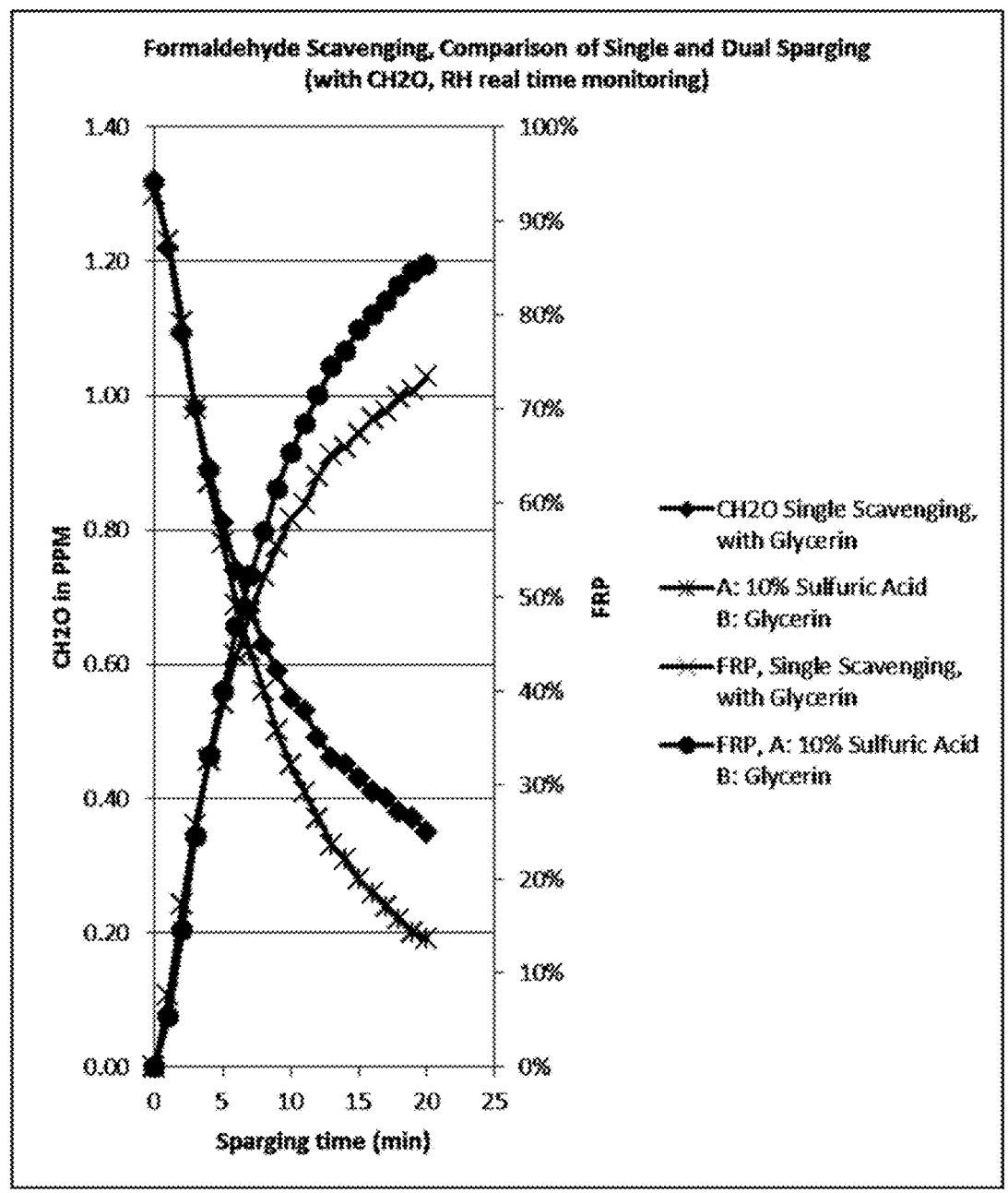
Figure 35:
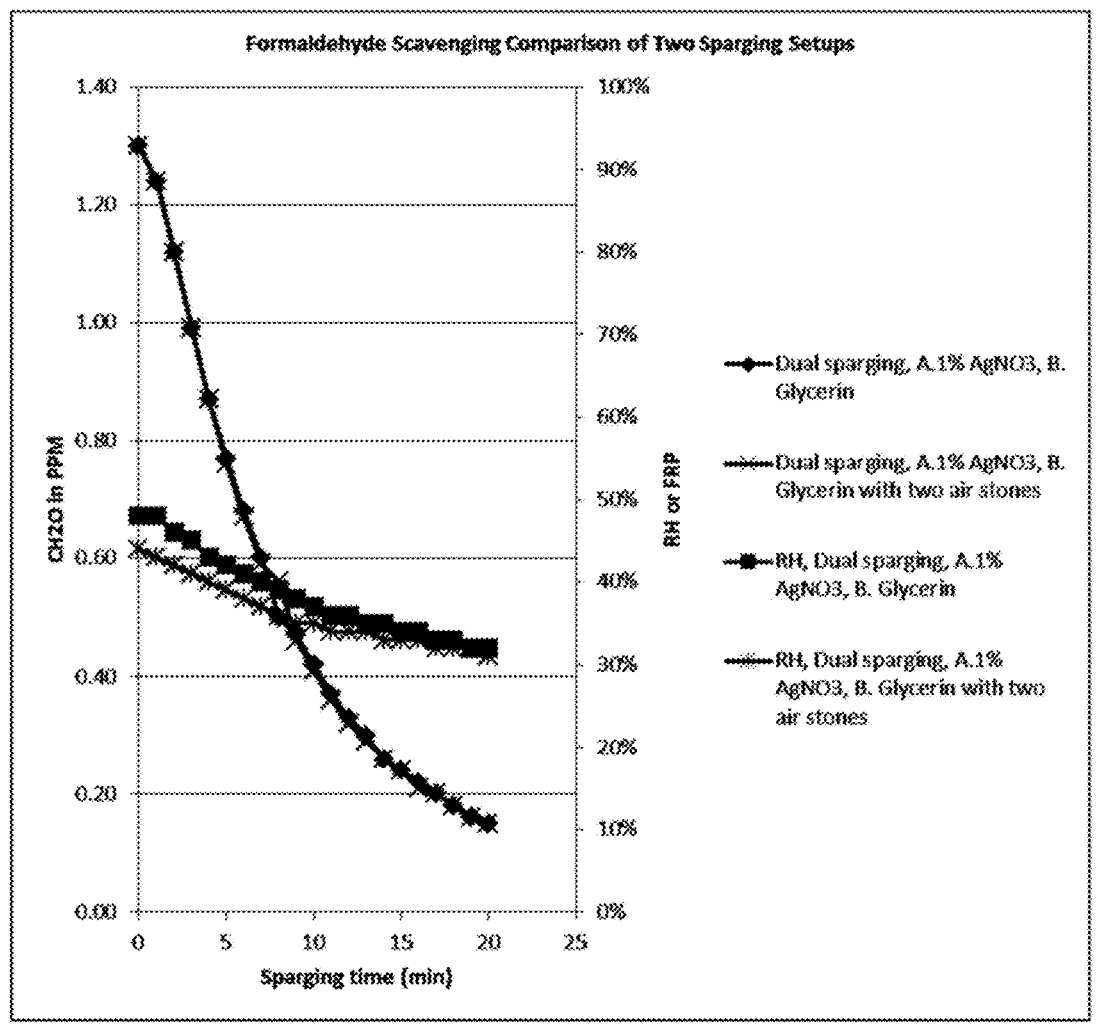
FIGS. 35-36 depict the results from an experiment comparing the effectiveness of using glycerin with silver nitrate as the absorbent liquid with two types of dual sparging systems as represented by FIGS. 8 and 9.
Figure 36:
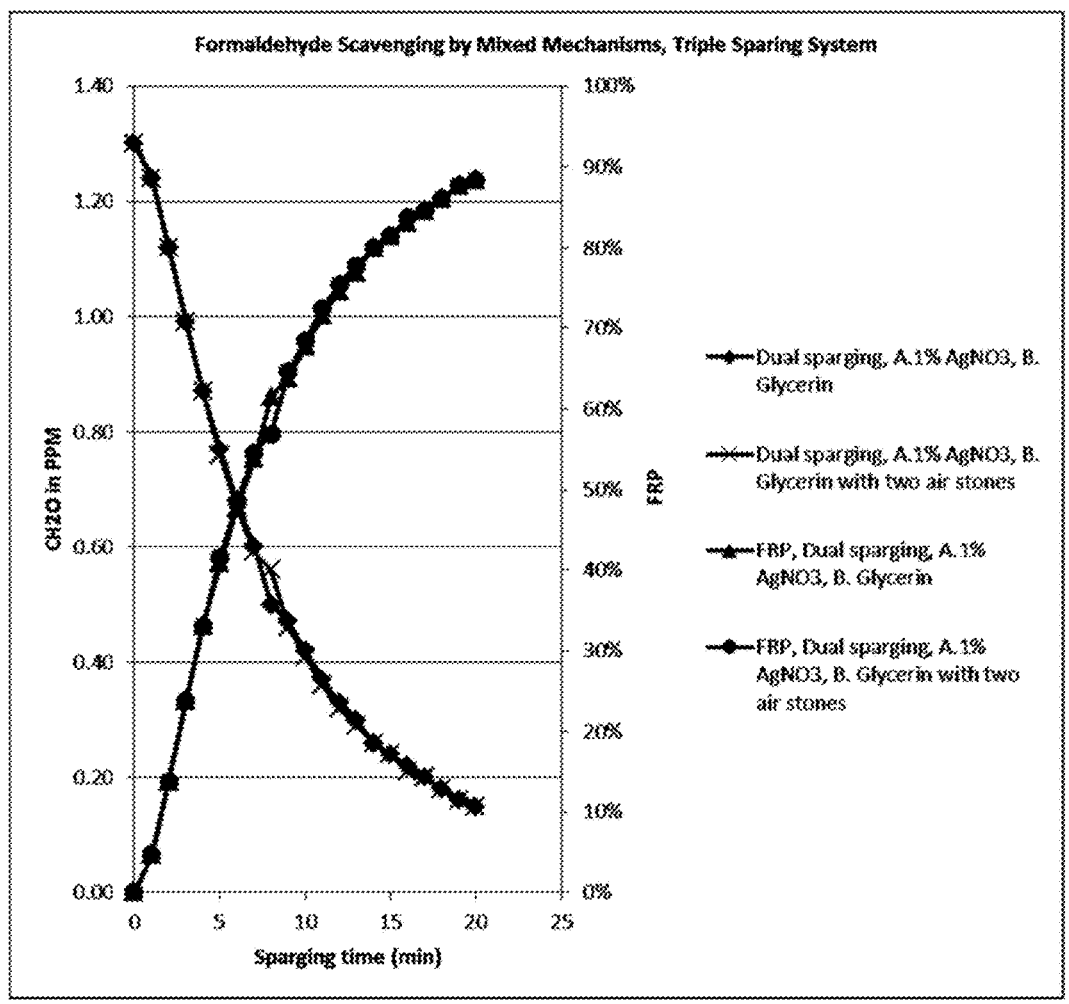
Figure 37:
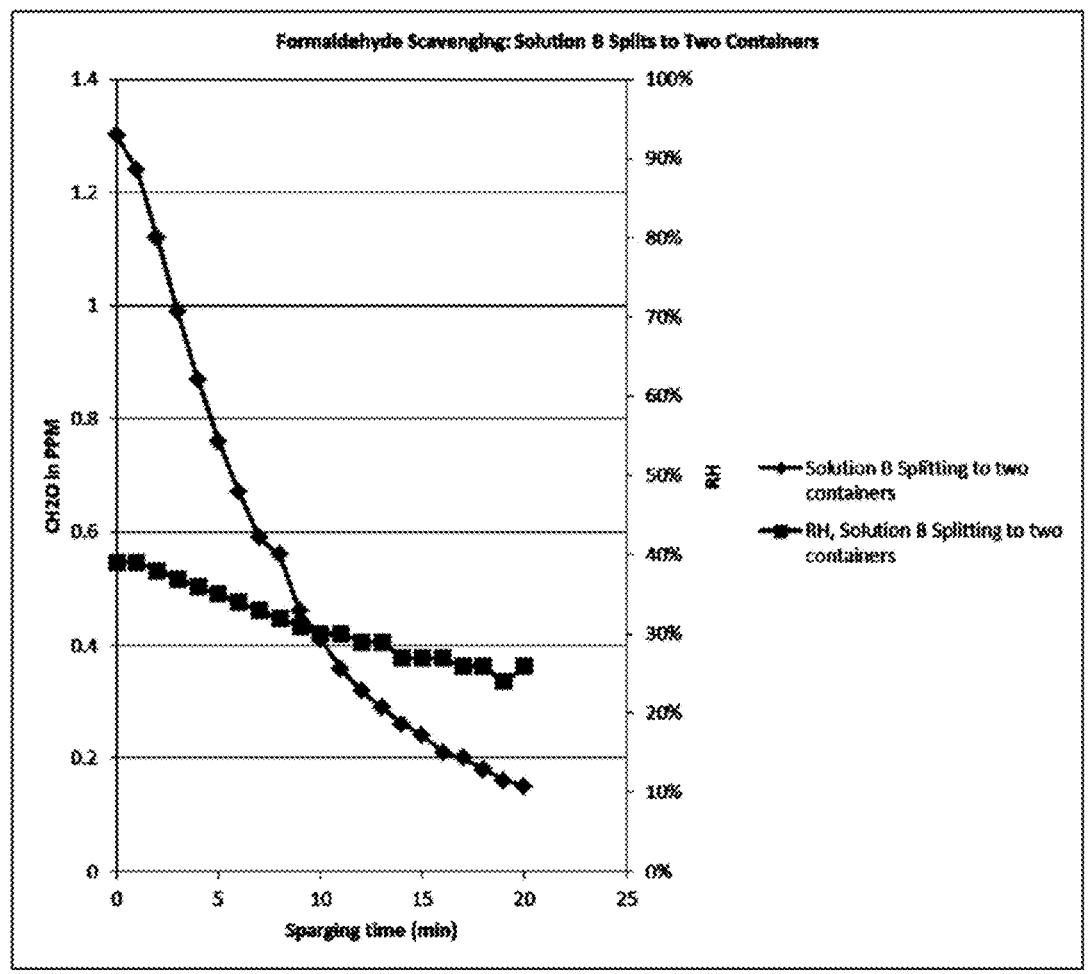
FIGS. 37-38 depict the results from an experiment comparing the effectiveness of using glycerin with silver nitrate as the absorbent liquid using the sparging system depicted in FIG. 9; solution A was 1 g of silver nitrate in 99 g water; solution B1 was 100 g of glycerin and solution B2 was 112 g glycerin.
Figure 38:
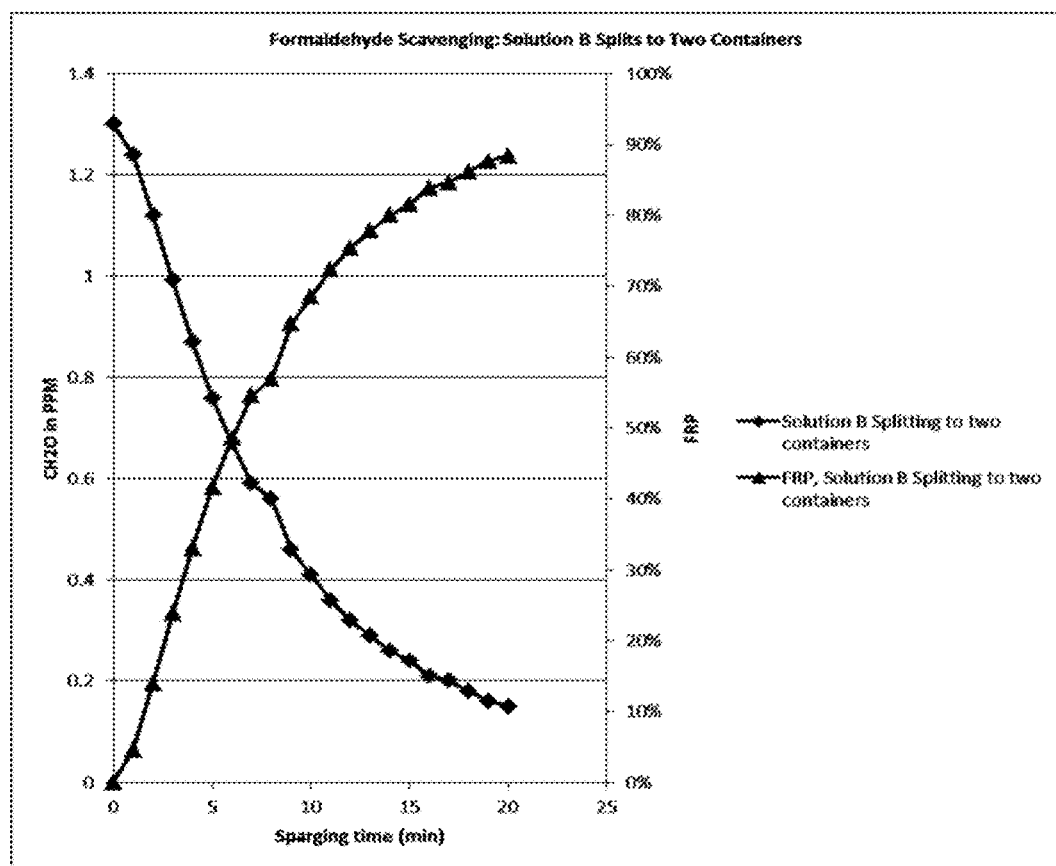
Figure 39:
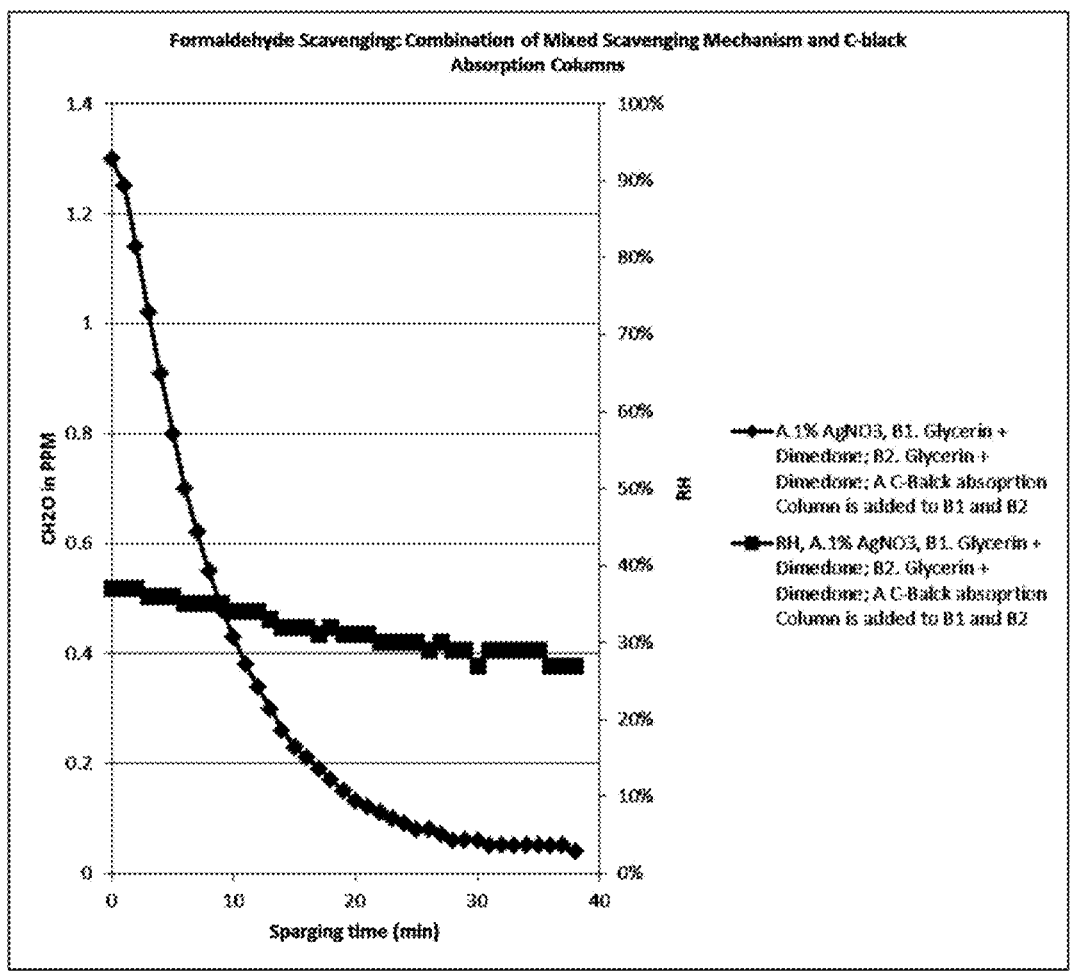
FIGS. 39-40 depict the results from an experiment comparing the effectiveness of using glycerin, silver nitrate and dimedone as the absorbent liquid in the sparging system depicted in FIG. 12. In two separate experiments, Solution A was 1 g of silver nitrate, 99 g water and 0.10 g dimedone; absorbent liquid B1 was 100 g glycerin and 0.10 g dimedone, and solution B2 was 112 g glycerin and 0.10 g dimedone.
Figure 40:
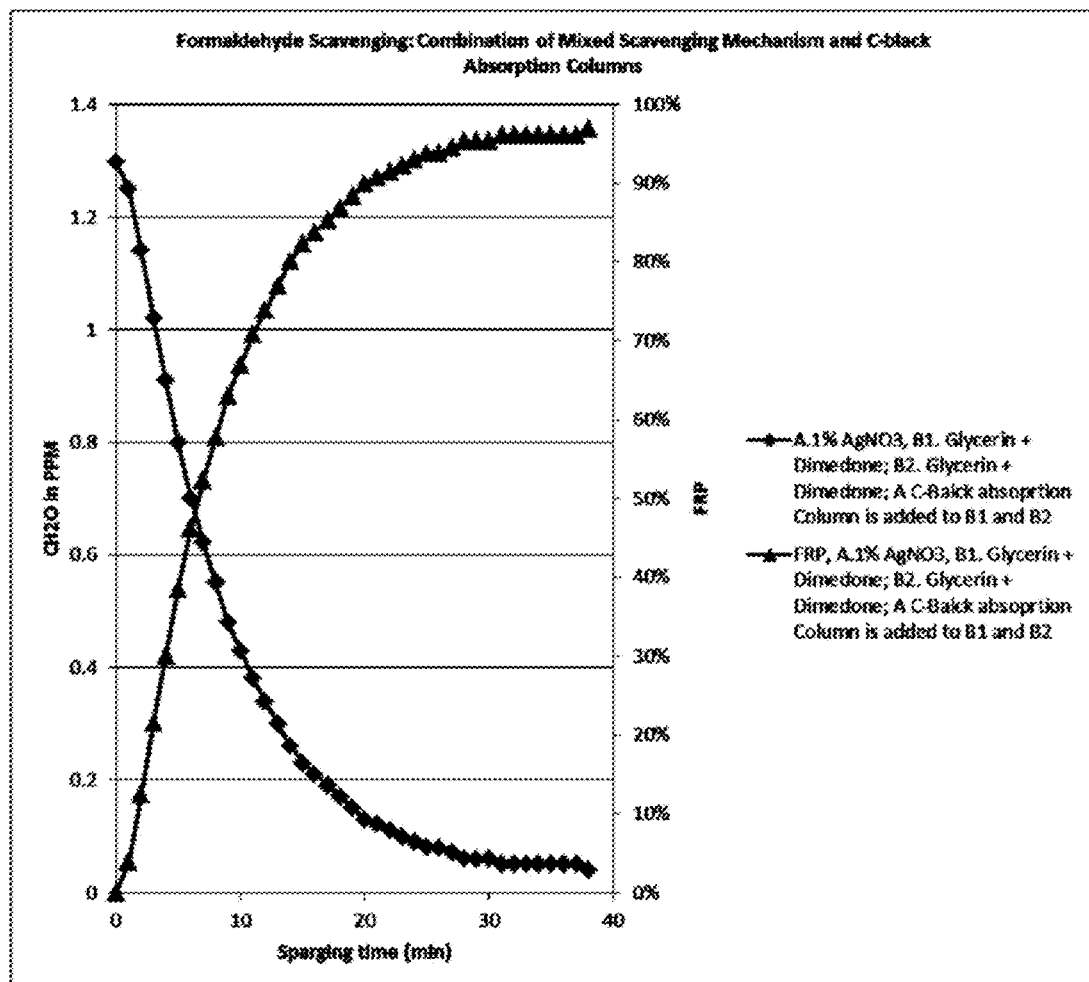
Figure 41:
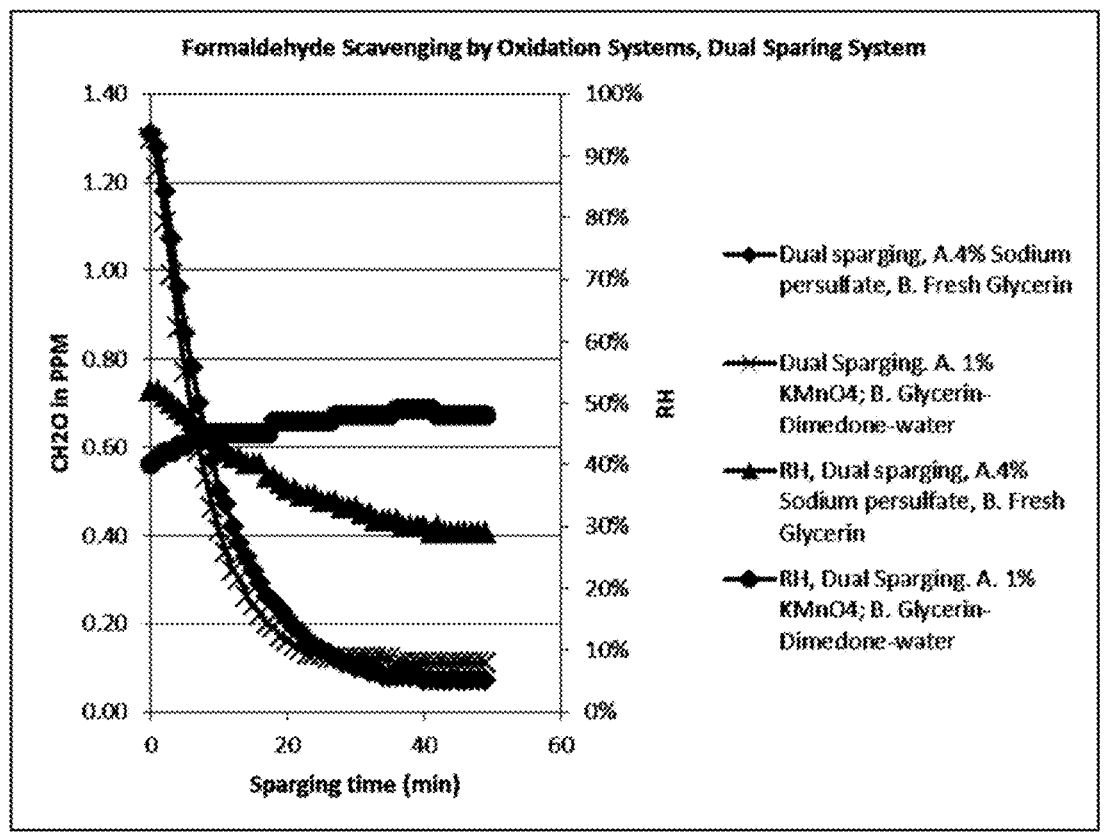
FIGS. 41-42 depict the results from two experiments comparing the effectiveness of two absorbent liquids using the dual sparging system depicted in FIG. 8. In Experiment 1, Solution A was 4% aqueous sodium persulfate and solution B was glycerin alone. In Experiment 2, Solution A was 1% aqueous potassium permanganate and solution B was a mixture of glycerin (89.5 g) and dimedone (0.50 g).
Figure 42:
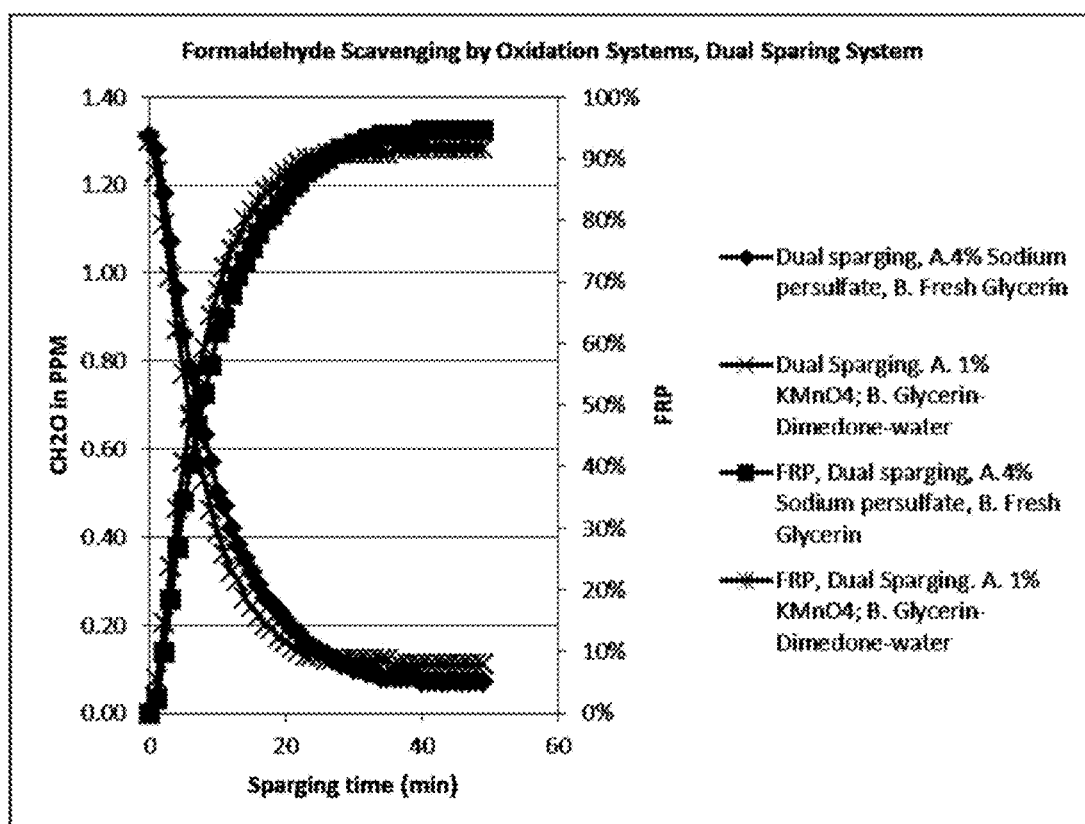
Figure 43:
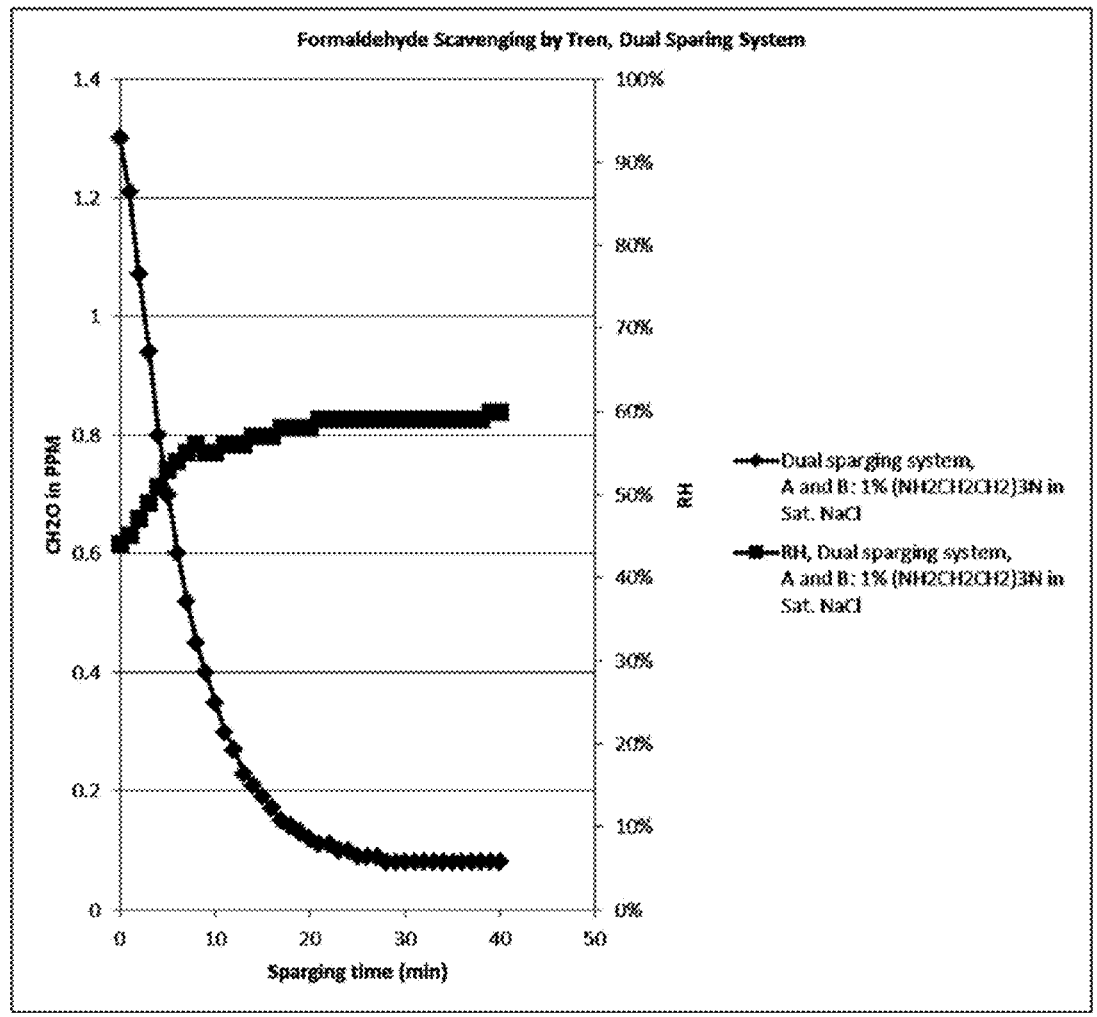
FIGS. 43-44 depict the results from an experiment showing the effectiveness of using tris(2-aminoethyl)amine or Tren, $N(CH_2CH_2NH_2)_3$ in saturated sodium chloride solution and the dual sparging system depicted in FIG. 8. Both Solutions A and B were 1% Tren in saturated NaCl solution.
Figure 44:
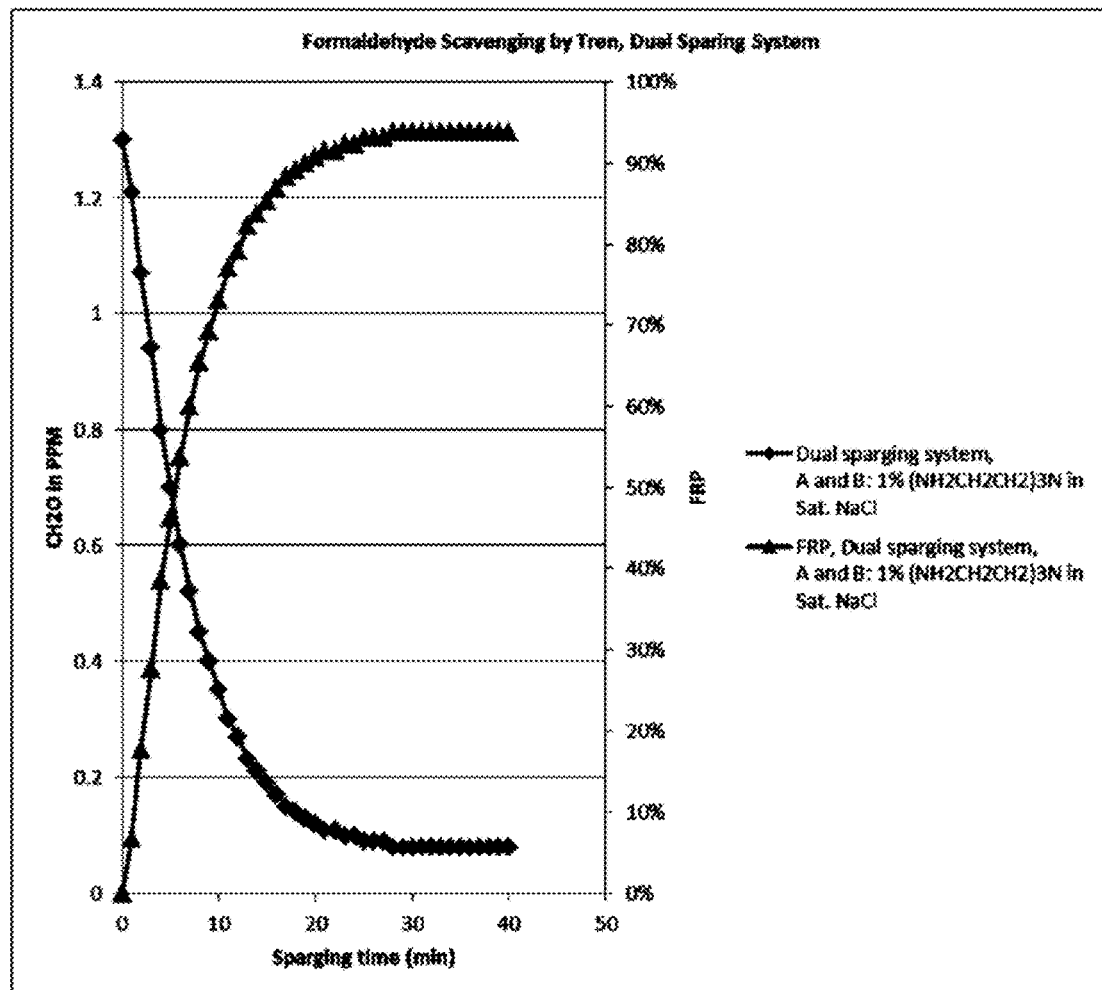
Figure 45:
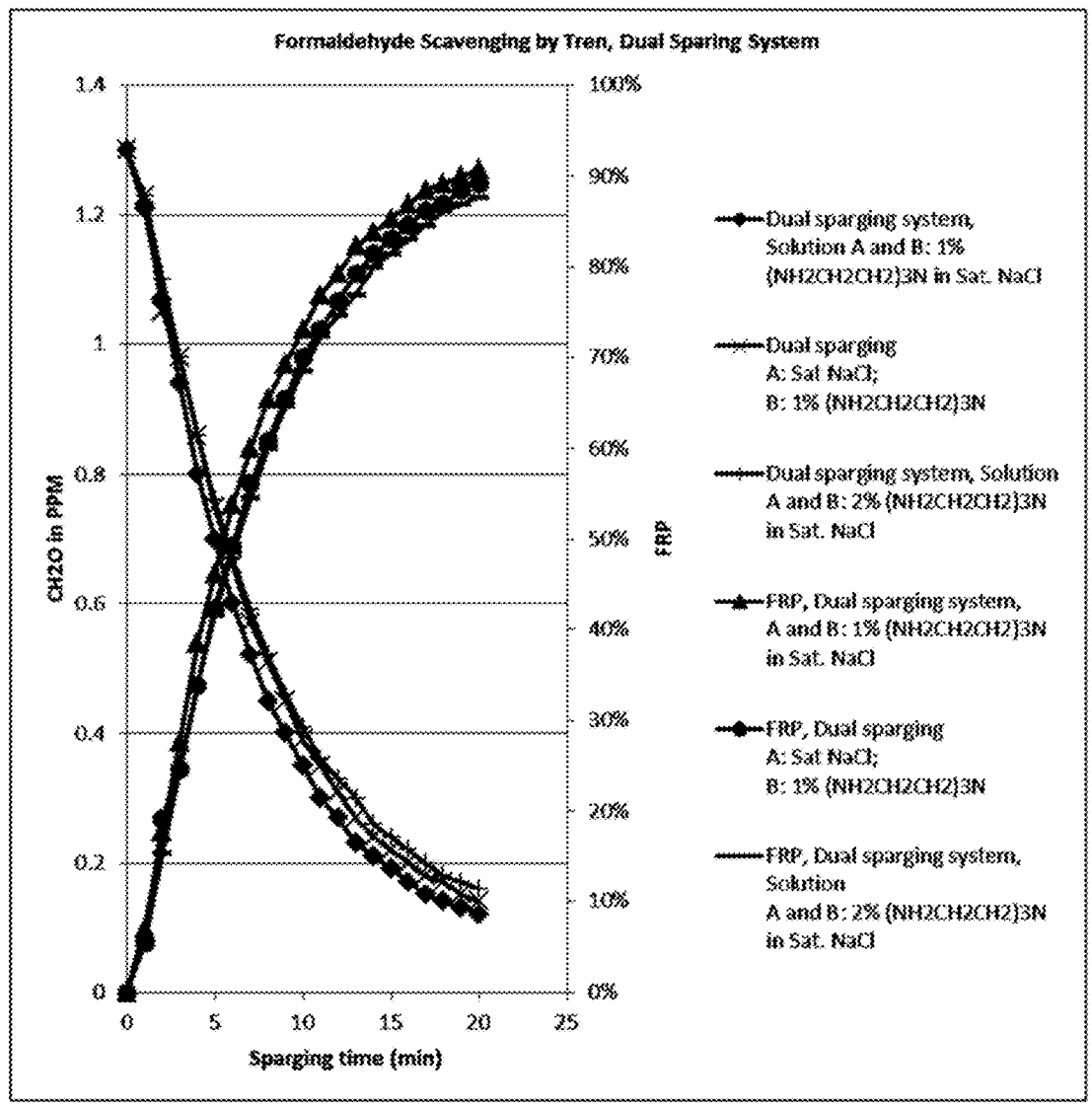
FIG. 45 depicts the results from two additional experiments using the dual sparging system depicted in FIG. 8. Experiment 1 shows the results from using saturated NaCl alone as Solution A and 2% Tren in saturated NaCl as Solution B; Experiment 2 shows the results from using 2% Tren in saturated NaCl for both Solutions A and B. Finally, data for the experiment, where Solutions A and B were 1% Tren in saturated NaCl solution, is shown for comparative purposes.
Figure 46:
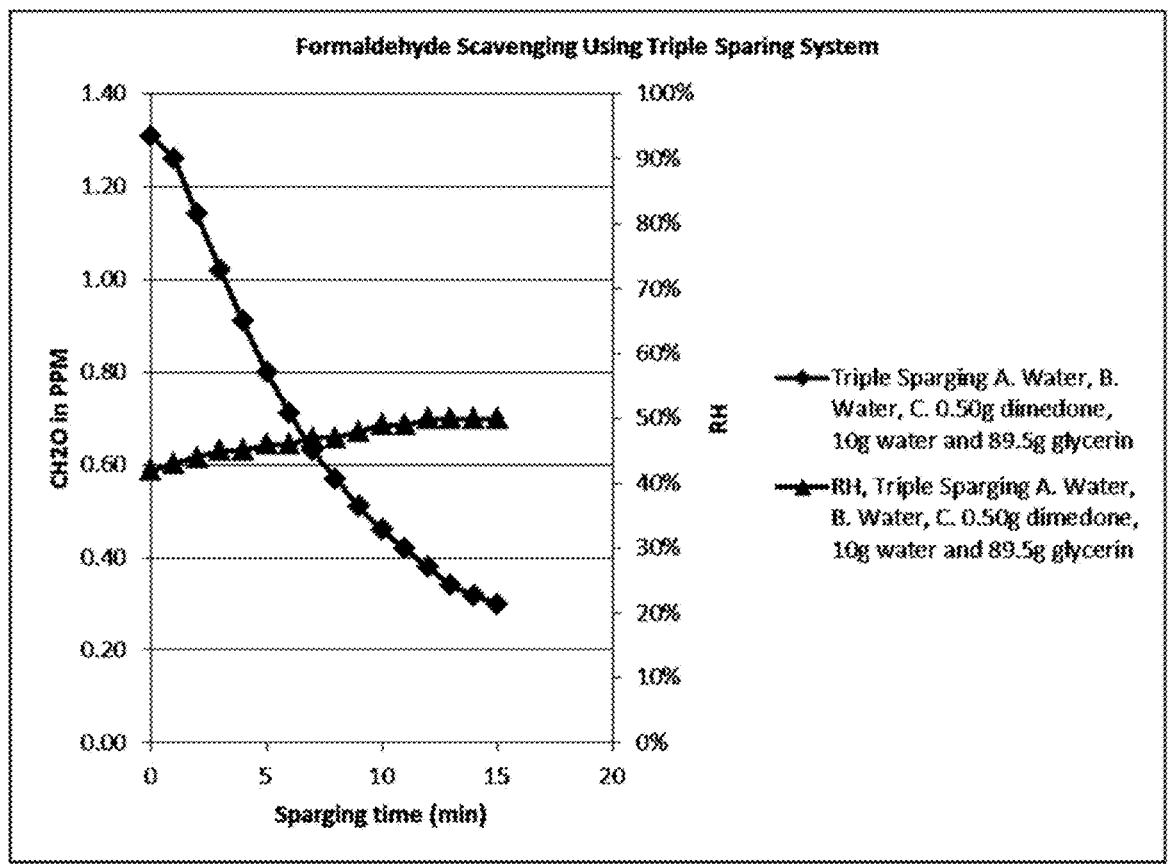
FIG. 46 depicts a result from the use of a triple sparging system as depicted in FIG. 12. In this experiment Solutions A and B were water and Solution C was 0.50 dimedone, 10 g water and 89.5 g glycerin.
Figure 47:
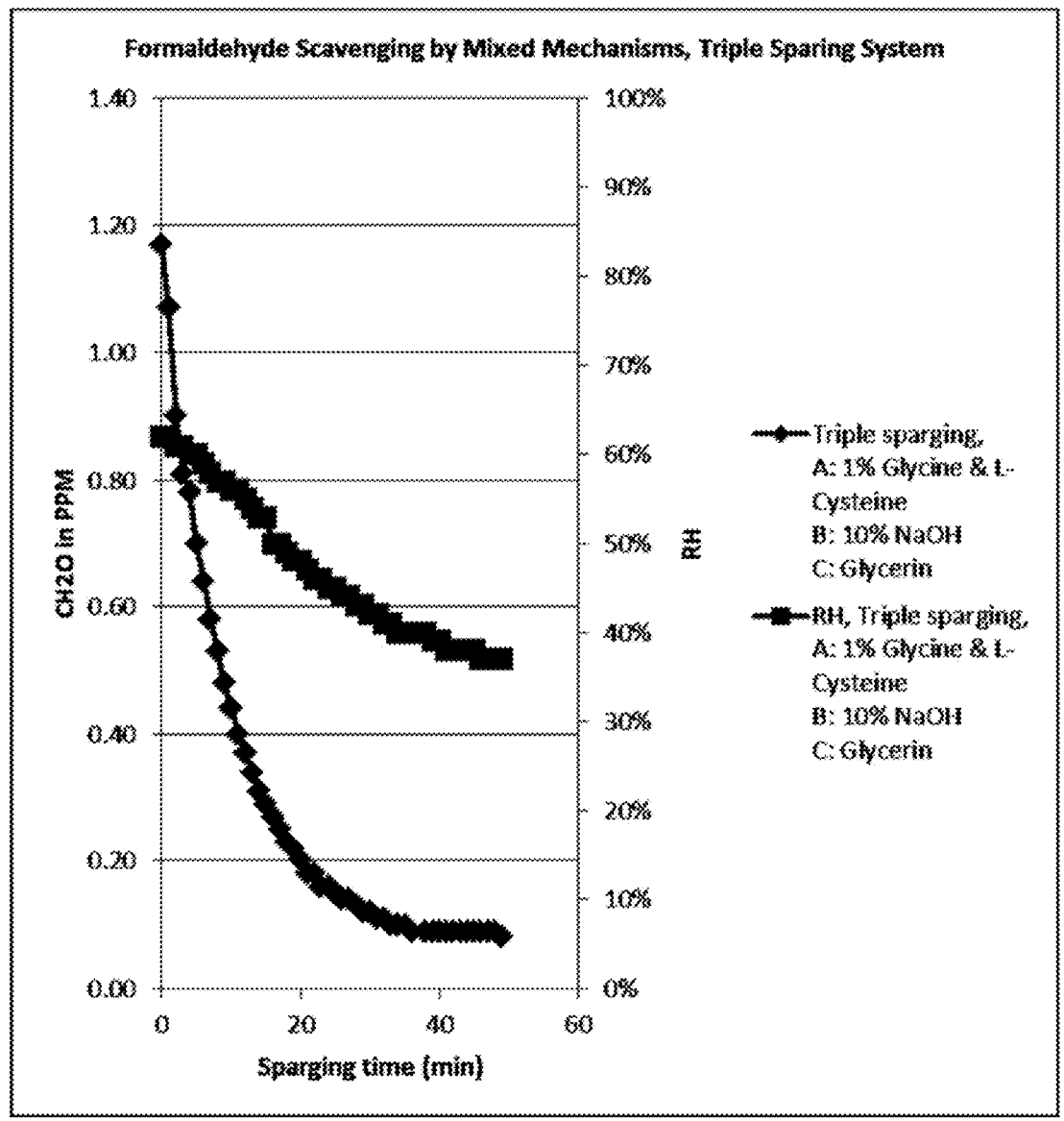
FIGS. 47-48 depict a result from the use of a triple sparging system as depicted in FIG. 12. In this experiment Solution A was 1% glycine L-Cysteine; Solution B was 10% aqueous NaOH and Solution C was glycerin and data was collected up to 49 minutes.
Figure 48:
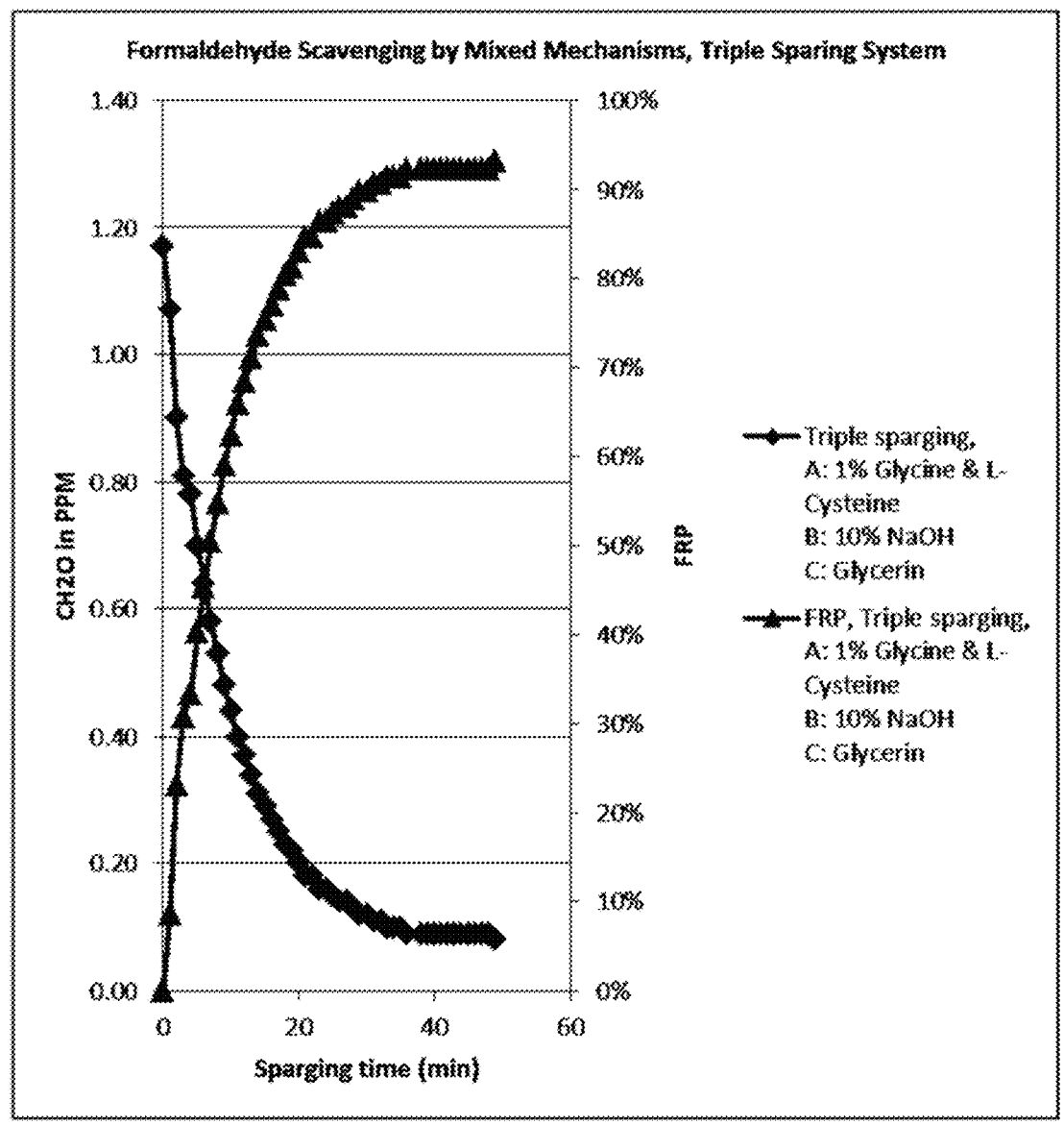
Figure 49:
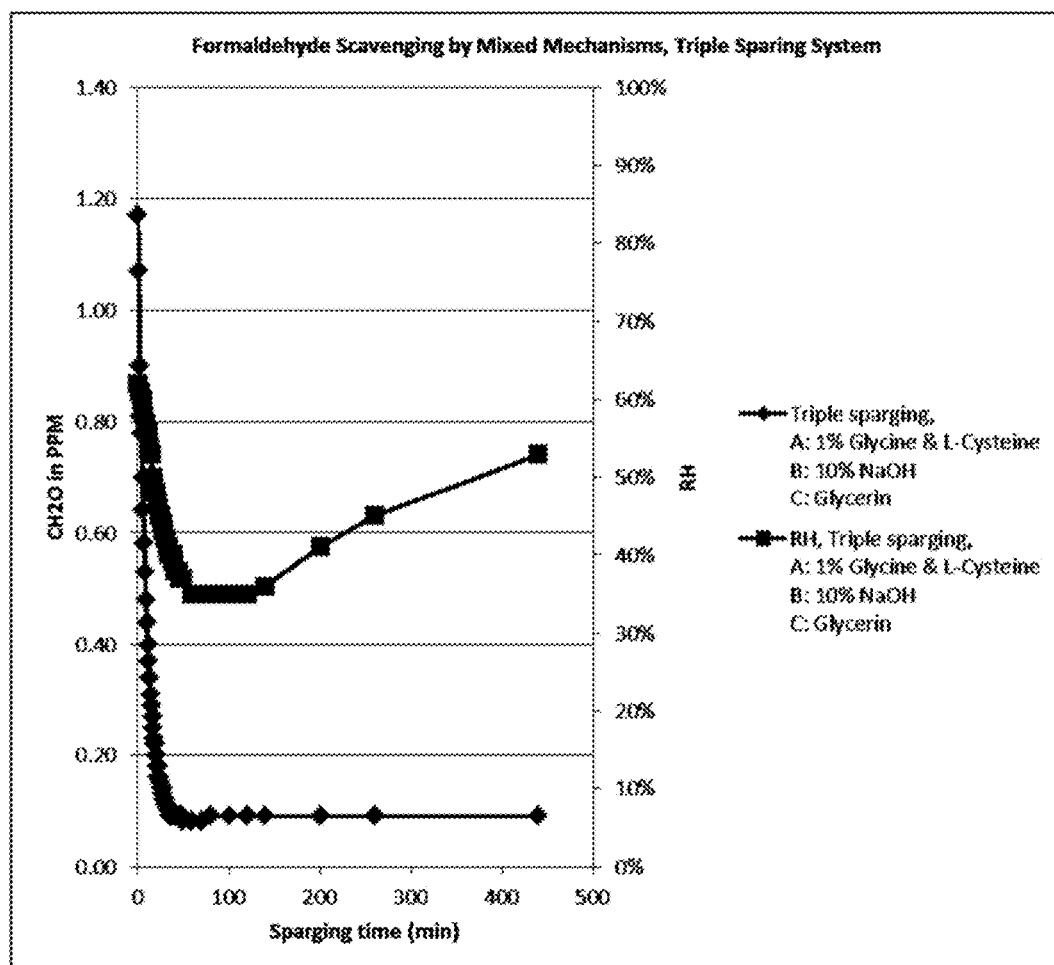
FIG. 49 is a continuation of the experiment in FIG. 47, showing the results from 49 to 440 minutes of sparging.
Figure 50:
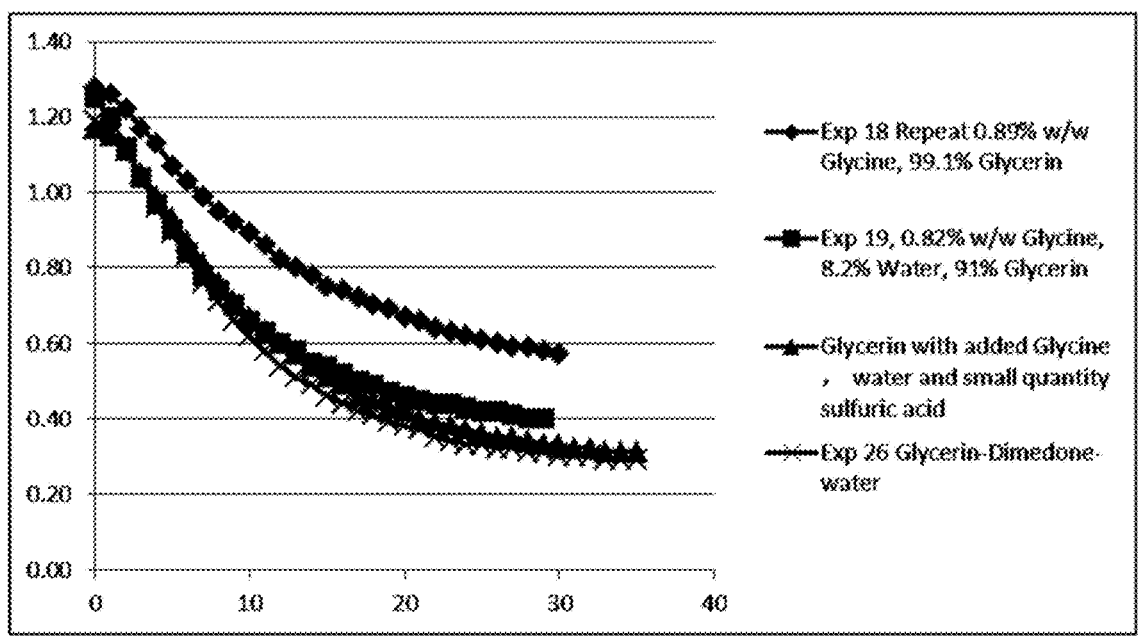
FIG. 50 shows the results from sparging experiments through mixtures containing glycine/glycerin, glycine/water/glycerin; glycine/glycerin/sulfuric acid; and glycerin/dimedone/water.
Figure 51:
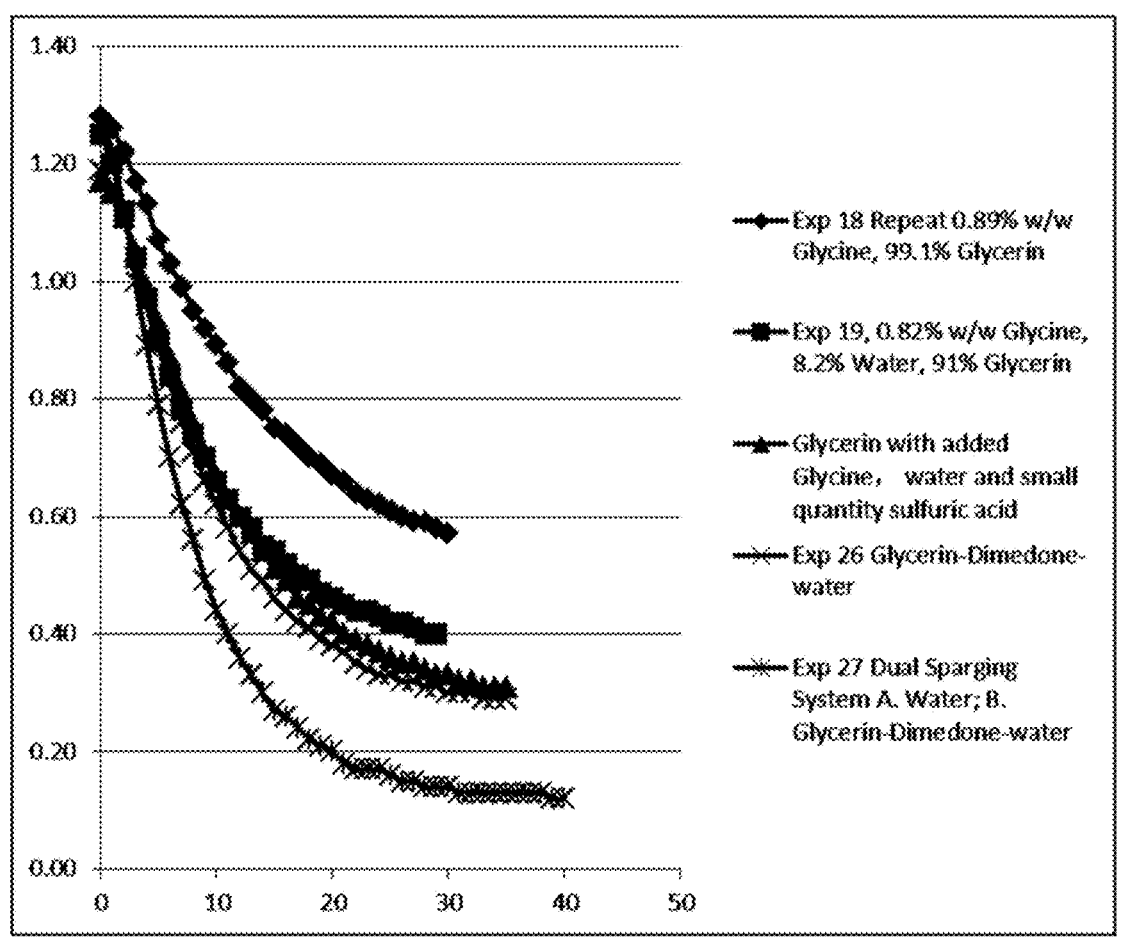
FIG. 51 shows the results from single sparging experiments through mixtures containing glycine/glycerin, glycine/water/glycerin; glycine/glycerin/sulfuric acid; and glycerin/dimedone/water as compared to a dual sparging experiment through a) water followed by b) glycerin/dimedone/water.
Figure 52:
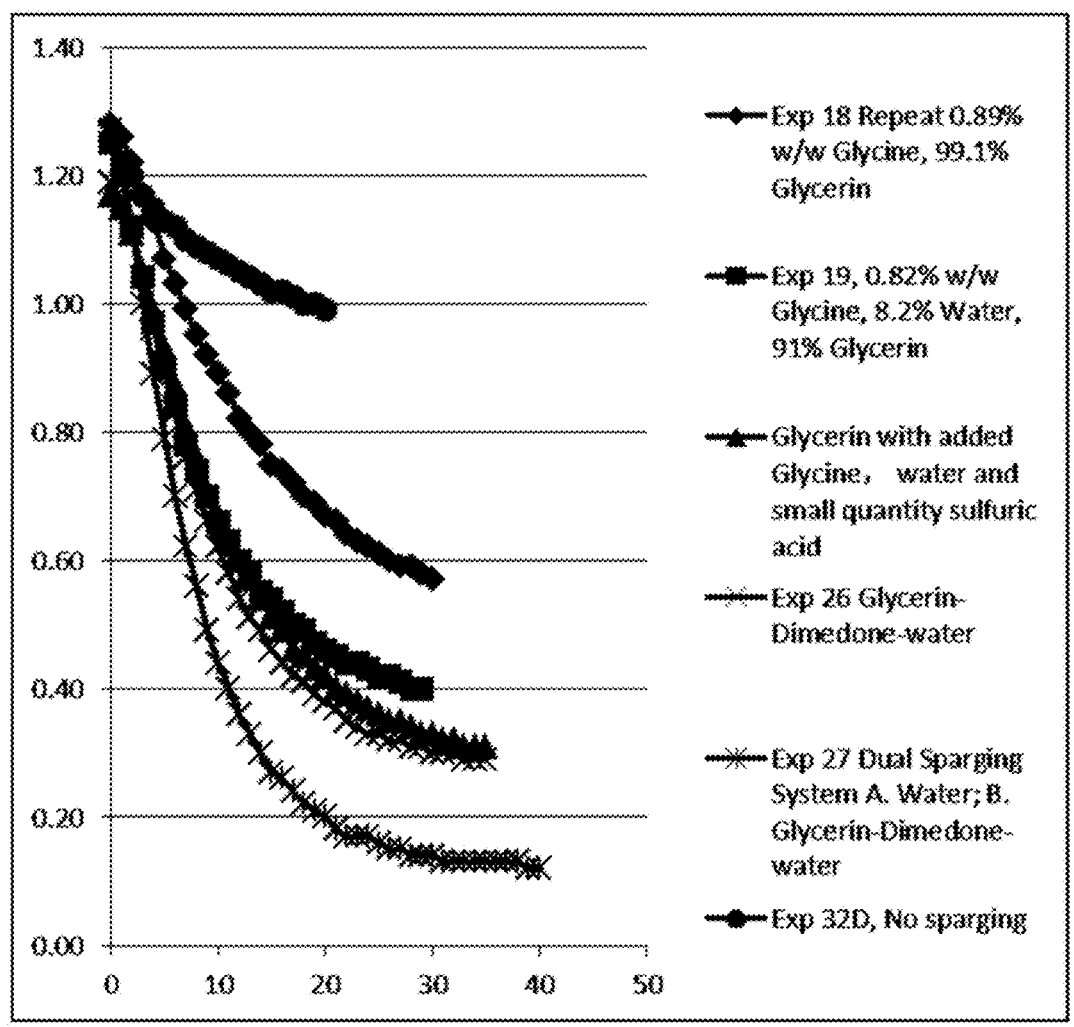
FIG. 52 shows the results from single sparging experiments through mixtures containing glycine/glycerin, glycine/water/glycerin; glycine/glycerin/sulfuric acid; and glycerin/dimedone/water as compared to a dual sparging through a) water followed by b) glycerin/dimedone/water; and further compared to the results from no sparging.
Figure 53:
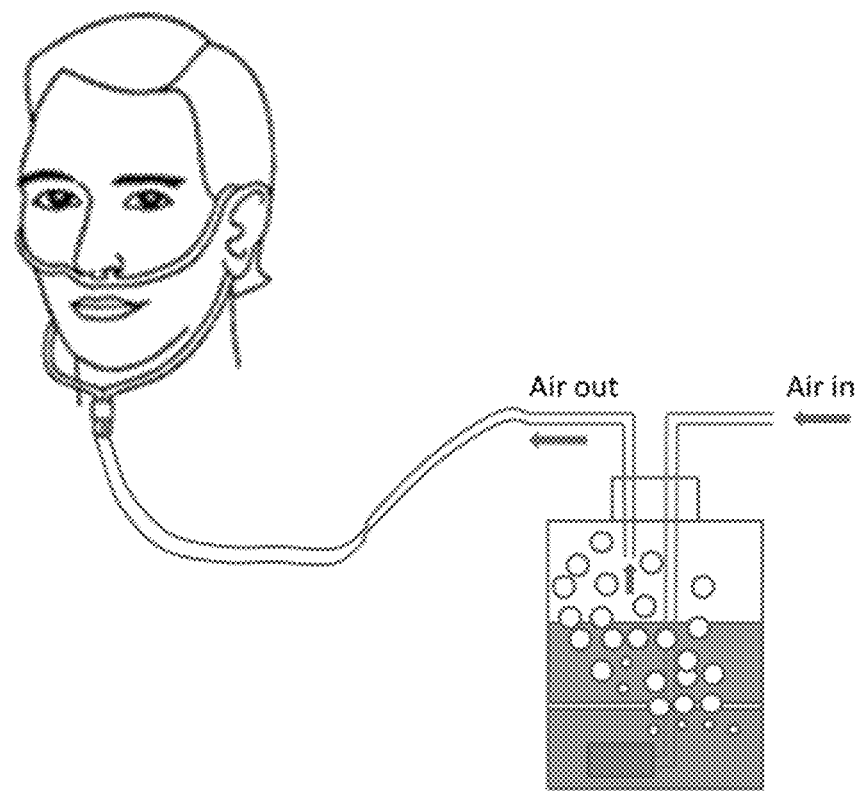
FIG. 53 is an illustration of one aspect of the invention in which the air is purified by sparging of the air through a vessel containing an absorbent liquid, and the purified air exiting the vessel is delivered to an individual via tubing directed to the nose.
Figure 54:
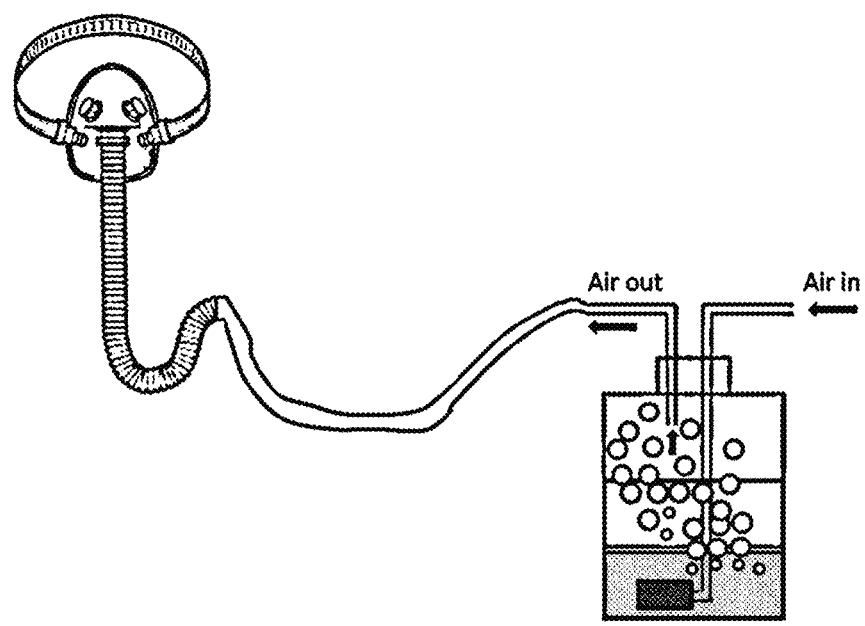
FIG. 54 is an illustration of one aspect of the invention in which the air is purified by sparging through a vessel containing an absorbent liquid, and the purified air exiting the vessel is delivered to an individual via tubing connected to a face mask.
Figure 55:
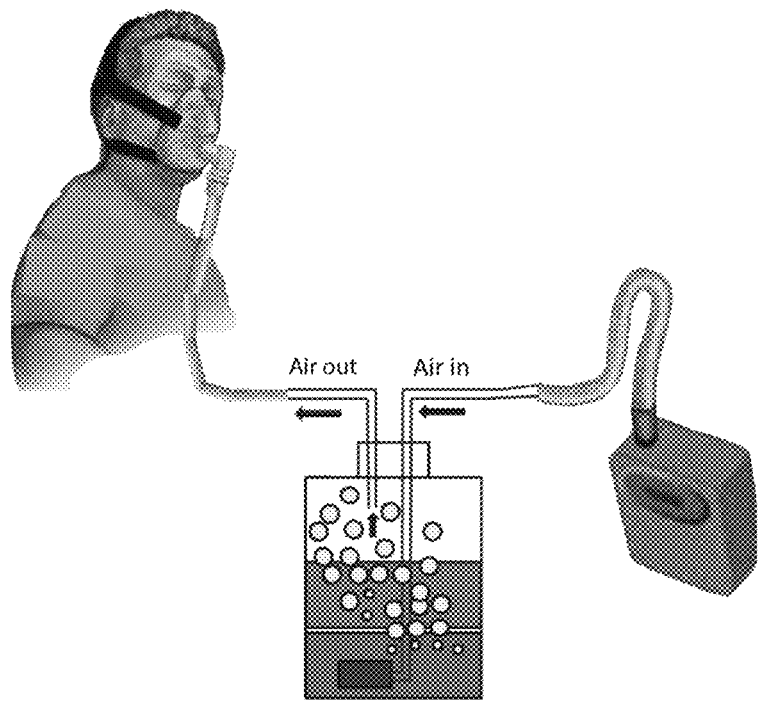
FIG. 55 is an illustration of one aspect of the invention in which the air, collected and pumped using a portable air pump, is purified by sparging the air through a vessel containing an absorbent liquid, and the purified air exiting the vessel is delivered to an individual via tubing connected to a face mask which can be affixed to an individual's nose and mouse in a sealed fashion.

As an example, Solution A (water)/Solution B (glycerin) was evaluated and the results appear in FIG. 27.

Comparing the results from many experiments, it is observed that the level of formaldehyde removal from air is faster in dual sparging system than the single sparging system. In this particular experiment, 87% formaldehyde is removed in just 20 min (starting from 1.30 ppm).

Using the above methods, additional experiments were conducted in order to measure the effectiveness of various absorbent liquids in removing various contaminants. The results are summarized in Table 9.

TABLE 9

Effectiveness of absorbent liquids in removing contaminants

| Example | Sparging System, FIG. | Absorbent Liquid | Contaminant | Results Plot, FIG.(s) | Comments |
|---------|----------------------|------------------|-------------|----------------------|----------|
| 14 | 6 | glycerin with glycine | Formaldehyde | 25, 26 | |
| 15 | 8 | A Water; B glycerin | Formaldehyde | 27-29 | dual sparging system was more efficient. in removing formaldehyde |
| 16 | 6 | glycerin | Formaldehyde | 27, 28 | |
| 17 | 8 | A: water; B dimedone/glycerin | Formaldehyde | 29, 30 | dual sparging system was more efficient. in removing formaldehyde |
| 18 | 6 | water/dimedone/glycerin | Formaldehyde | 29, 30 | |
| 19 | 6 | glycerin with glycine | Formaldehyde | 25, 27 | |
| 20 | 8 | A Water; B glycerin | Formaldehyde | 27, 28 | dual sparging system was more efficient. in removing formaldehyde |
| 21 | 6 | glycerin | Formaldehyde | 27, 28 | 17 |
| 22 | 8 | A: water; B dimedone/glycerin | Formaldehyde | 29, 30 | dual sparging system was more efficient. in removing formaldehyde |
| 23 | 6 | water/dimedone/glycerin | Formaldehyde | 29, 30 | |
| 24 | 8 | A: 1% glycine/1% L-Cysteine B: glycerin | Formaldehyde | 31, 32 | The volume of Solution A decreased and Solution B increased over 27 h. Addition of 40 g of NaCl prevented this. |
| 25 | 6 | glycerin | Formaldehyde | 31, 32 | |
| 26 | 8 | A 10% sulfuric Acid; B glycerin | Formaldehyde | 33, 34 | |
| 27 | 6 | glycerin | Formaldehyde | 33, 34 | |
| 28 | 8 | A: 1% $AgNO_3$ (aq) B: glycerin | Formaldehyde | 35, 36 | |
| 29 | 9 | A: 1% $AgNO_3$ (aq) B: glycerin | Formaldehyde | 35, 36 | additional sparging had little effect on RH |
| 30 | 11 | A: 1% $AgNO_3$ (aq) B1: glycerin B2: glycerin | Formaldehyde | 37, 38 | |

TABLE 9-continued

Effectiveness of absorbent liquids in removing contaminants

| Example | Sparging System, FIG. | Absorbent Liquid | Contaminant | Results Plot, FIG.(s) | Comments |
|---|---|---|---|---|---|
| 31 | 12 | A: 1% AgNO$_3$ (aq) B1: 100 g glycerin & 0.10 g dimedone B2: 112 g glycerin & 0.10 g dimedone | Formaldehyde | 49, 40 | Two C-black columns added |
| 32 | 8 | A: 1% KMNO$_4$ B: glycerin/ dimedone/ water | Formaldehyde | 41, 42 | permanganate and glycerin are not compatible in the same vessel |
| 33 | 8 | A: 4% sodium persulfate B: glycerin | Formaldehyde | 41, 42 | |
| 34 | 8 | A & B: 1% Tren in satd. NaCl soln | Formaldehyde | 43-45 | superior formaldehyde removal |
| 35 | 8 | A: satd. NaCl B: 1% Tren in satd. NaCl soln | Formaldehyde | 45 | |
| 36 | | A & B: 2% Tren in satd. NaCl soln | Formaldehyde | 45 | |
| 37 | 12 | A; water B water C: 0.5 g dimedone, 10 g water, 89.5 g glycerin | Formaldehyde | 46 | |
| 38 | 12 | A; 1% Glycine (1 g), 1% L-Cysteine (1 g), 2% NaHSO$_3$ in water (96 g) B 10% NaOH (10 g), water 90 g C: glycerin | Formaldehyde | 47-49 | humidity increases after 200 min. |
| 39 | 12 | A: glycerin B1: water B2: glycerin | Formaldehyde | 50-52 | |
| 40 | 12 | A; glycerin B1 water B2 glycerin | Formaldehyde | 50-52 | |
| 41 | 12 | A; glycerin B1 water B2 glycerin | Formaldehyde | 50-52 | |
| 42 | 12 | A; glycerin B1 water B2 glycerin | Formaldehyde | 50-52 | |

Removal of Volatile Organic Chemicals (VOCs)

Example 43

Figure 6:
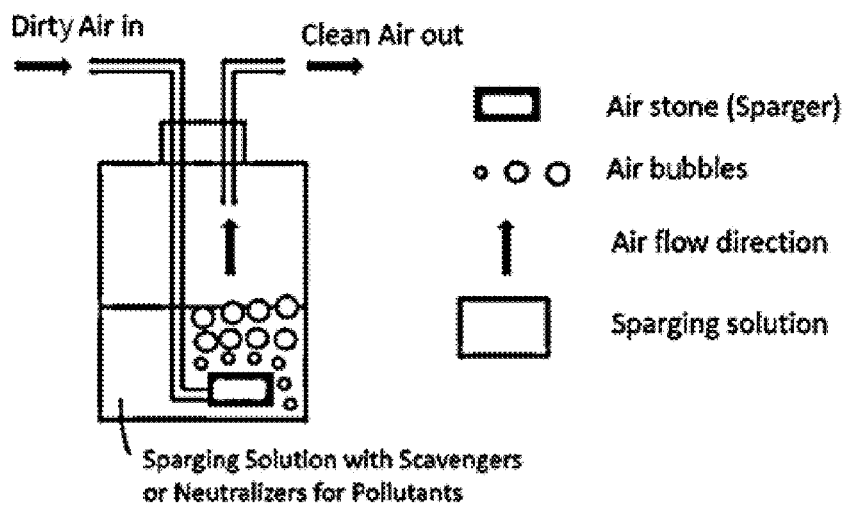
FIG. 6 is a schematic of one aspect of the invention, representing a vessel containing an absorbent liquid (sparging solution) and the direction of air flow. The contaminated, unpurified, or dirty environmental space air enters below the surface of the liquid, is dispersed through the liquid by means of an air stone, reaches the surface of the liquid and exits in the direction shown as purified or clean air. The top of the vessel is sealed except for the in port and the out port, and air flow is accomplished by means of an air pump (see FIG. 55).
Figure 7:
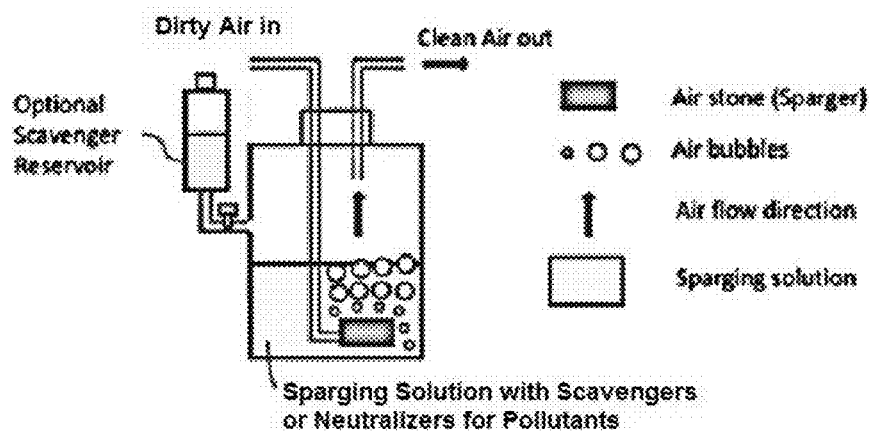
FIG. 7 represents a second aspect of the invention in which the apparatus depicted in FIG. 6 is fitted with a reservoir containing one way that optional additives (scavengers) can be added to the vessel.
Figure 57:
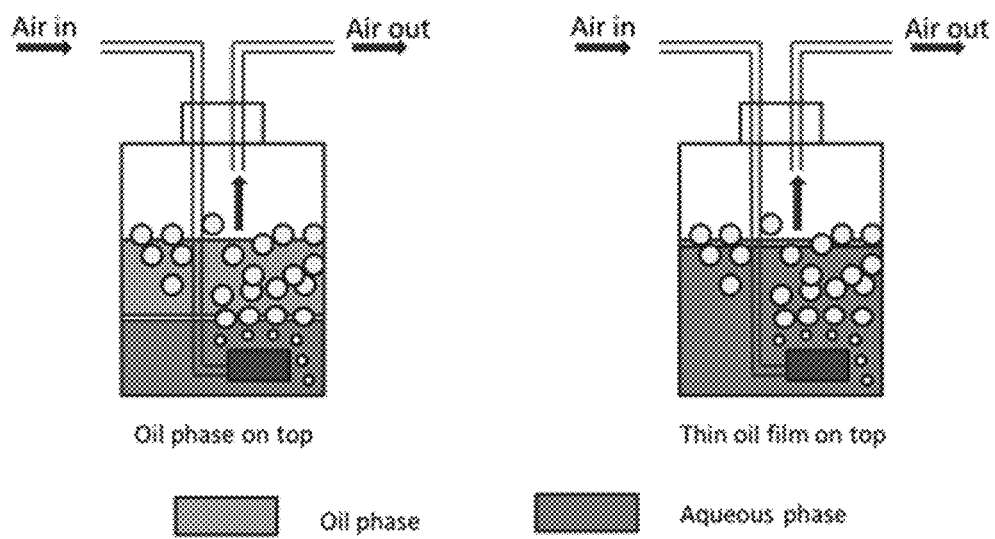
FIG. 57 is an illustration of one aspect of the invention, showing a sparging system in which the absorbent liquid in the vessel is an immiscible mixture forming a biphasic, or two-layer liquid. The entry point of the contaminated environmental space air is below the lower phase or layer, insuring that the air comes in contact with, in succession, both phases and layers of the absorbent liquid.

A sparging apparatus similar to that illustrated in FIG. 6, but adapted as shown in FIG. 57 was used to the effectiveness of household comestible corn oil with water in a biphasic system as the absorbent liquid.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims:

The invention claimed is:

1. An apparatus for the removal of contaminants from the environmental space air, said apparatus consisting of
    a. an air transferring device with intake and output ports, such that when the device is operated, the intake port collects environmental space air which is transferred to the output port;

b. a vessel fitted with sealed intake and output ports, containing an absorbent liquid medium configured to remove said contaminants by dissolution, physical entrapment, or chemical reaction, said absorbent liquid medium comprising water and glycerin, and said vessel optionally having one or more ports for addition and/or removal of the liquid medium;

c. one or more conduits for transferring air from the output port of the air transferring device to the intake port of the vessel containing the absorbent liquid medium, said conduits positioned so that the air from the output port of the air transferring device enters the intake port of the vessel below the level of the absorbent liquid medium contained in the vessel, said air being introduced without a diffusing device attached to the conduit entering the intake port, and then passes through the medium becoming purified air; and d. a means for the release of the purified air from the vessel to the environmental space, wherein said means is one or more conduits leading from above the absorbent liquid medium in the vessel to the environmental space, or one or more openings in the vessel, above the absorbent liquid medium in the vessel, to the environmental space.

2. The apparatus of claim 1 wherein the absorbent liquid medium further comprises one or more additives independently selected from the group consisting of an aliphatic alcohol, an aliphatic polyol, an aliphatic ketone, vegetable oil, animal fat, a polyethylene glycol, silicone oil, an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant.

3. The apparatus according to claim 1 in which the vessel contains a liquid medium that is suitable as an aquatic environment for fish and/or plants.

4. The apparatus according to claim 1 in which the absorbent liquid medium is configured to remove at least 50% formaldehyde from formaldehyde-contaminated air in 24 hours or less by dissolution, physical entrapment, or chemical reaction.

5. The apparatus according to claim 1 in which the input port air is configured to capture environmental space air enclosed within a home, office, medical facilities, food storage spaces, or a motor vehicle.

6. The apparatus according to claim 1 in which the absorbent liquid medium is configured to remove at least 77% formaldehyde from formaldehyde-contaminated air in 30 minutes or less by dissolution, physical entrapment, or chemical reaction.

7. A method of using the apparatus of claim 1 to remove one or more contaminants from contaminated environmental space air, while optionally and independently improving the temperature and level of relative humidity of the air, comprising the steps of a. passing the contaminated environmental space air, by means of the air transferring device, through the absorbent liquid medium contained in the vessel, wherein the temperature and hygroscopicity of the liquid medium are optionally and independently controlled, said liquid medium optionally containing one or more additives capable of interacting with the contaminants;

b. allowing the contaminated environmental space air to come in contact with the absorbent liquid medium and optional additives such that one or more contaminants from the contaminated environmental space air are transferred into the absorbent liquid medium and are thereby removed to produce decontaminated environmental space air, and the temperature and humidity of the air are optionally and independently improved;

c. releasing the decontaminated environmental space air from the vessel into the environmental space, thereby lowering the level of one or more contaminants in the environmental space air, and optionally and independently improving the temperature and humidity of the environmental space air.

8. The method according to claim 7 in which the contaminant to be removed is selected from airborne pollen, microorganisms, viral particles, bacteria, fungal spores, and mites.

9. An apparatus for the removal of contaminants from the environmental space air, said apparatus consisting of a. an air pump with intake and output ports for the environmental space air;

b. three vessels, each fitted with sealed intake and output ports, each vessel containing a different, independently selected absorbent liquid medium;

c. a first conduit connected to the output port of the pump and to the input port of a first vessel, said conduit positioned so that the air from the pump enters the input port of the first vessel below the level of the absorbent liquid medium; said air being introduced without a diffusing device attached to the conduit entering the intake port, d. a second conduit connected to the first vessel output port and to the second vessel input port, said conduit positioned so that the output air from the first vessel enters the input port of the second vessel below the level of the absorbent liquid medium in the second vessel, said air being introduced without a diffusing device attached to the conduit entering the intake port;

e. a third conduit connected to the second vessel output port, said conduit positioned so that the air from the second vessel enters the intake port of the third vessel below the level of the absorbent liquid medium, said air being introduced without a diffusing device attached to the conduit entering the intake port;

f. a fourth conduit connected to the third vessel output port in the series and to the environment space, said conduit positioned above the level of the absorbent liquid medium;

wherein each independently selected absorbent liquid medium is selected from the group consisting of water, glycerin, an aliphatic alcohol, an aliphatic polyol, an aliphatic ketone, vegetable oil, animal fat, a polyethylene glycol, and silicone oil; and optionally containing one or more additives independently selected from the group consisting of an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, glycerin, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant.

10. The apparatus according to claim 9, in which one or more vessels additionally comprise ports for addition and removal of the liquid absorbent medium contained therein.

11. A method of using the apparatus of claim 9 to remove of one or more contaminants from contaminated environmental space air, while optionally and independently improving the temperature and level of relative humidity of the air, comprising the steps of
   a. passing the contaminated environmental space air, by means of the air transferring device, through the absorbent liquid medium contained in each vessel, wherein the temperature and hygroscopicity of the liquid medium are optionally and independently controlled, said liquid medium optionally containing one or more additives capable of interacting with the contaminants;
   b. allowing the contaminated environmental space air to come in contact with the absorbent liquid medium and optional additives such that one or more contaminants from the contaminated environmental space air are transferred into the absorbent liquid medium and are thereby removed to produce decontaminated environmental space air, and the temperature and humidity of the air are optionally and independently improved;
   c. releasing the decontaminated environmental space air from third vessel into the environmental space, thereby lowering the level of one or more contaminants in the environmental space air, and optionally and independently improving the temperature and humidity of the environmental space air.

12. An apparatus for the removal of contaminants from the environmental space air, said apparatus comprising
   a. an air transferring device with intake and output ports, such that when the device is operated, the intake port collects environmental space air which is transferred to the output port;
   b. a vessel fitted with sealed intake and output ports, containing an absorbent liquid medium configured to remove said contaminants by dissolution, physical entrapment, or chemical reaction,
      wherein, said vessel is a toilet tank and the input port of the air transferring device is positioned outside the confines of the toilet bowl, and optionally having one or more ports for addition and/or removal of the liquid medium;
   c. one or more conduits for transferring air from the output port of the air transferring device to the intake port of the vessel containing the absorbent liquid medium, said conduits positioned so that the air from the output port of the air transferring device enters the intake port of the vessel below the level of the absorbent liquid medium contained in the vessel, said air being introduced without a diffusing device attached to the conduit entering the intake port, and then passes through the medium becoming purified air; and
   d. a means for the release of the purified air from the vessel to the environmental space, wherein said means is
      one or more conduits leading from above the absorbent liquid medium in the vessel to the environmental space, or
      one or more openings in the vessel, above the absorbent liquid medium in the vessel, to the environmental space.

13. A method of using the apparatus of claim 12 to remove of one or more contaminants from contaminated environmental space air comprising the steps of
   a. passing the contaminated environmental space air, by means of the air transferring device, through the absorbent liquid medium contained in the vessel, wherein the vessel is a toilet tank and the input port of the air transferring device is positioned outside the confines of the toilet bowl, wherein the temperature and hygroscopicity of the liquid medium are optionally and independently controlled, said liquid medium optionally containing one or more additives capable of interacting with the contaminants;
   b. allowing the contaminated environmental space air to come in contact with the absorbent liquid medium and optional additives such that one or more contaminants from the contaminated environmental space air are transferred into the absorbent liquid medium and are thereby removed to produce decontaminated environmental space air, and the temperature and humidity of the air are optionally and independently improved;
   c. releasing the decontaminated environmental space air from the vessel into the environmental space, thereby lowering the level of one or more contaminants in the environmental space air, and optionally and independently improving the temperature and humidity of the environmental space air.

14. An apparatus for the removal of contaminants from the environmental space air, said apparatus comprising
   a. a vessel fitted with sealed intake and output ports, containing an absorbent liquid medium, said liquid medium configured to remove said contaminants by dissolution, physical entrapment, or chemical reaction and said absorbent liquid medium comprising water and glycerin;
   b. a first conduit for transferring environmental space air to the intake port of the vessel, said conduit positioned so that the environmental space air enters the intake port of the vessel below the level of the absorbent liquid medium contained in the vessel, said air being introduced without a diffusing device attached to the conduit entering the intake port; and
   c. a second conduit from the vessel output port to the environment space, said conduit positioned above the level of the absorbent liquid medium in the vessel;
   d. one or more air transferring devices, positioned so that contaminated air from the environmental space is captured and moves through the first conduit, then through the liquid absorbent medium in the vessel, and subsequently through the second conduit where it is released into the environmental space;
   wherein the absorbent liquid medium optionally further comprises one or more additives independently selected from the group consisting of an aliphatic alcohol, an aliphatic polyol, an aliphatic ketone, vegetable oil, animal fat, a polyethylene glycol, silicone oil, an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant.

15. The apparatus of claim 14, comprising one air pump, said pump positioned so as to exert positive pressure from its output port into the first conduit.

16. The apparatus of claim 14 comprising two air pumps, a first pump positioned so as to exert positive pressure from its output port into the first conduit, and a second pump positioned so as to exert negative pressure from its intake port into the second conduit.

17. A method of using the apparatus of claim 14 to remove of one or more contaminants from contaminated environmental space air, while optionally and independently improving the temperature and level of relative humidity of the air, comprising the steps of
   a. passing the contaminated environmental space air, by means of the one or more air transferring devices, through the absorbent liquid medium contained in the vessel, wherein the temperature and hygroscopicity of the liquid medium are optionally and independently controlled, said liquid medium optionally containing one or more additives capable of interacting with the contaminants;
   b. allowing the contaminated environmental space air to come in contact with the absorbent liquid medium and optional additives such that one or more contaminants from the contaminated environmental space air are transferred into the absorbent liquid medium and are thereby removed to produce decontaminated environmental space air, and the temperature and humidity of the air are optionally and independently improved;
   c. releasing the decontaminated environmental space air from the vessel into the environmental space, thereby lowering the level of one or more contaminants in the environmental space air, and optionally and independently improving the temperature and humidity of the environmental space air.

18. The method according to claim 7, wherein the absorbent liquid medium is selected from the group consisting of a liquid, a liquid absorbed into a solid material, a solid/liquid mixture, a slurry, and a solid phase that is supported with a liquid.

19. An apparatus for the removal of contaminants from the environmental space air, said apparatus comprising
   a. an air transferring device with intake and output ports, such that when the device is operated, the intake port collects environmental space air which is transferred to the output port;
   b. a vessel fitted with sealed intake and output ports, containing an absorbent liquid medium configured to remove said contaminants by dissolution, physical entrapment, or chemical reaction, and optionally having one or more ports for addition and/or removal of the liquid medium;
   c. one or more conduits for transferring air from the output port of the air transferring device to the intake port of the vessel containing the absorbent liquid medium, said conduits positioned so that the air from the output port of the air transferring device enters the intake port of the vessel below the level of the absorbent liquid medium contained in the vessel, said air being introduced without a diffusing device attached to the conduit entering the intake port, and then passes through the medium becoming purified air; and
   d. a means for the release of the purified air from the vessel to the environmental space, wherein said means is
     one or more conduits leading from above the absorbent liquid medium in the vessel to the environmental space, or
     one or more openings in the vessel, above the absorbent liquid medium in the vessel, to the environmental space;
   wherein
   the air transferring device and intake port is a kitchen range hood.

20. An apparatus for the removal of contaminants from the environmental space air, said apparatus comprising
   a. an air transferring device with intake and output ports, such that when the device is operated, the intake port collects environmental space air which is transferred to the output port;
   b. a vessel fitted with sealed intake and output ports, containing an absorbent liquid medium configured to remove said contaminants by dissolution, physical entrapment, or chemical reaction, and optionally having one or more ports for addition and/or removal of the liquid medium;
   c. one or more conduits for transferring air from the output port of the air transferring device to the intake port of the vessel containing the absorbent liquid medium, said conduits positioned so that the air from the output port of the air transferring device enters the intake port of the vessel below the level of the absorbent liquid medium contained in the vessel, said air being introduced without a diffusing device attached to the conduit entering the intake port, and then passes through the medium becoming purified air; and
   d. a means for the release of the purified air from the vessel to the environmental space, wherein said means is
     one or more conduits leading from above the absorbent liquid medium in the vessel to the environmental space, or
     one or more openings in the vessel, above the absorbent liquid medium in the vessel, to the environmental space;
   wherein the air output port is configured so that the purified air exiting the vessel is delivered to an individual by means of an individual breathing apparatus.

21. An apparatus for the removal of contaminants from the environmental space air, said apparatus consisting of
   a. an air transferring device with intake and output ports for the environmental space air;
   b. two vessels, each fitted with sealed intake and output ports, each vessel containing a different, independently selected absorbent liquid medium;
   c. a first conduit connected to the output port of the air transferring device and to the input port of a first vessel, said conduit positioned so that the air from the air transferring device enters the input port of the first vessel below the level of the absorbent liquid medium; said air being introduced without a diffusing device attached to the conduit entering the intake port,
   d. a second conduit connected to the first vessel output port to the second vessel input port, said conduit positioned so that the output air from the first vessel enters the input port of the second vessel below the level of the absorbent liquid medium in the second vessel, said air being introduced without a diffusing device attached to the conduit entering the intake port;

e. a third conduit connected to the second vessel output port and to the environment space, said conduit positioned above the level of the absorbent liquid medium;

wherein each independently selected liquid absorbent medium is configured to remove said contaminants by dissolution, physical entrapment or chemical reaction and independently selected from the group consisting of water, glycerin, an aliphatic alcohol, an aliphatic polyol, an aliphatic ketone, vegetable oil, animal fat, a polyethylene glycol, and silicone oil; and optionally containing one or more additives independently selected from the group consisting of an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, glycerin, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant, wherein at least one of the independent absorbent liquid medium comprises water and glycerin.

22. A method of using the apparatus of claim 21 to remove of one or more contaminants from environmental air comprising the steps of
  a. passing the contaminated environmental space air, by means of the air transferring device, through the absorbent liquid medium contained in the vessels, wherein the temperature and hygroscopicity of the liquid medium are optionally and independently controlled, said liquid medium optionally containing one or more additives capable of interacting with the contaminants;
  b. allowing the contaminated environmental space air to come in contact with the absorbent liquid medium and optional additives such that one or more contaminants from the contaminated environmental space air are transferred into the absorbent liquid medium and are thereby removed to produce decontaminated environmental space air, and the temperature and humidity of the air are optionally and independently improved;
  c. releasing the decontaminated environmental space air from the vessel into the environmental space, thereby lowering the level of one or more contaminants in the environmental space air, and optionally and independently improving the temperature and humidity of the environmental space air.

23. An apparatus for purification of environmental space air comprising
  1) a vessel, with an open top, containing an absorbent liquid medium,
    wherein the absorbent liquid medium is selected from the group consisting of water, glycerin, an aliphatic alcohol, an aliphatic polyol, an aliphatic ketone, vegetable oil, animal fat, a polyethylene glycol, and silicone oil; and optionally containing one or more additives independently selected from the group consisting of an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, glycerin, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant;
  2) an air transferring device assembly comprising
    a. an electrically powered fan with an on/off switch, an intake vent and an exhaust portion;
    b. an outlet tube, of approximately the same diameter as the fan outlet portion, said tube affixed at one end along its linear axis to said fan exhaust portion, and containing a plurality of holes spaced at regular intervals along the edge of the opposite end of the tube;
  wherein the air transferring device assembly is mounted on a supporting means so as to maintain the assembly in an upright position, maintaining the fan above the liquid, and the end of the outlet tube containing the holes below the level of the liquid; and
  wherein, when the fan is operated, environmental space air is captured through the intake portion of the fan, travels through the outlet tube into the liquid absorbent media, and ultimately reenters the environmental space.

24. An apparatus for purification of environmental space air comprising
  1) a vessel, with an open top, containing an absorbent liquid media,
    wherein the absorbent liquid medium is selected from the group consisting of water, glycerin, an aliphatic alcohol, an aliphatic polyol, an aliphatic ketone, vegetable oil, animal fat, a polyethylene glycol, and silicone oil; and optionally containing one or more additives independently selected from the group consisting of an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, glycerin, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant;
  2) an air transferring device assembly comprising
    a. an electrically powered fan with an on/off switch, an intake vent and an exhaust portion;
    b. an adapter block of polymeric foam material affixed to the exhaust portion of the fan and fitted to accommodate the length and width dimensions of the fan housing, said adapter block containing a plurality of holes arranged so as to allow passage of air from the fan through said holes;
  wherein the dimensions of the polymeric foam material is such that when attached to the air transferring device assembly and placed in the vessel, the assembly is sufficiently buoyant to maintain an upright position, and a plurality of holes in the block are immersed below the level of the liquid; and
  wherein, when the fan is operated, environmental space air is captured through the intake portion of the fan, travels through the holes in the adapter block into the liquid absorbent media, and ultimately reenters the environmental space.

25. The apparatus of claim 24 wherein the air transferring device assembly further comprises a plurality of tubes, each tube inserted into a corresponding hole in the adapter block, and each tube is immersed below the level of the liquid absorbent media of the vessel.

26. An apparatus for purification of environmental space air comprising
1) a vessel, with an open top, containing an absorbent liquid media,
   wherein the absorbent liquid medium is selected from the group consisting of water, glycerin, an aliphatic alcohol, an aliphatic polyol, an aliphatic ketone, vegetable oil, animal fat, a polyethylene glycol, and silicone oil; and optionally containing one or more additives independently selected from the group consisting of an alkali metal salt, polyethylene glycol, sodium bisulfite, carbon black, a reducing sugar, Vitamin C, zinc oxide, silver nitrate, a mineral acid, sodium bicarbonate, sodium hydroxide, bleach, a quaternary ammonium salt, glycerin, a hydrogel, a hydro sol, a super water absorbent, EDTA, silica gel, alumina, absorbent clay, an organic polymer, starch, an amino acid, a cyclic dextran, a $C_1$-$C_6$ mono-, di- or trialkyl amine, a polymer amine, a detergent, a biocide, an organic scavenger, a fragrance, an air freshener, a microbe capable of degrading a pollutant, a detergent, ammonia, a disinfectant, an aquatic plant, a rare earth metal catalyst, and a sterilant;
2) an air transferring device assembly comprising
   a. an electrically powered fan with an on/off switch, an intake vent and an exhaust portion;
   b. a four-sided wooden box shaped adapter, open at each end, wherein each side has a plurality of holes along the bottom edge, and is affixed at the top to the exhaust portion of the fan;
wherein the air transferring device is placed directly into the vessel, the box-shaped adapter resting on the bottom of the vessel, with the fan situated above the liquid absorbent media and holes in the adapter immersed below the level of the liquid absorbent media; and
wherein, when the fan is operated, environmental space air is captured through the intake portion of the fan, moves through the fan exhaust portion and travels through the holes in the box-shaped adapter and though the media, and ultimately reenters the environmental space.

* * * * *